(12) United States Patent
Yokoi et al.

(10) Patent No.: US 8,064,636 B2
(45) Date of Patent: Nov. 22, 2011

(54) IMAGE PROCESSING APPARATUS AND METHOD OF CONTROLLING THE SAME

(75) Inventors: Masanori Yokoi, Kawasaki (JP); Koji Harada, Yokohama (JP); Takami Eguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 829 days.

(21) Appl. No.: 12/128,221

(22) Filed: May 28, 2008

(65) Prior Publication Data

US 2009/0175493 A1 Jul. 9, 2009

(30) Foreign Application Priority Data

| May 31, 2007 | (JP) | 2007-146096 |
| May 31, 2007 | (JP) | 2007-146097 |
| May 31, 2007 | (JP) | 2007-146099 |
| May 31, 2007 | (JP) | 2007-146100 |
| May 31, 2007 | (JP) | 2007-146101 |

(51) Int. Cl.
*G06K 9/00* (2006.01)

(52) U.S. Cl. ........ 382/100; 382/209; 382/218; 382/298; 348/116; 345/698

(58) Field of Classification Search ........................ None
See application file for complete search history.

(56) References Cited

U.S. PATENT DOCUMENTS

| 5,668,891 | A * | 9/1997 | Fan et al. | 382/168 |
| 6,983,056 | B1 * | 1/2006 | Amano | 382/100 |
| 7,209,572 | B2 | 4/2007 | Iwamura et al. | |
| 7,260,238 | B2 | 8/2007 | Iwamura et al. | |
| 7,269,274 | B2 | 9/2007 | Iwamura et al. | |
| 7,320,138 | B2 | 1/2008 | Wakao et al. | |
| 2002/0172398 | A1 * | 11/2002 | Hayashi | 382/100 |
| 2003/0123698 | A1 * | 7/2003 | Murakami | 382/100 |
| 2004/0057619 | A1 * | 3/2004 | Lim et al. | 382/182 |
| 2006/0209348 | A1 * | 9/2006 | Tabata | 358/3.28 |
| 2006/0280515 | A1 * | 12/2006 | Harada | 399/80 |
| 2007/0025787 | A1 * | 2/2007 | Harada | 399/366 |
| 2007/0127771 | A1 | 6/2007 | Kaneda et al. | |

OTHER PUBLICATIONS

Kineo Matsui, "Basics of a Digital Watermark," Morikita Publishing Co., Ltd., pp. 198-199, 1998 (ISBN:4-627-82551-X).

* cited by examiner

*Primary Examiner* — John Lee

(74) *Attorney, Agent, or Firm* — Fitzpatrick, Cella, Harper & Scinto

(57) ABSTRACT

To accurately extract embedded information from a document image using line spacing watermark, an image processing apparatus for extracting watermark information includes an input unit which inputs a document image as image data, an image reduction unit which generates, from the image data, reduced image data reduced in the first direction, a detection unit which scans the reduced image data in the second direction and detects the length of a blank region as line spacing information, and an extraction unit which extracts watermark information embedded in the document image based on the line spacing information.

18 Claims, 46 Drawing Sheets

CONVERT HALFTONE PIXEL
INTO SIGNIFICANT PIXEL (BLACK)

F I G. 11
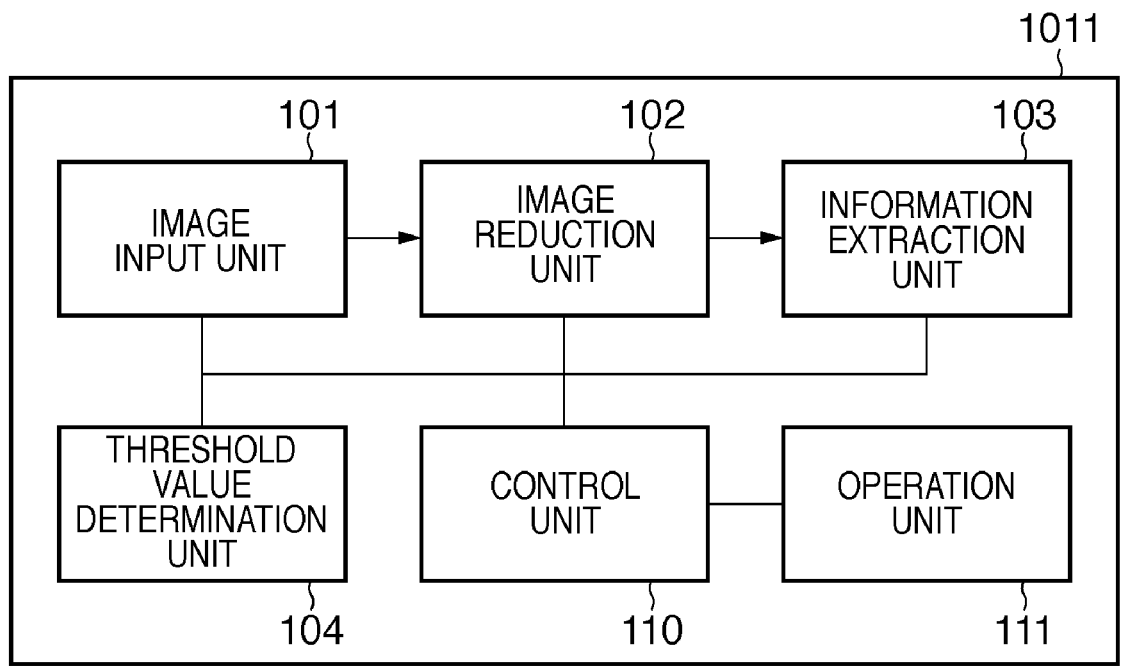

FIG. 23
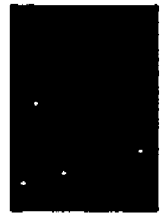
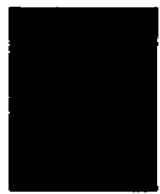

FIG. 36

IMAGE PROCESSING APPARATUS AND METHOD OF CONTROLLING THE SAME

BACKGROUND OF THE INVENTION

1. Field of the Invention

The present invention relates to an image processing technique of extracting watermark information embedded in a document image based on the line spacing between the character strings in the document image.

2. Description of the Related Art

As a technique of adding information of, for example, copyright or copy control to a document image, a method described in Kineo Matsui, "Basics of a digital watermark", Morikita Publishing Co., Ltd. pp. 198-199, 1998 (ISBN:4-627-82551-X) is known, in which information is embedded using line spacing (to be referred to as a line spacing watermark hereinafter). FIG. 2 is a view showing the concept of a line spacing watermark. To extract embedded information from a document image using a line spacing watermark, first, the line spacing between the character strings in the document image is obtained. To obtain the line spacing, generally, a histogram is obtained by fully scanning the document image. The line spacing is derived from the histogram. Then, information is extracted in accordance with the derived line spacing and a rule used for embedding. To embed, e.g., binary information "0", line spacings U and D are set to U>D, as shown in FIG. 2. On the other hand, to embed binary information "1", the line spacings U and D are set to U<D.

However, the above-described method of extracting information embedded in a document image using a line spacing watermark has the following problems. To measure the line spacing, it is necessary to fully scan the document image and obtain a histogram. Hence, an accurate information extraction process is time-consuming. In particular, when copy control information is embedded, the copy control information is extracted in a copying machine, whether or not copy is possible is determined based on the extracted information, and then, a copy process is performed. The series of processes of copying one document takes a lot of time. Additionally, when the character string direction copying one document takes a lot of time. Additionally, when the character string direction and scanning direction of the input document image are tilted with respect to each other, no line spacing can be derived from the histogram. In this case, the document image needs to be input again. Alternatively, cumbersome image processing of, for example, rotating the input document image is necessary.

SUMMARY OF THE INVENTION

According to one aspect of the present invention, an image processing apparatus for inputting a document image and extracting watermark information embedded in the document image on the basis of a line spacing between character strings in the document image, comprises: an input unit for inputting a document image as image data; an image reduction unit for generating, from the input image data, reduced image data reduced in a first direction; a detection unit for scanning the reduced image data generated by the image reduction unit in a second direction that has a predetermined relationship with respect to the first direction and detecting a length of a blank region in the second direction as line spacing information; and an extraction unit for extracting watermark information embedded in the document image on the basis of the line spacing information detected by the detection unit.

According to another aspect of the present invention, an image processing apparatus for inputting a document image and extracting embedded watermark information on the basis of a line spacing between character strings in the document image, comprises: an input unit for inputting a document image as image data; an image reduction unit for generating, from the input image data, first reduced image data reduced in a first direction; a detection unit for detecting corner points of a character string existence region in the first reduced image data; a setting unit for setting a start point and an end point of scanning on two opposing sides of a rectangle using the corner points; and an information extraction unit for scanning the reduced image data along a line segment which connects the start point and the end point set by the setting unit, detecting a line spacing between character strings, and extracting watermark information.

According to still another aspect of the present invention, a method of controlling an image processing apparatus for inputting a document image and extracting watermark information embedded in the document image on the basis of a line spacing between character strings in the document image, comprises: the input step of inputting a document image as image data; the image reduction step of generating, from the input image data, reduced image data reduced in a first direction; the detection step of scanning the reduced image data generated in the image reduction step in a second direction that has a predetermined relationship with respect to the first direction and detecting a length of a blank region in the second direction as line spacing information; and the extraction step of extracting watermark information embedded in the document image on the basis of the line spacing information detected in the detection step.

According to yet another aspect of the present invention, a method of controlling an image processing apparatus for inputting a document image and extracting embedded watermark information on the basis of a line spacing between character strings in the document image, comprises: the input step of inputting a document image as image data; the image reduction step of generating, from the input image data, first reduced image data reduced in a first direction; the detection step of detecting corner points of a character string existence region in the first reduced image data; the setting step of setting a start point and an end point of scanning on two opposing sides of a rectangle using the corner points; and the information extraction step of scanning the reduced image data along a line segment which connects the start point and the end point set in the setting step, detecting a line spacing between character strings, and extracting watermark information.

According to still yet another aspect of the present invention, a storage medium stores a computer program which causes a computer to execute image processing of inputting a document image and extracting watermark information embedded in the document image on the basis of a line spacing between character strings in the document image, the computer program causing the computer to execute: the input step of inputting a document image as image data; the image reduction step of generating, from the input image data, reduced image data reduced in a first direction; the detection step of scanning the reduced image data generated in the image reduction step in a second direction that has a predetermined relationship with respect to the first direction and detecting a length of a blank region in the second direction as line spacing information; and the extraction step of extracting watermark information embedded in the document image on the basis of the line spacing information detected in the detection step.

According to yet still another aspect of the present invention, a storage medium stores a computer program which causes a computer to execute image processing of inputting a document image and extracting embedded watermark information on the basis of a line spacing between character strings in the document image, the computer program causing the computer to execute: the input step of inputting a document image as image data; the image reduction step of generating, from the input image data, first reduced image data reduced in a first direction; the detection step of detecting corner points of a character string existence region in the first reduced image data; the setting step of setting a start point and an end point of scanning on two opposing sides of a rectangle using the corner points; and the information extraction step of scanning the reduced image data along a line segment which connects the start point and the end point set in the setting step, detecting a line spacing between character strings, and extracting watermark information.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a block diagram showing the main functional arrangement of an image processing apparatus according to the second embodiment;

FIG. 23 is a view showing a change of a reduced image upon a pixel replacement process;

FIG. 36 is a view showing binary image data having embedded watermark information;

DESCRIPTION OF THE EMBODIMENTS

Preferred embodiments of the present invention will now be described in detail with reference to the accompanying drawings. Note that the following embodiments are not intended to limit the scope of the invention, but are merely examples.

First Embodiment

An image processing apparatus according to the first embodiment of the present invention will be described below, which causes an image reading apparatus (scanner) to read a paper document and extracts watermark information from the read document image data.

<Apparatus Arrangement>

Figure 1:
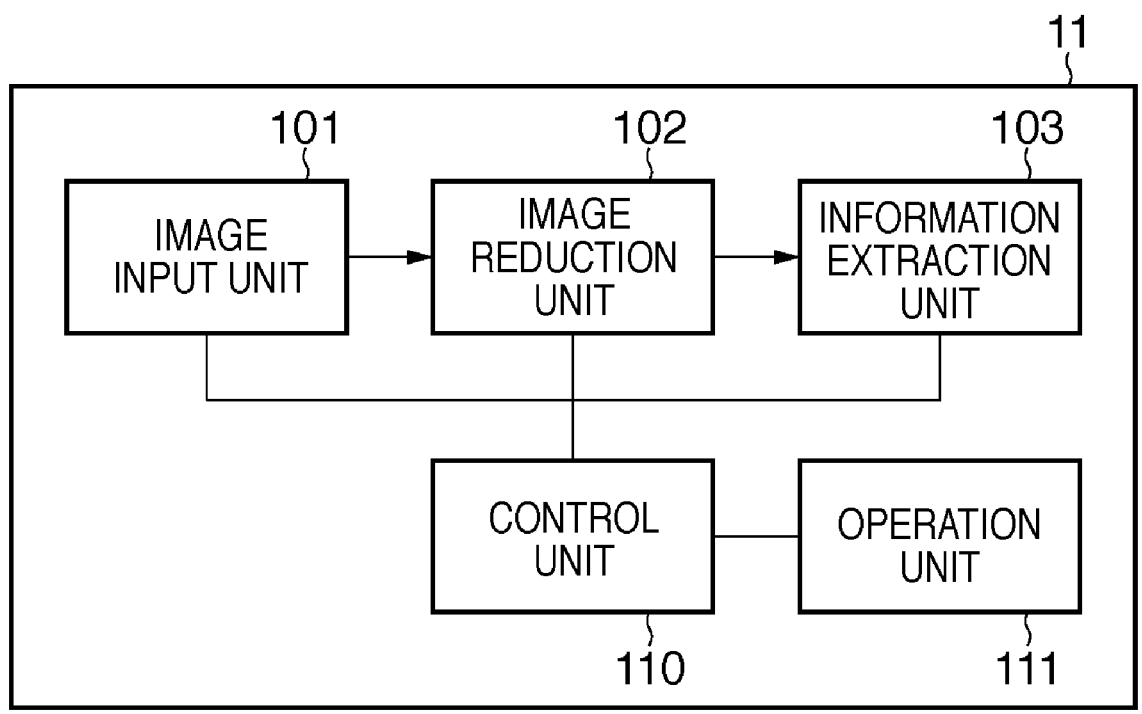
FIG. 1 is a block diagram showing the main functional arrangement of an image processing apparatus 11 according to the first embodiment.

FIG. 1 is a block diagram showing the main functional arrangement of an image processing apparatus 11 according to the first embodiment. As shown in FIG. 1, the image processing apparatus 11 includes an image input unit 101, image reduction unit 102, information extraction unit 103, control unit 110, and operation unit 111.

The image input unit 101 is a functional unit which inputs image data corresponding to the above-described document image having embedded watermark information. More specifically, the image input unit 101 inputs image data, which is read and generated by an external scanner based on a paper document, via an external device connection interface such as a USB. The image input unit 101 may input image data via a network such as Ethernet®, as a matter of course.

The image reduction unit 102 is a functional unit which reduces the image data input by the image input unit 101 in a first direction (e.g., the horizontal direction of the image) and in a second direction (e.g., the vertical direction of the image) perpendicular to the first direction. When the input image data is bitmap (raster) data, generally, the above-described first and second directions match the array directions of pixels contained in the image data. As described above, the image reduction unit 102 is designed to reduce image data in the two directions perpendicular to each other. However, the image reduction unit 102 can be designed to reduce image data in only one direction, as will be described later.

The information extraction unit 103 is a functional unit which extracts binary information corresponding to watermark information from the reduced image data generated by the image reduction unit 102. More specifically, the information extraction unit 103 extracts the information by detecting the presence/absence of a significant pixel from the reduced image data generated by the image reduction unit 102. A portion where a significant pixel is detected is determined as a character string region. A portion where no significant pixel is detected is determined as a line spacing portion. Based on a length (the number of continuous pixels) corresponding to each of a plurality of line spacings determined as line spacing portions, binary data (0 or 1) corresponding to each line spacing is determined. A watermark information embedding algorithm including the correspondence between a line spacing portion length and binary data and the amount of information (the number of bits) is set in the information extraction unit 103 in advance.

The control unit 110 is a functional unit which controls to make the above-described functional units cooperatively operate. The operation unit 111 is a functional unit which receives an instruction from a user. The operations of the above-described functional units will be described later in detail.

<Image Data Having Embedded Watermark Information>

The first embodiment will be described assuming the following watermark information embedding algorithm. Any other algorithm is also applicable if it embeds watermark information based on the line spacing between character strings.

Figure 2:
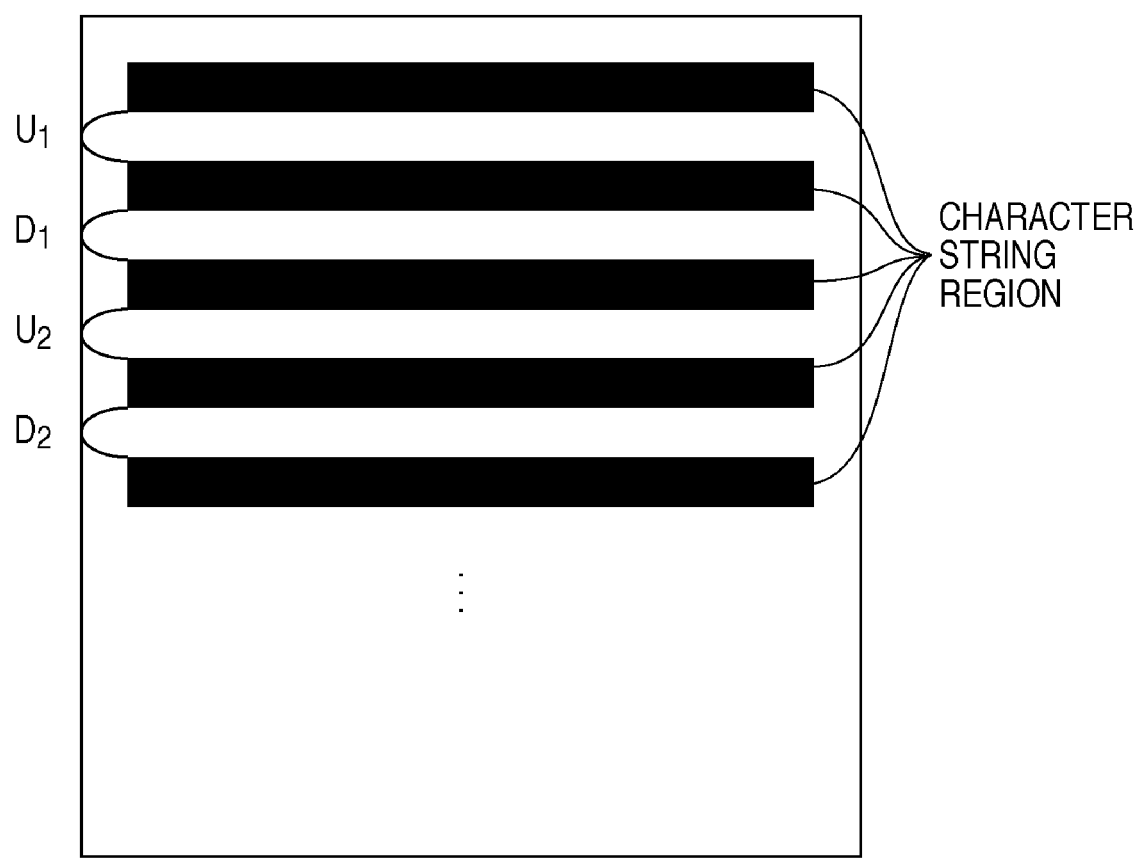
FIG. 2 is a view showing a document having embedded watermark information.

FIG. 2 is a view showing a document having embedded watermark information. In FIG. 2, black characters are printed on a white paper sheet. Binary information is embedded using two kinds of spacings (line spacings) $U_n$ and $D_n$ between a plurality of lines of character strings. More specifically, two continuous line spacings ($U_n$ and $D_n$: n is a natural number) are set in the following way.

To embed "0": $U_n > D_n$
To embed "1": $U_n < D_n$

A scanner having an optical sensor such as a charge-coupled device (CCD) reads the document with the watermark information and generates image data I. Assume that the generated document image data I is a binary image including a black character portion and a white background portion of the paper document. A "black pixel" corresponding to a character portion will also be referred to as a "significant pixel" hereinafter.

Figure 3:
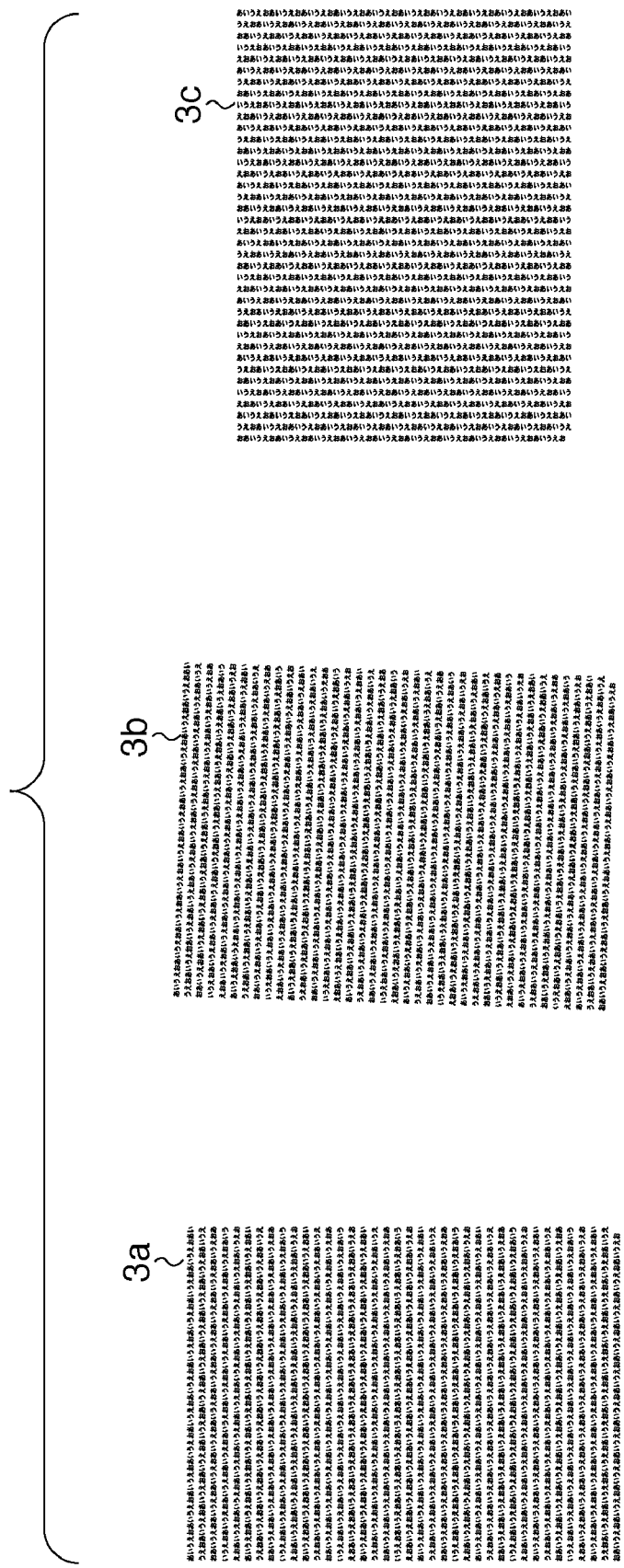
FIG. 3 is a view showing binary image data having embedded watermark information.

FIG. 3 is a view showing binary image data having embedded watermark information. Reference numeral 3a indicates image data which records a text document of horizontal writing in a correct direction. On the other hand, reference numerals 3b and 3c indicate tilted document images. When a scanner reads a paper document, as described above, image data like 3b or 3c may be input due to a shift with respect to the reference direction or a user's mistake in placing the paper document.

<Operation of Apparatus>

An operation of causing the image processing apparatus 11 to extract watermark information from the image data I will be described below in detail with reference to a flowchart.

Figure 10:
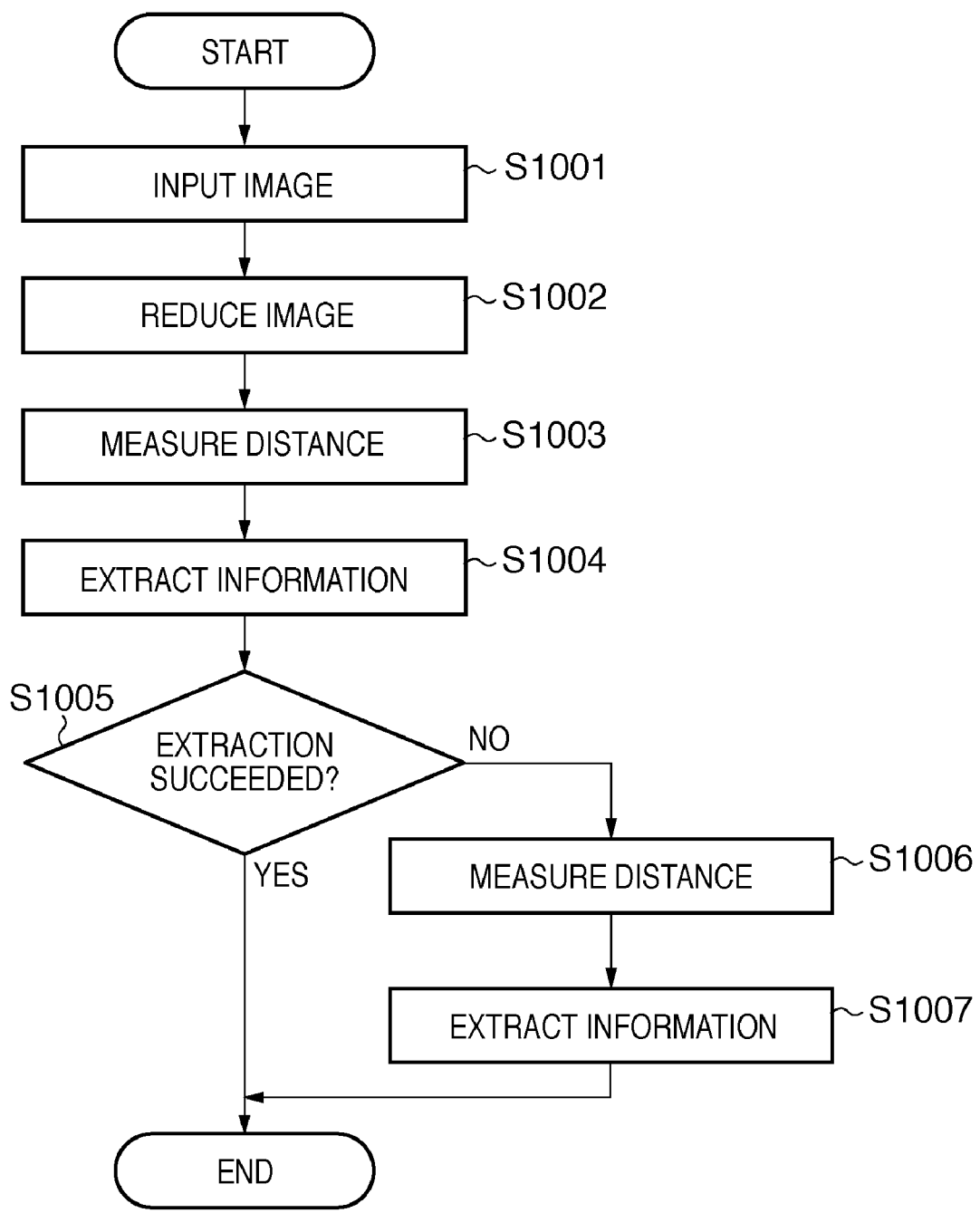
FIG. 10 is a flowchart illustrating the operation of the image processing apparatus 11 according to the first embodiment.

FIG. 10 is a flowchart illustrating the operation of the image processing apparatus 11 according to the first embodiment. The following sequence is triggered by, for example, an image reading instruction input by the user via the operation unit 111.

In step S1001, the image input unit 101 receives, from a scanner, the image data I corresponding to a document image having watermark information and supplies the image data I to the image reduction unit 102.

In step S1002, the image reduction unit 102 reduces the image data I received from the image input unit 101 in the horizontal and vertical directions to generate reduced image data Ish in the horizontal direction and reduced image data Isv in the vertical direction. The image reduction unit 102 supplies the reduced image data Ish and Isv to the information extraction unit 103.

Figure 4:
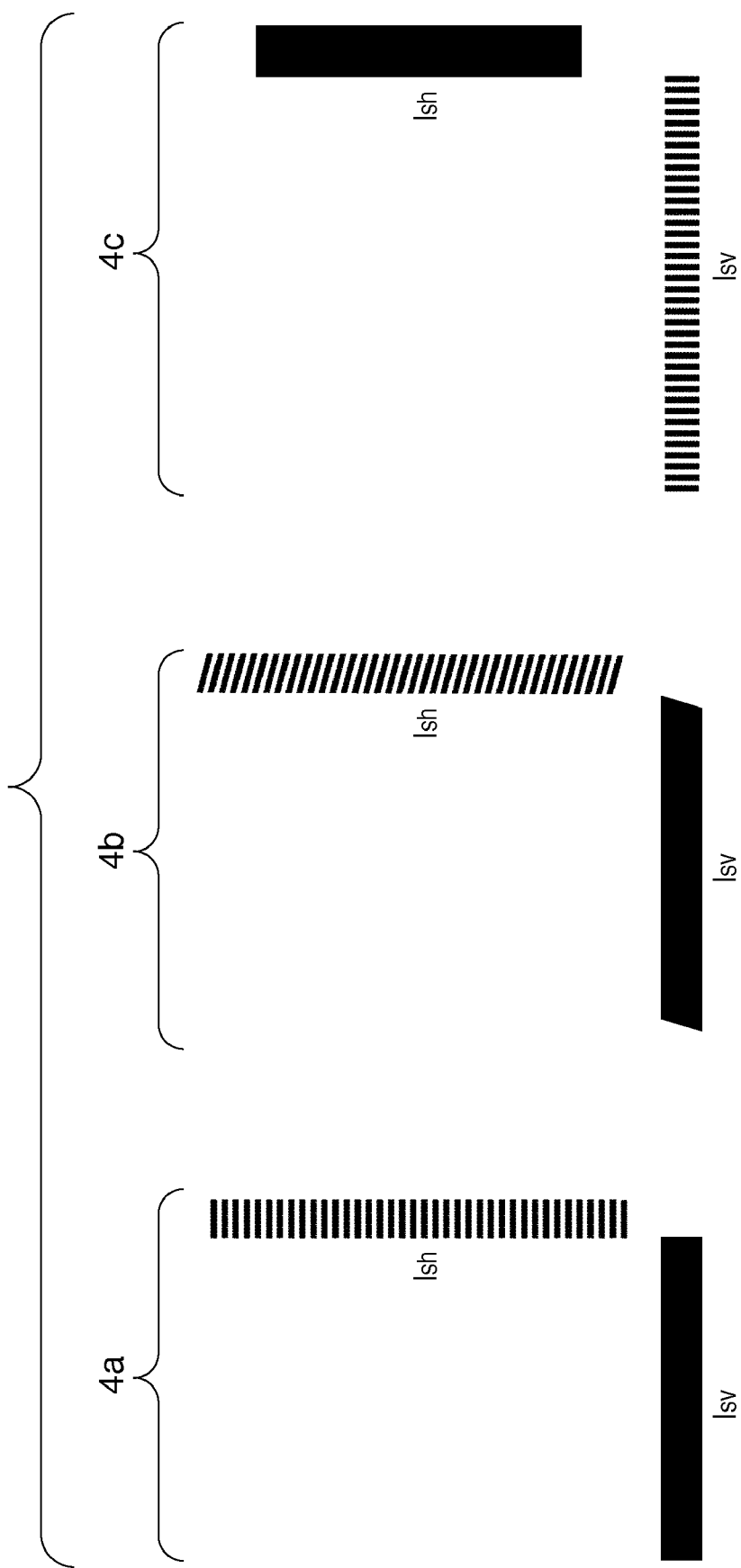
FIG. 4 is a view showing examples of reduced image data Ish obtained by reducing image data I in the horizontal direction and reduced image data Isv obtained by reducing the image data I in the vertical direction.

FIG. 4 is a view showing examples of the reduced image data Ish obtained by reducing the image data I in the horizontal direction and the reduced image data Isv obtained by reducing the image data I in the vertical direction. Note that reduced image data 4a, 4b, and 4c are generated based on the document images 3a, 3b, and 3c, respectively.

The reduced image data Ish is obtained by reduction in the horizontal direction without enlargement/reduction in the vertical direction. The reduced image data Isv is obtained by reduction in the vertical direction without enlargement/reduction in the horizontal direction. However, the reduced image data Ish need only have a higher reduction ratio in the horizontal direction than in the vertical direction. Hence, the image data can also be reduced or enlarged in the vertical direction as long as it is possible to measure the length between character string regions to be described later. This also applies to the reduced image data Isv.

Reduced images are generated in both the horizontal and vertical directions to cope with input of the image data I tilted by 90°, as indicated by 3*c*. Such a situation often occurs upon reading using a scanner. Hence, if the input direction of the image data I is guaranteed in advance, the image data may be reduced in only one direction corresponding to the character string direction.

As is apparent from FIG. 4, in the reduced image obtained by reduction in the character string direction, a plurality of character strings are expressed as a plurality of clusters (objects) of significant pixels. Generation of the reduced image will be described below in more detail.

As a detailed calculation method usable for the reduction process of the image reduction unit 102, input image data can be reduced by simply thinning the pixels at a predetermined period. However, to more accurately discriminate between a character string portion and a line spacing portion, calculation using a bilinear method to be described below is preferably performed.

Figure 5:
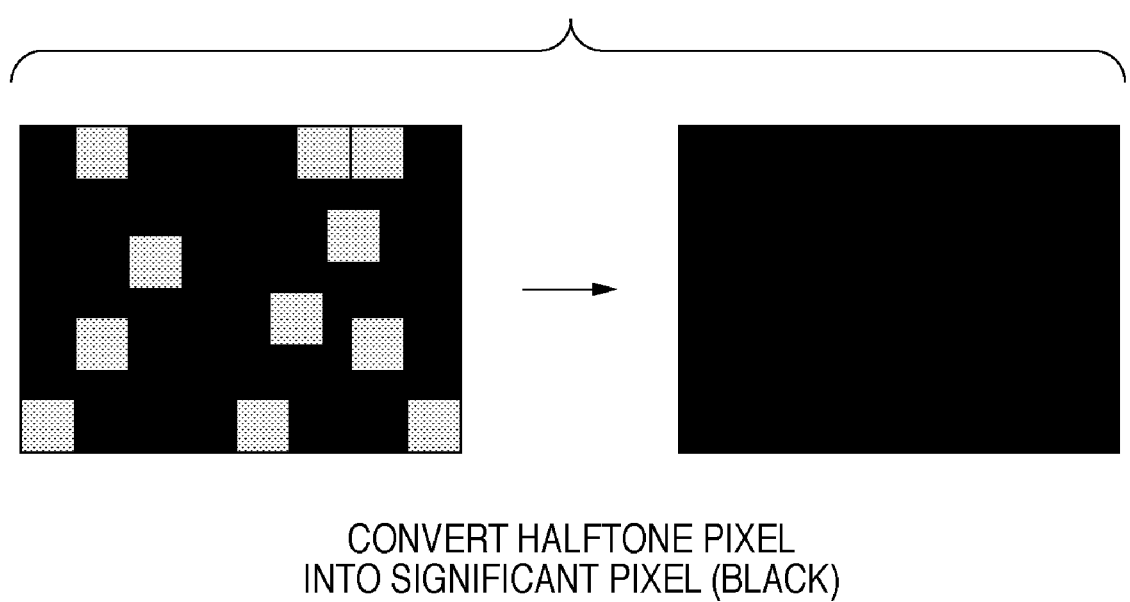
FIG. 5 is a view showing a state in which portions calculated as halftone are converted into black pixels that are significant pixels.

In the bilinear method, based on the pixel values of four pixels in close vicinity in the image data I, the pixel values of corresponding pixels in reduced image data are calculated. In this case, if at least one of the four pixels is black, the calculation result indicates halftone (gray) (left side of FIG. 5). More specifically, when the white pixel value is 0, and the black pixel value is 1, a value larger than 0 and smaller than 1 is obtained as the calculation result.

A line spacing portion has no black pixel that is a significant pixel. For this reason, if a portion having four pixels in close vicinity includes at least one black pixel, the portion can be estimated as a character string region. When a portion calculated as halftone is converted into a black pixel that is a significant pixel (right side of FIG. 5), the character string regions and line spacing regions can accurately be divided. That is, this method uses a fact that although a character string region does not always include a significant pixel (e.g., a character with a small number of strokes), a line spacing region generally has no significant pixel.

The reduction in the horizontal and vertical directions by the image reduction unit 102 is done at a reduction ratio that ensures a recognizable object size. The specific reduction ratio can be either designated as a fixed value in advance or determined as needed based on the additional data (e.g., the reading resolution information of the scanner) of the input image data. The bilinear method is applied as an example of the reduced image generation algorithm. However, the present invention is not limited to this. Reduction can be done using various calculation methods such as a nearest-neighbor method and a bicubic method.

In step S1003, the information extraction unit 103 measures the length (line spacing) between character string regions using one of the reduced image data supplied from the image reduction unit 102. In this case, the measurement is done for the reduced image data Ish reduced in the horizontal direction. The measurement method will be described below in detail.

Figure 6:
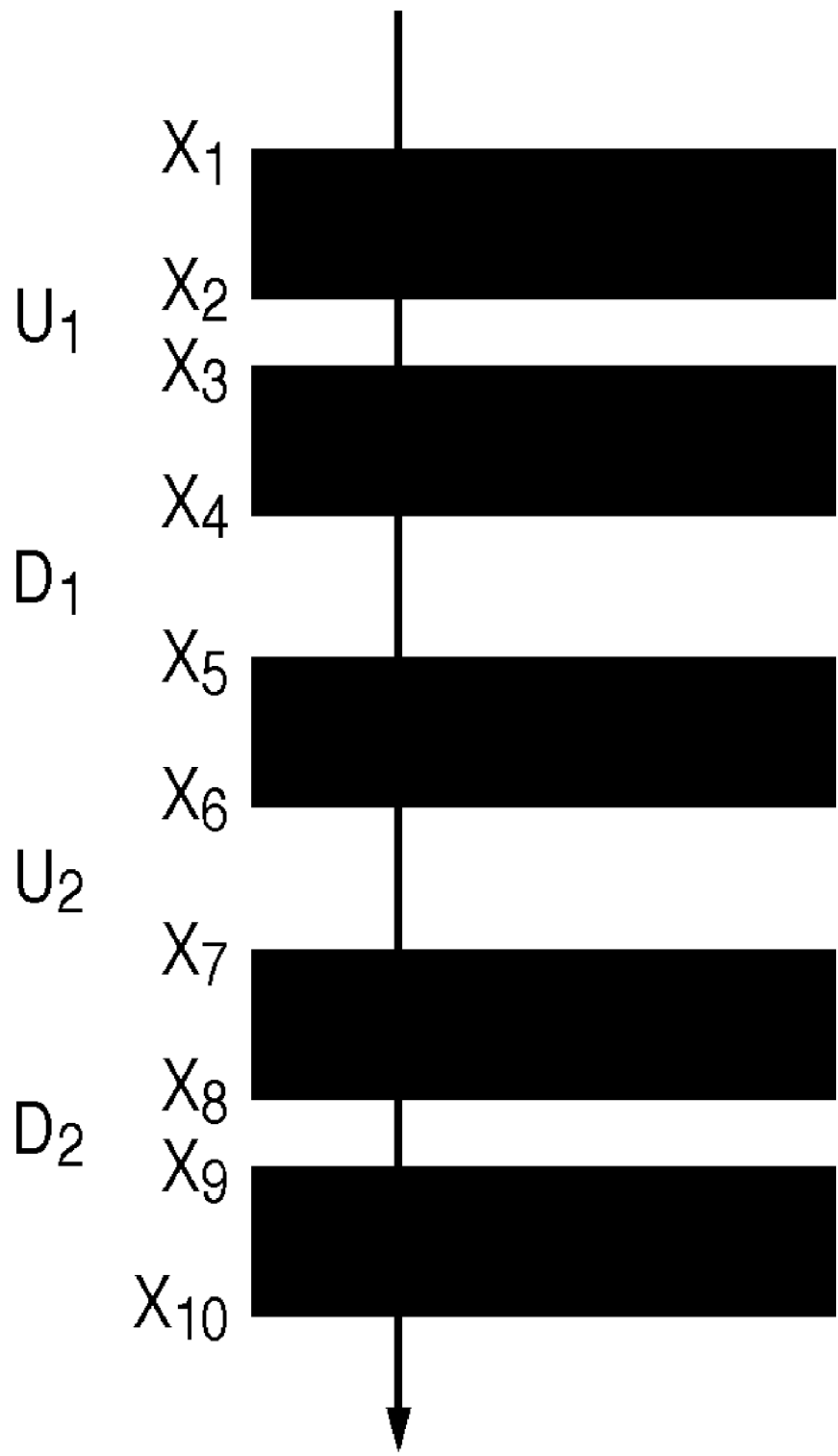
FIG. 6 is an enlarged view of the reduced image data Ish.

FIG. 6 is an enlarged view of the reduced image data Ish. First, the information extraction unit 103 detects the presence/absence of significant pixels by scanning the reduced image data Ish in a direction (vertical direction in this case) perpendicular to the reduction direction (horizontal direction in this case). A position where the presence/absence of a significant pixel is inverted is determined as the boundary between a character string region and a line spacing region.

For example, when inverting positions are detected along the arrow in FIG. 6, pixel positions $x_1$ to $x_{10}$ are detected. The lengths of line spacings $U_1$, $D_1$, $U_2$, and $D_2$ are given by $U_1=x_3-x_2$, $D_1=x_5-x_4$, $U_2=x_7-x_6$, and $D_2=x_9-x_8$, respectively (the unit is "pixel" (pix))

As described above, upon the reduction process in step S1002, the character string regions are reduced in the character array direction, and simultaneously, the halftone portions are converted into significant pixels. This increases the density of significant pixels (black in this case) in each character string region. As a result, the information extraction unit 103 can more accurately detect the boundary between a character string region and a line spacing region and accurately measure each line spacing.

Figure 8:
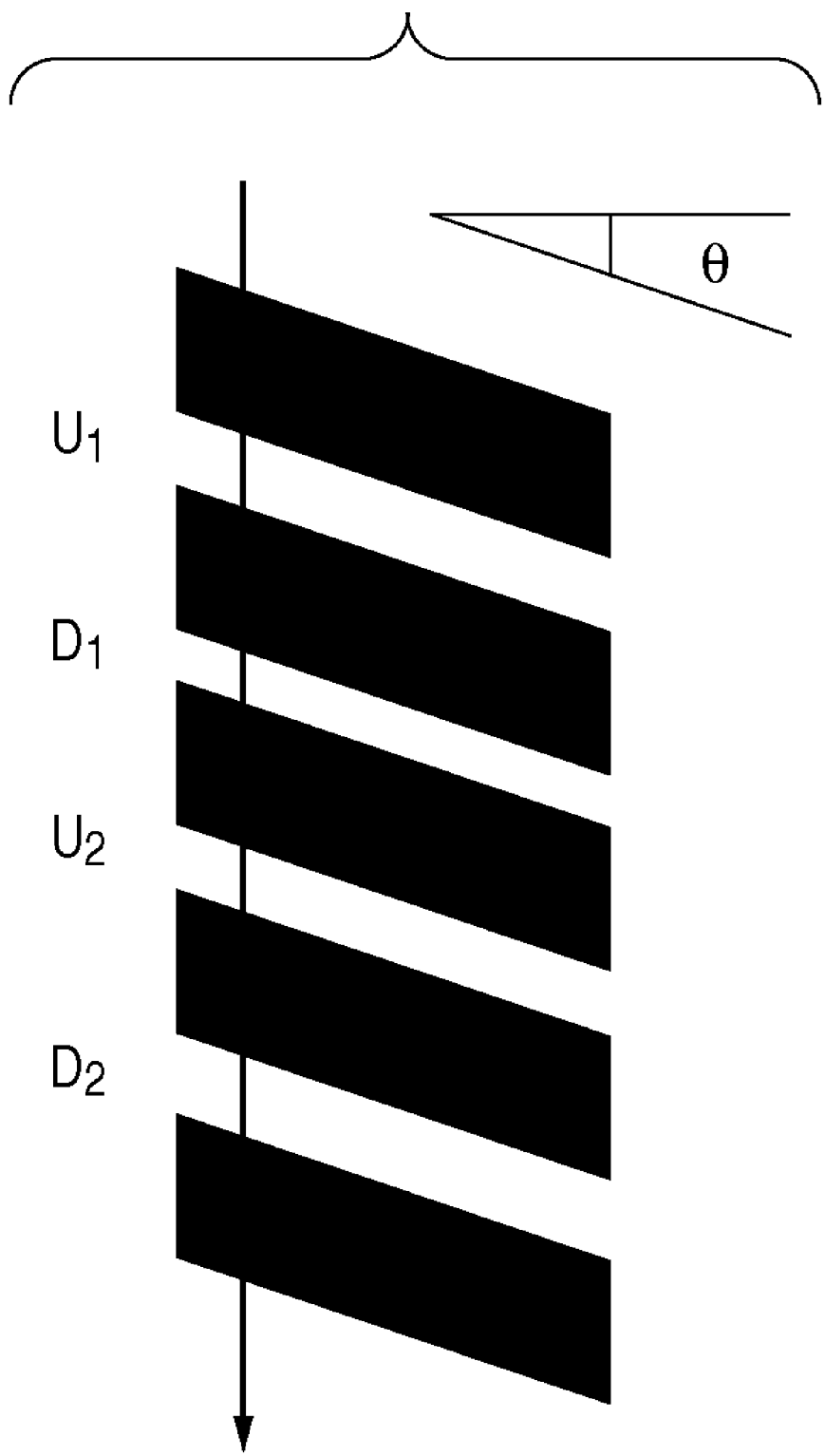
FIG. 8 is a view showing scanning of the reduced image data Ish indicated by 4b.

The above-described method is effective even when the reduced image data Ish is slightly tilted, as indicated by 4*b*. FIG. 8 is a view showing scanning of the reduced image data Ish indicated by 4*b*. In this case, the length of each line spacing along the arrow is different from the result in FIG. 6. More specifically, when the tilt of a character string is θ (°), the length is 1/cos θ times. However, the relative relationship between the lengths of the line spacings does not change.

Figure 7:
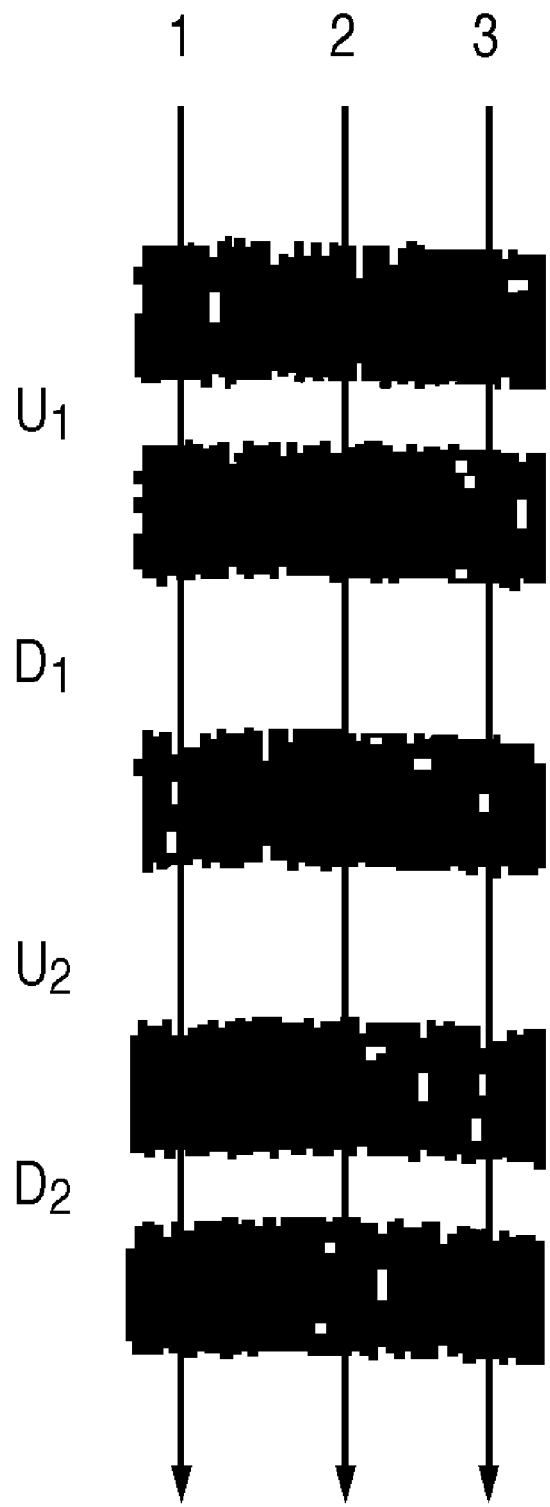
FIG. 7 is a view showing a state in which the reduced image data Ish is scanned a plurality of number of times.

For the reduced image data obtained by the above-described bilinear method, generally, scanning needs to be performed only once. For more accurate detection, the reduced image is scanned a plurality of number of times, and an average value of the distances at a plurality of positions may be determined as a line spacing. The scanning at a plurality of positions is also effective for reduced image data generated by thinning. FIG. 7 is a view showing a state in which the reduced image data Ish is scanned at a plurality of positions. Referring to FIG. 7, a character string portion represented by a black object is closer to real reduced image data. That is, a character string region is represented not as an ideal rectangular object as shown in FIG. 6 but as an object including insignificant pixels (white pixels). This slightly changes the measurement value of the distance (line spacing information) between objects depending on the scanning position.

Assume that the following values are obtained by scanning at three positions (arrows 1, 2, and 3), as shown in FIG. 7.
Arrow 1: $U_1$=10 [pix], $D_1$=4 [pix], $U_2$=4 [pix], $D_2$=12 [pix]
Arrow 2: $U_1$=8 [pix], $D_1$=5 [pix], $U_2$=6 [pix], $D_2$=10 [pix]
Arrow 3: $U_1$=6 [pix], $D_1$=3 [pix], $U_2$=5 [pix], $D_2$=8 [pix]
In this case, the average values of the lengths,
$U_1$=8 [pix], $D_1$=4 [pix], $U_2$=5 [pix], $D_2$=10 [pix]
are determined as the distances (line spacings) between the objects.

In step S1004, the information extraction unit 103 derives watermark information based on the line spacings (line spacing information) derived in step S1003. More specifically, watermark information is calculated in correspondence with the embedding algorithm preset in the information extraction unit 103. For example, in FIG. 6, watermark information is derived as "10 (binary)" because $U_1<D_1$, and $U_2>D_2$.

However, if measurement is done for the reduced image data Ish indicated by 4*c* in step S1003, it is impossible to measure the distance between objects (line spacing information of a blank region) Hence, it is impossible to extract a watermark image in step S1004. This is because the image data I rotated by 90° is input in step S1001, and therefore, the reduced image data Ish is generally a solid black image.

In step S1005, the control unit 110 determines whether information extraction in step S1004 has succeeded. In determining whether information extraction has succeeded, for example, if $U_n$ and $D_n$ are measured, it is determined that information extraction has succeeded. If $U_n$ and $D_n$ are not measured, it is determined that information extraction has failed. Alternatively, if a value except those defined by the preset embedding algorithm is detected, it is determined that information extraction has failed. The determination may be done by determining, for the reading result, detection/undetection of an error designated in advance.

Figure 9:
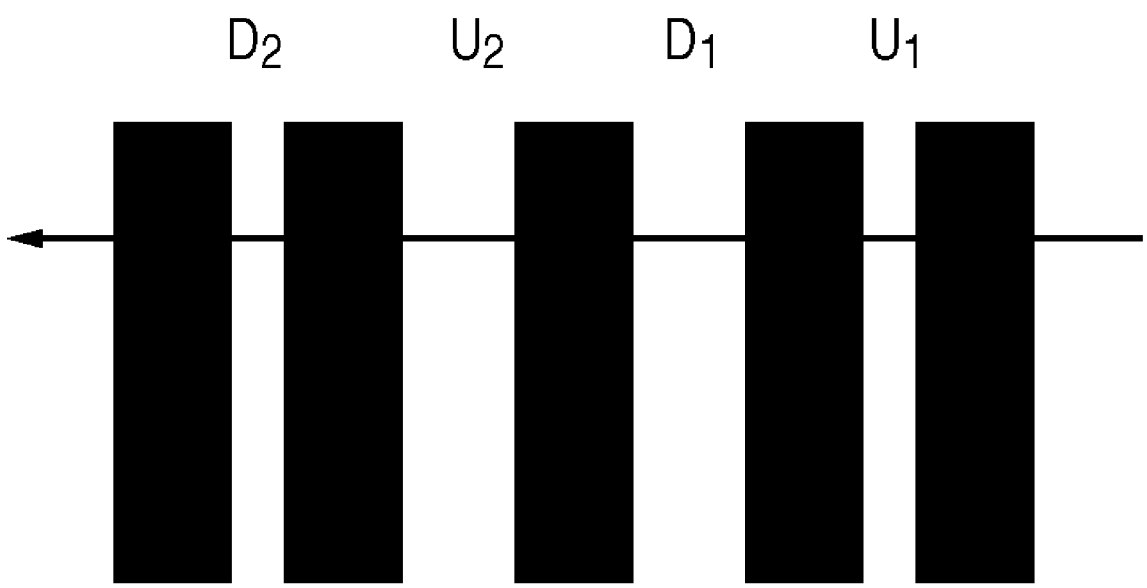
FIG. 9 is a view showing a state in which the reduced image data Isv is scanned in the horizontal direction.

In step S1006, the information extraction unit 103 measures the length (line spacing information) between character string regions using the other of the reduced image data supplied from the image reduction unit 102. In this case, the measurement is done for the reduced image data Isv (second reduced image data) reduced in the vertical direction. The detailed measurement method is the same as in step S1003. Note that the information extraction unit 103 detects the presence/absence of significant pixels by scanning the reduced image data Isv in a direction (horizontal direction in this case) perpendicular to the reduction direction (vertical direction in this case) (FIG. 9).

In this example, scanning is performed in the vertical direction in step S1003 and in the horizontal direction in step S1006. However, scanning may be performed in the horizontal direction in step S1003 and in the vertical direction in step S1006. The two directions (first and second directions) preferably intersect at a right angle. However, they need not always intersect at a right angle and may interest with a slight tilt. For example, the directions may intersect at 85° or 95°. That is, the first and second directions preferably intersect at a right angle for a simpler arrangement of the embodiment. However, they need only have a predetermined relationship that ensures approximate orthogonality.

In step S1007, the information extraction unit 103 derives watermark information based on the line spacings (second line spacing information) derived in step S1006. The detailed measurement method is the same as in step S1004.

The image processing apparatus 11 extracts watermark information from the image data I in accordance with the above-described operation sequence.

In the above description, the document image data has one of the patterns shown in FIG. 3. That is, the document image data is input almost in the normal direction or input while being rotated by 90°. When the document image data is input while being inverted in the vertical or horizontal direction, scanning is also executed in directions reverse to the scanning directions shown in FIGS. 6 to 9. When such a situation is supposed to occur, an algorithm independent of the reading start direction is preferably used as the watermark information embedding algorithm.

For example, when "101 (binary)" or "11010 (binary)" is embedded using "0" as the start bit and "11" as the stop bit, "010111 (binary)" or "01101011 (binary)" is embedded. If "010111000101 (binary)" or "0110101100101001 (binary)" that enables reading from both sides is embedded, the information can be extracted by performing scanning only once from the upper side to the lower side. The bits of the second half of the information are inverted. This is because when the determination condition is To embed "0": $U_n > D_n$ To embed "1": $U_n < D_n$ the order of $U_n$ and $D_n$ is reversed, and bit inversion occurs upon reading from the opposite side.

When both the start bit and the stop bit are "0", information "101 (binary)" is embedded as "001010 (binary)". The information is read from the opposite side as "101011 (binary)". That is, the start bit is "1". Hence, when the information portion is inverted to "010100 (binary)" and rearranged in the reverse direction, "001010 (binary)" can be extracted.

The first embodiment has been described using an algorithm of embedding watermark information in correspondence with the relative length of a set of (two) line spacings, as shown in FIG. 2. However, as described at the beginning, the present invention is not limited to the embedding algorithm. For example, an algorithm may be employed, which uses the first line spacing (between the first and second lines of character strings) as a reference, and embeds information by making the second line spacing (between the second and third lines of character strings) and the subsequent line spacings correspond to the relative length to the first line spacing. Not binary information based on the relative line spacing but information of more levels based on the line spacing may be embedded. This method is effective for any arbitrary embedding algorithm using the line spacing.

As described above, according to the image processing apparatus of the first embodiment, it is possible to more accurately or more quickly extract watermark information. Additionally, even when input image data has a tilt, information can be extracted without any cumbersome operation.

Second Embodiment

An image processing apparatus according to the second embodiment of the present invention will be described below, which causes an image reading apparatus (scanner) to read a paper document and extracts watermark information from the read document image data. The description will be made assuming that the watermark information embedding algorithm is the same as in the first embodiment.

<Apparatus Arrangement>

FIG. 11 is a block diagram showing the main functional arrangement of an image processing apparatus 1011 according to the second embodiment. As shown in FIG. 11, the image processing apparatus 1011 includes an image input unit 101, image reduction unit 102, information extraction unit 103, threshold value determination unit 104, control unit 110, and operation unit 111. The units except the threshold value determination unit 104 are almost the same as those in the image processing apparatus of the first embodiment, and a description thereof will not be repeated.

The threshold value determination unit 104 is a functional unit which determines a threshold value to be used to determine whether a significant pixel on image data belongs to a region corresponding to a character string. That is, the threshold value determination unit 104 is a range determination unit (threshold value derivation unit) for determining a range to be regarded as a significant pixel. The operation will be described later in detail.

<Operation of Apparatus>

An operation of causing the image processing apparatus 1011 to extract watermark information from image data I will be described below in detail with reference to a flowchart.

Figure 17:
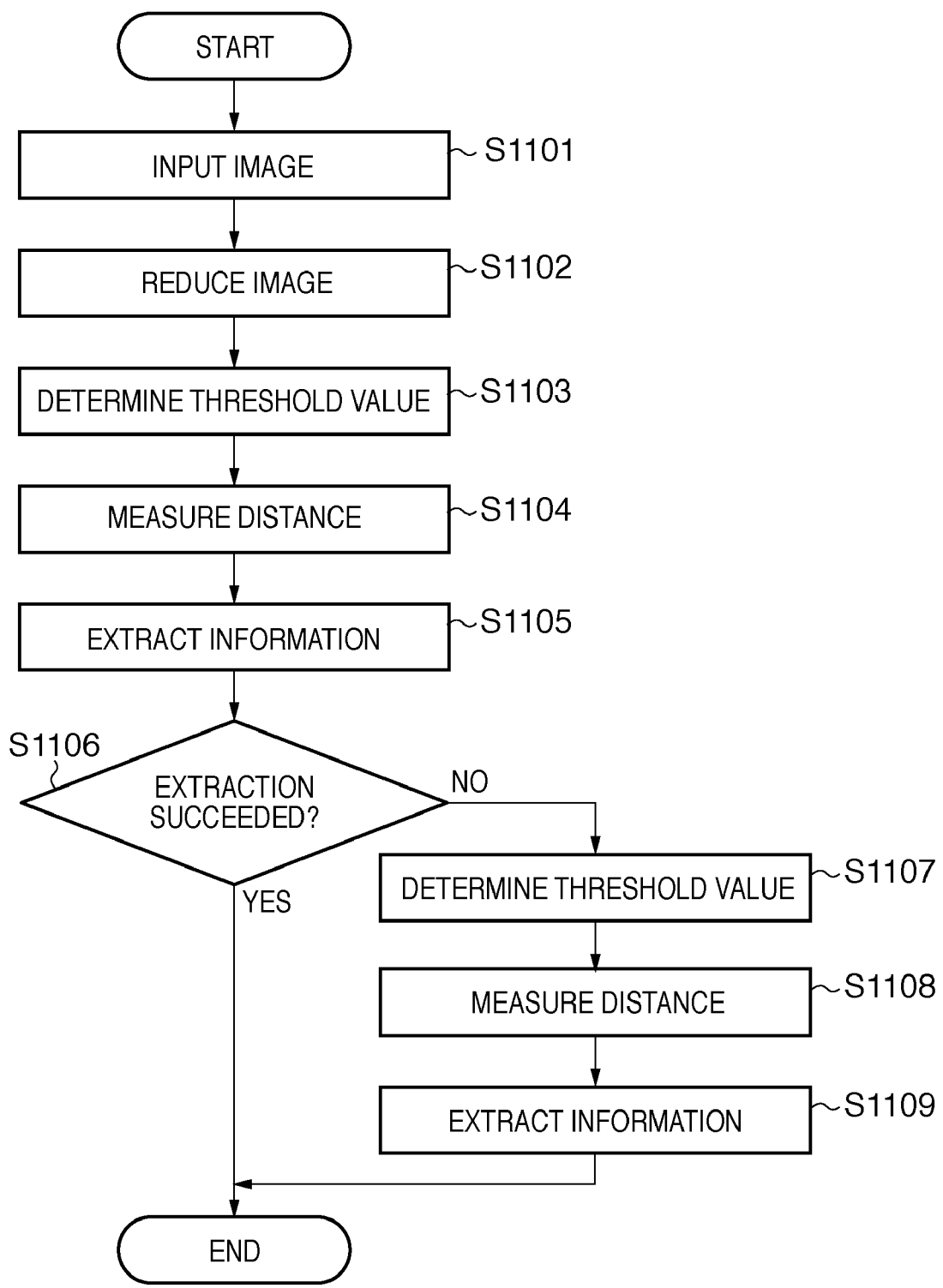
FIG. 17 is a flowchart illustrating the operation of the image processing apparatus according to the second embodiment.

FIG. 17 is a flowchart illustrating the operation of the image processing apparatus 1011 according to the second embodiment. The following sequence is triggered by, for example, an image reading instruction input by the user via the operation unit 111.

In step S1101, the image input unit 101 receives, from a scanner, the image data I corresponding to a document image having watermark information and supplies the image data I to the image reduction unit 102.

In step S1102, the image reduction unit 102 reduces the image data I received from the image input unit 101 in the horizontal and vertical directions to generate reduced image data Ish in the horizontal direction and reduced image data Isv in the vertical direction. The image reduction unit 102 supplies the reduced image data Ish and Isv to the information extraction unit 103.

Note that the number of horizontal pixels of the reduced image data Ish is W1 (1<W1<W0), and the number of vertical pixels is H0. The number of horizontal pixels of the reduced image data Isv is W0, and the number of vertical pixels is H1 (1<H1<H0). The reduction ratio in generating the reduced images Ish and Isv is preferably determined on the basis of resolution information detected from the input image data.

In step S1103, the threshold value determination unit 104 obtains threshold values Th_min and Th_max using the reduced image data Ish supplied from the image reduction unit 102.

Figure 12:
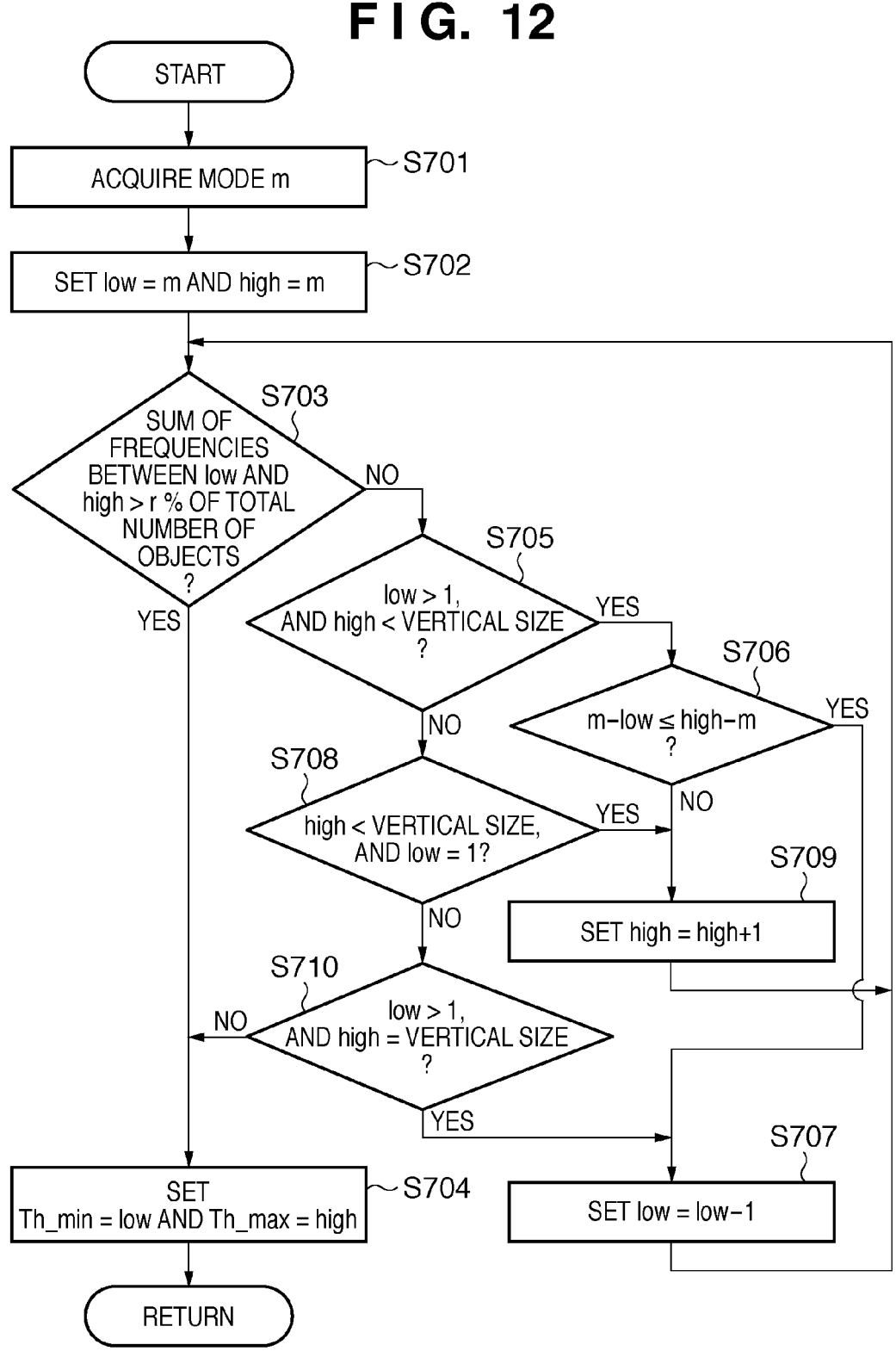
FIG. 12 is a flowchart illustrating details of threshold value determination according to the second embodiment.

FIG. 12 is a flowchart illustrating details of threshold value determination according to the second embodiment. Note that the threshold value determination unit 104 executes the following process.

In step S701, the threshold value determination unit 104 scans the reduced image data Ish once in a direction perpendicular to the reduction direction. The frequency distribution of the number of continuous significant pixels (black pixels in this case) representing objects corresponding to character strings is obtained. A mode m is obtained from the frequency distribution.

Figure 13:
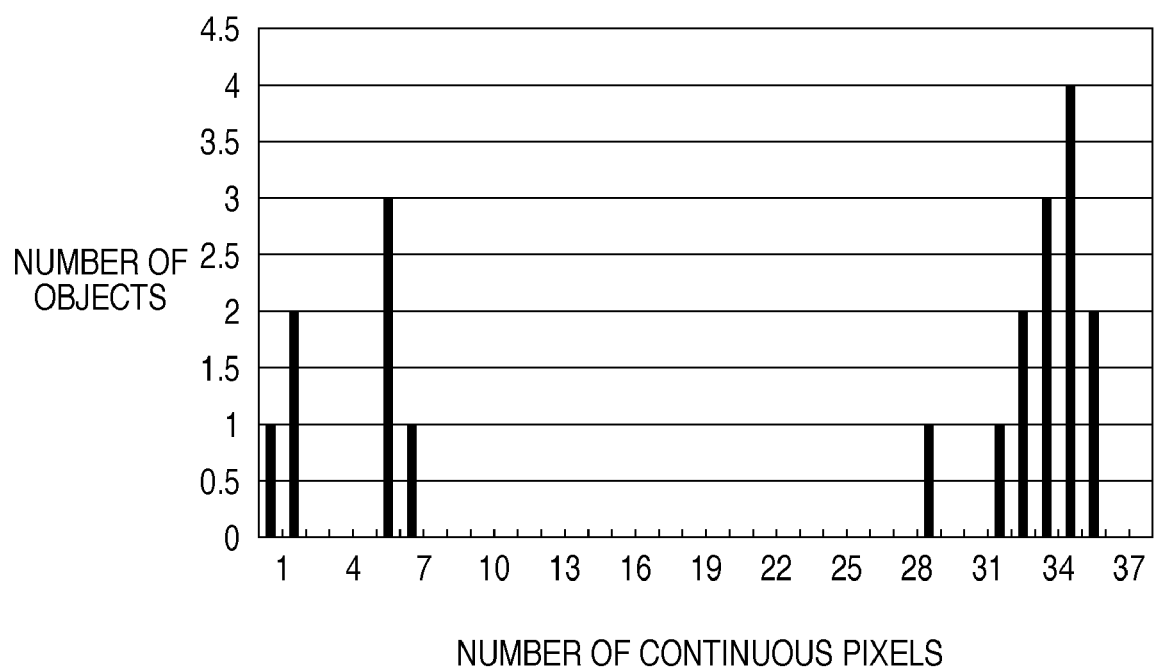
FIG. 13 is a graph showing the frequency distribution of the number of continuous pixels.

FIG. 13 is a graph showing the frequency distribution of the number of continuous pixels. Referring to FIG. 13, the abscissa represents the number of continuous black pixels, and the ordinate represents the number of objects having the number of pixels. Note that the mode is a value on the abscissa at which the frequency is maximized in the frequency distribution.

In the following steps, the lower threshold value Th_min and the upper threshold value Th_max are determined such that the number of objects falls within a predetermined ratio r % of the total number of objects in the vicinity of the mode m. The value r can be either set in advance or input by the user every time. A case will be described here in which the threshold values Th_max and Th_min which are almost equidistantly separated from the mode m on the abscissa of the frequency distribution are determined.

In step S702, low=m, and high=m are set as initial values. In this case, "low" and "high" are threshold value candidates corresponding to the abscissa of the frequency distribution.

In step S703, the threshold value determination unit 104 determines whether the sum of frequencies between the black pixel count "low" and the black pixel count "high" exceeds r % of the whole frequency. If YES in step S703, the process advances to step S704. If NO in step S703, the process advances to step S705.

In step S704, the value "low" is set in Th_min, and the value "high" is set in Th_max. The process is ended.

In step S705, the threshold value determination unit 104 determines whether the value "low" is larger than 1, and the value "high" is smaller than the vertical size of the image. If YES in step S705, the process advances to step S706. If NO in step S705, the process advances to step S708.

In step S706, the threshold value determination unit 104 determines whether m−low≦high−m. If YES in step S706, the process advances to step S707. If NO in step S706, the process advances to step S709.

In step S707, the value "low" is decremented by one and set. Then, the process returns to step S703.

In step S708, the threshold value determination unit 104 determines whether the value "high" is smaller than the number of pixels corresponding to the vertical size of the image, and low=1. If YES in step S708, the process advances to step S709. If NO in step S708, the process advances to step S710.

In step S709, the value "high" is incremented by one and set. Then, the process returns to step S703.

In step S710, the threshold value determination unit 104 determines whether the value "low" is larger than 1, and the value "high" equals the vertical size of the image. If YES in step S710, the process advances to step S707. If NO in step S710, the process advances to step S704. The process advances from step S710 to step S704 when low=1, and high=vertical size of image. This situation occurs only when r=100.

The above-described process continues until the threshold value determination unit 104 determines in step S703 that the sum of frequencies exceeds r % of the whole frequency while alternately extending the upper and lower limits of the threshold value range on both sides of the mode. When r is set to 65, and the above-described threshold value determination process is executed for the above-described distribution shown in FIG. 13, m=35 is set. Th_min=29, and Th_max=36 are derived.

In the calculation of the above-described threshold value determination, the threshold value is sensitive to the value r. For example, when r is incremented from 65 to 66 in FIG. 13, the derived Th_min largely changes from 29 to 7. For this reason, the calculation is executed for several values r to obtain sets of Th_min and Th_max. A value r which largely changes Th_min or Th_max is searched for. If the value r that largely changes the threshold value exists, Th_min or Th_max corresponding to the value r immediately before the change may be regarded as a determined threshold value. This process enables more accurately determining the threshold value.

In step S701 described above, the frequency distribution of the number of continuous pixels is derived by performing scanning once. However, to more accurately derive the threshold value, the frequency distribution may be obtained based on the results of a plurality of number of times of scanning, and the mode may be derived.

In step S1104, the information extraction unit 103 measures the length (line spacing) between character string regions using one of the reduced image data supplied from the image reduction unit 102. As a characteristic feature of this process, only an object having the number of continuous pixels (distance) between the threshold values Th_min and Th_max derived in step S1103 is used. That is, significant pixel portions outside the range between the threshold values Th_min and Th_max (outside the threshold value range) are regarded as noise components. In this case, the measurement is done for the reduced image data Ish reduced in the horizontal direction. As a detailed measurement method, that described in the first embodiment is usable.

However, if the number of continuous significant pixels derived based on a detected inverting position is smaller than Th_min or larger than Th_max, the inverting position is skipped. That is, only an object whose number of continuous significant pixels is larger than Th_min and smaller than Th_max is regarded as a significant object.

Figure 18A:
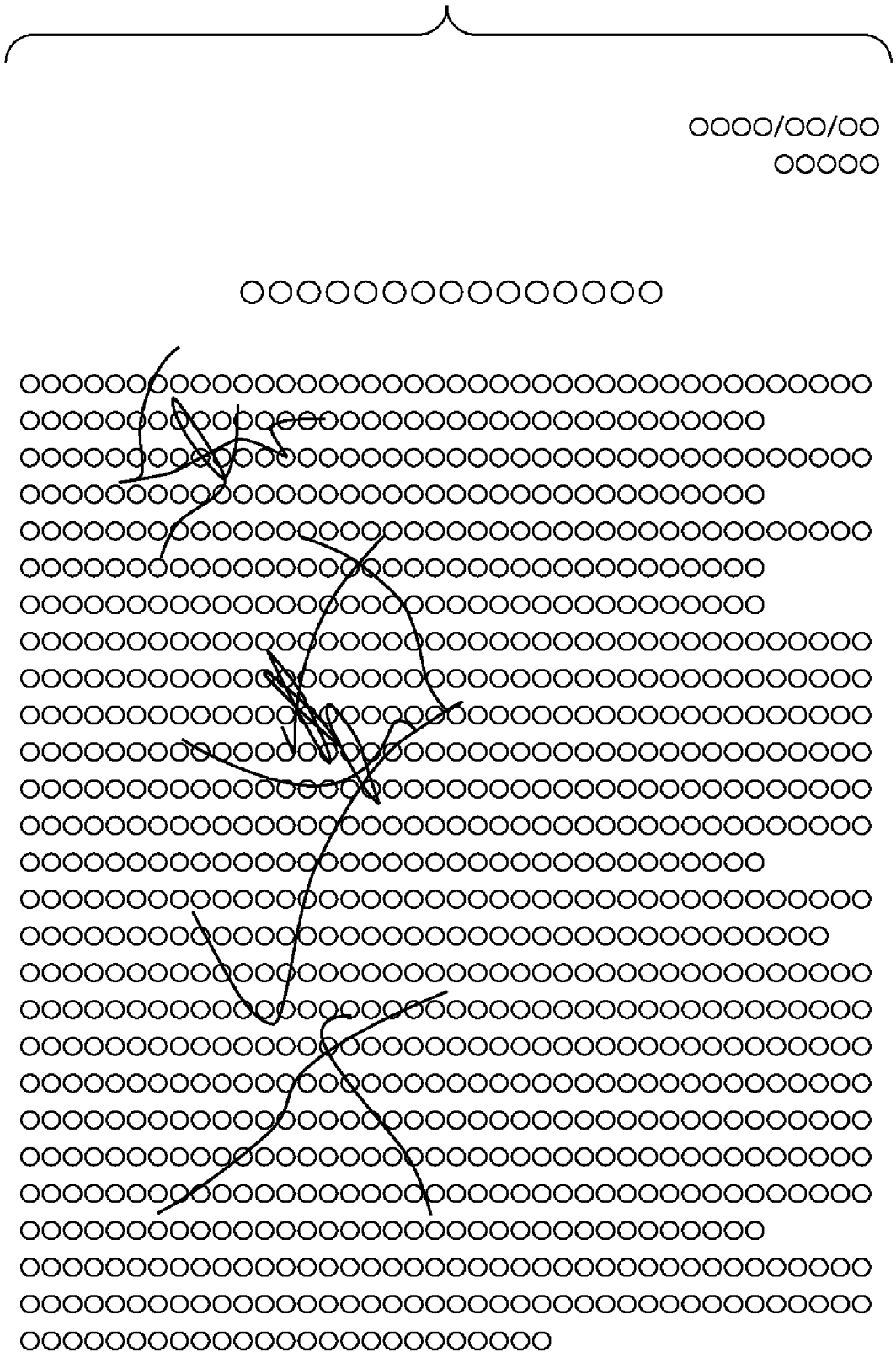
FIGS. 18A and 18B are views respectively showing a document image including an additional handwriting and a state in which a reduced image Ish of the document image is scanned.
Figure 18B:
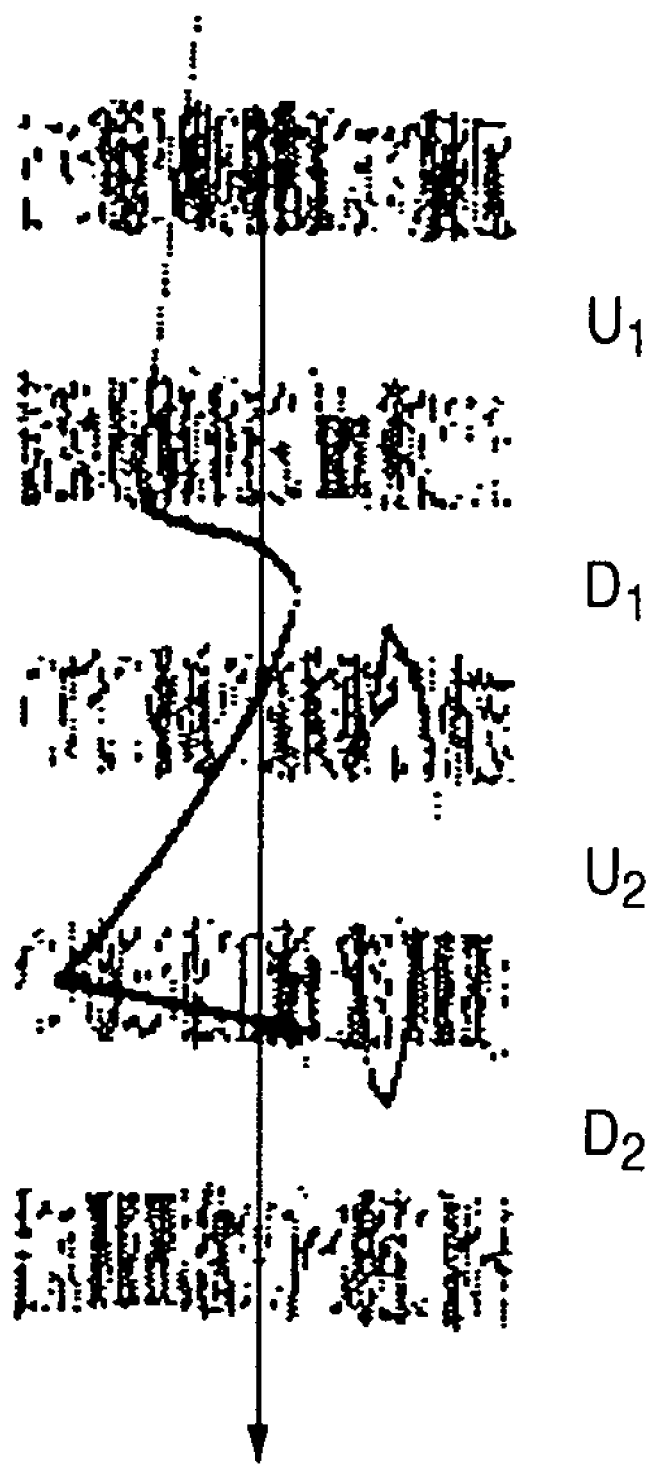

FIGS. 18A and 18B are views respectively showing a document image including an additional handwriting and a state in which the reduced image data (Ish) of the document image is scanned. In FIG. 18A, each character in the document image is expressed as "○". In FIG. 18B, a handwritten character which crosses a line spacing $D_1$ is detected as significant pixels upon scanning. However, the number of continuous significant pixels corresponding to the handwritten portion is smaller (shorter) than the threshold value Th_min. For this reason, it is not regarded as a significant object and is therefore discarded.

In step S1105, the information extraction unit 103 derives watermark information based on the line spacings derived in step S1103. More specifically, watermark information is calculated in correspondence with the embedding algorithm preset in the information extraction unit 103. For example, in FIG. 6, watermark information is derived as "10 (binary)" because $U_1<D_1$, and $U_2>D_2$.

However, if measurement is done for the reduced image data Ish indicated by 4c in step S1103, it is impossible to measure the distance between objects. Hence, it is impossible to extract a watermark image in step S1104. This is because the image data I rotated by 90° is input in step S1101, and therefore, the reduced image data Ish is generally a solid black image.

In step S1106, the control unit 110 determines whether information extraction in step S1105 has succeeded. In determining whether information extraction has succeeded, for example, if $U_n$ and $D_n$ are measured, it is determined that information extraction has succeeded. If $U_n$ and $D_n$ are not measured, it is determined that information extraction has failed. Alternatively, if a value except those defined by the preset embedding algorithm is detected, it is determined that information extraction has failed. The determination may be done by determining, for the reading result, detection/undetection of an error designated in advance.

In step S1107, the threshold value determination unit 104 obtains the threshold values Th_min and Th_max using the other reduced image data (Isv) supplied from the image reduction unit 102. The derivation method is the same as in step S1103, and a description thereof will not be repeated.

In step S1108, the information extraction unit 103 measures the length (line spacing) between character string regions using the reduced image data Isv supplied from the image reduction unit 102. In this case, the measurement is done for the reduced image data Isv (second reduced image data) reduced in the vertical direction. The detailed measurement method is the same as in step S1104. Note that the information extraction unit 103 detects the presence/absence of significant pixels by scanning the reduced image data Isv in a direction (horizontal direction in this case) perpendicular to the reduction direction (vertical direction in this case) (FIG. 9).

In this example, scanning is performed in the vertical direction in step S1104 and in the horizontal direction in step S1108. However, scanning may be performed in the horizontal direction in step S1104 and in the vertical direction in step S1108. The two directions (first and second directions) preferably intersect at a right angle. However, they need not always intersect at a right angle and may interest with a slight tilt. For example, the directions may intersect at 85° or 95°. That is, the first and second directions preferably intersect at a right angle for a simpler arrangement of the embodiment. However, they need only have a predetermined relationship that ensures approximate orthogonality.

In step S1109, the information extraction unit 103 derives watermark information based on the line spacings derived in step S1108. The detailed measurement method is the same as in step S1105.

The image processing apparatus 1011 extracts watermark information from the image data I in accordance with the above-described operation sequence.

As described above, according to the image processing apparatus of the second embodiment, it is possible to accurately extract information even from document image data containing noise by additional writing, creases, or copy.

Third Embodiment

In the third embodiment, an operation example of a threshold value determination unit different from the second embodiment will be described. That is, an example in which only the operation corresponding to FIG. 12 described in the second embodiment is different will be described. The remaining processes are the same as in the second embodiment, and a description thereof will not be repeated.

In the second embodiment, Th_max and Th_min which are almost equidistantly separated from the mode m on the abscissa of the frequency distribution are determined. In this method, however, the threshold value range sometimes becomes wider more than necessary depending on the frequency distribution. In the third embodiment, whether a frequency for a predetermined black pixel exists is determined, and a threshold value is set at the position where the frequency exists. This prevents the threshold value range from becoming wider than necessary.

Figure 14:
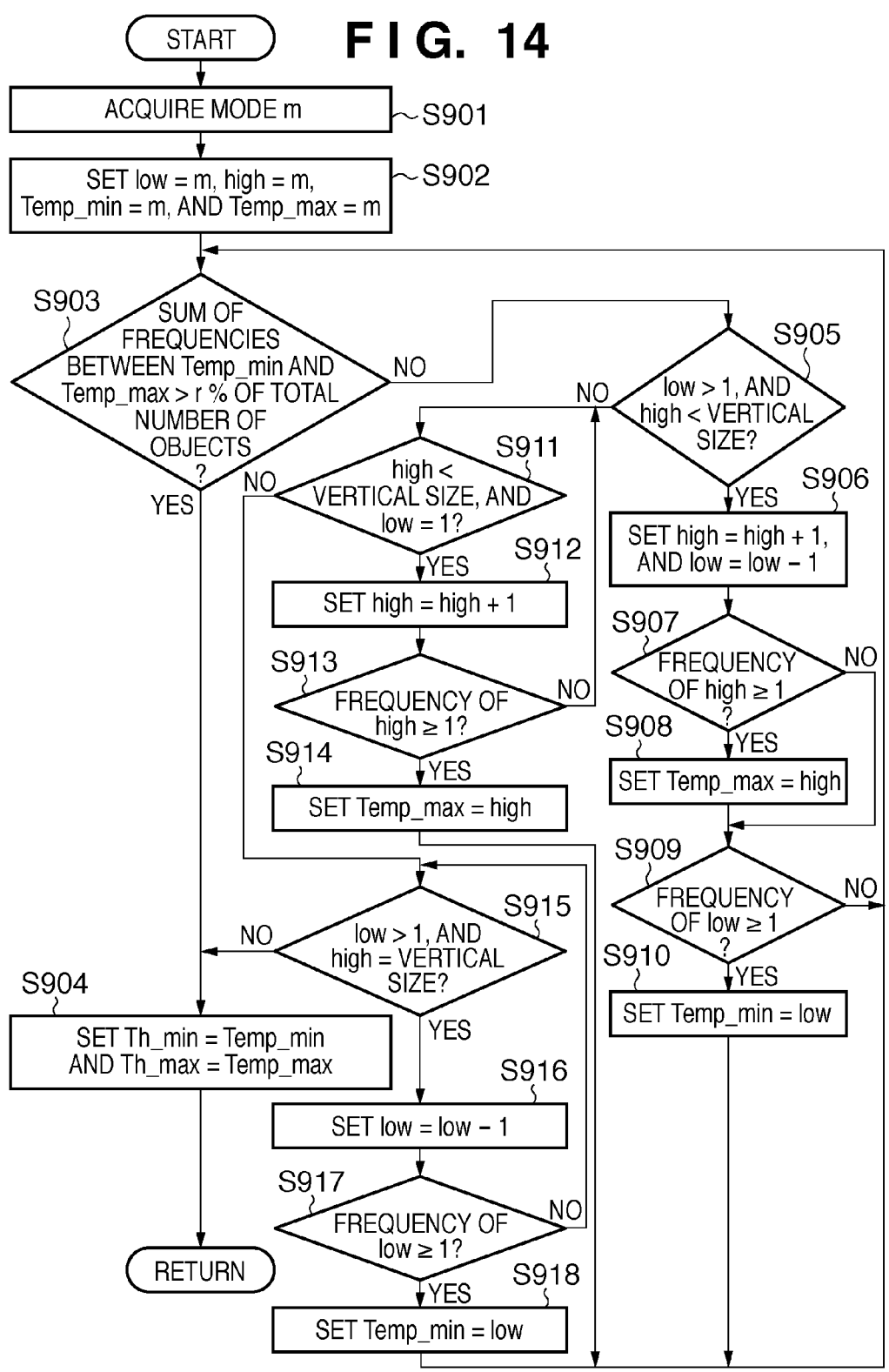
FIG. 14 is a flowchart illustrating details of threshold value determination according to the third embodiment.

FIG. 14 is a flowchart illustrating details of threshold value determination according to the third embodiment. Note that a threshold value determination unit 104 executes the following process.

In step S901, the threshold value determination unit 104 scans reduced image data Ish once in a direction perpendicular to the reduction direction, thereby obtaining the frequency distribution of the continuous pixels of an object formed from black pixels. A mode m is obtained from the frequency distribution.

In the following steps, a lower threshold value Th_min and an upper threshold value Th_max are determined such that the number of objects falls within a predetermined ratio r % of the total number of objects in the vicinity of the mode m. The value r can be either set in advance or input by the user every time.

In step S902, low=m, high=m, Temp_min=m, and Temp_max=m are set as initial values. In this case, "low" and "high" are variables for threshold value search, and Temp_min and Temp_max are threshold value candidates corresponding to the abscissa of the frequency distribution.

In step S903, the threshold value determination unit 104 determines whether the sum of frequencies between the Temp_min and Temp_max exceeds r % of the whole frequency. If YES in step S903, the process advances to step S904. If NO in step S903, the process advances to step S905.

In step S904, the value Temp_min is set in Th_min, and the value Temp_max is set in Th_max. The process is ended.

In step S905, the threshold value determination unit 104 determines whether the value "low" is larger than 1, and the value "high" is smaller than the vertical size of the image. If YES in step S905, the process advances to step S906. If NO in step S905, the process advances to step S911.

In step S906, the value "high" is incremented by one, and the value "low" is decremented by one.

In step S907, the threshold value determination unit 104 determines whether the frequency corresponding to the value "high" is 1 or more. If YES in step S907, the process advances to step S908. If NO in step S907, the process skips step S908 and advances to step S909.

In step S908, the value "high" is set in Temp_max, and the process advances to step S909.

In step S909, the threshold value determination unit 104 determines whether the frequency corresponding to the value "low" is 1 or more. If YES in step S909, the process advances to step S910. If NO in step S909, the process skips step S910 and returns to step S903.

In step S910, the value "low" is set in Temp_min, and the process returns to step S903.

In step S911, the threshold value determination unit 104 determines whether the value "high" is smaller than the vertical size of the image, and low=1. If YES in step S911, the process advances to step S912. If NO in step S911, the process advances to step S915.

In step S912, the value "high" is incremented by one.

In step S913, the threshold value determination unit 104 determines whether the frequency corresponding to the value "high" is 1 or more. If YES in step S913, the process advances to step S914. If NO in step S913, the process returns to step S911.

In step S914, the value "high" is set in Temp_max, and the process returns to step S903.

In step S915, the threshold value determination unit 104 determines whether the value "low" is larger than 1, and the value "high" equals the vertical size of the image. If YES in step S915, the process advances to step S916. If NO in step S915, the process advances to step S904. The process advances from step S915 to step S904 when low=1, and high=vertical size of image. This situation occurs only when r=100.

In step S916, the value "low" is decremented by one.

In step S917, the threshold value determination unit 104 determines whether the frequency corresponding to the value "low" is 1 or more. If YES in step S917, the process advances to step S918. If NO in step S917, the process returns to step S915.

In step S918, the value "low" is set in Temp_min, and the process returns to step S903.

The above-described process continues until the threshold value determination unit 104 determines in step S903 that the sum of frequencies exceeds r % of the whole frequency while alternately extending the upper and lower limits of the threshold value range on both sides of the mode.

The above-described process prevents the threshold value range from becoming wider than necessary depending on the frequency distribution. It is consequently possible to more quickly determine whether an object falls within the threshold value range in causing the information extraction unit 103 to measure the length between character string regions in step S1104.

Fourth Embodiment

In the fourth embodiment, threshold value determination by a threshold value determination unit 104 and distance measurement by an information extraction unit 103 are done not by line scanning using a single dot width but by area scanning using a rectangular window. A distance measurement process by area scanning, which is different from the second embodiment, will be described below. The remaining processes are almost the same as in the second embodiment, and a description thereof will not be repeated.

Figure 15:
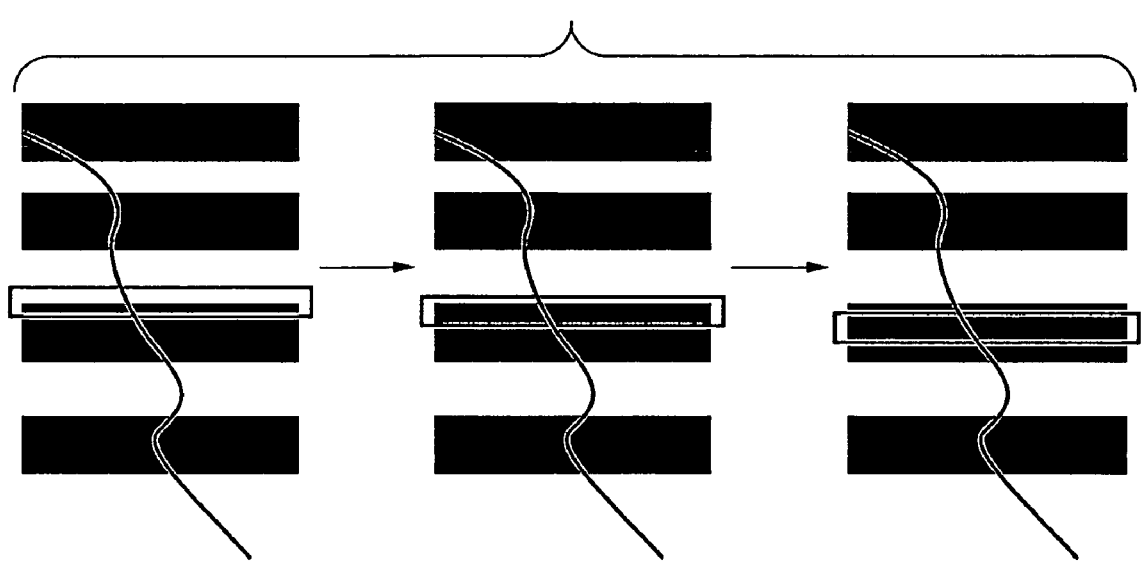
FIG. 15 is a view showing a state in which a rectangular window area-scans a reduced image Ish.
Figure 16:
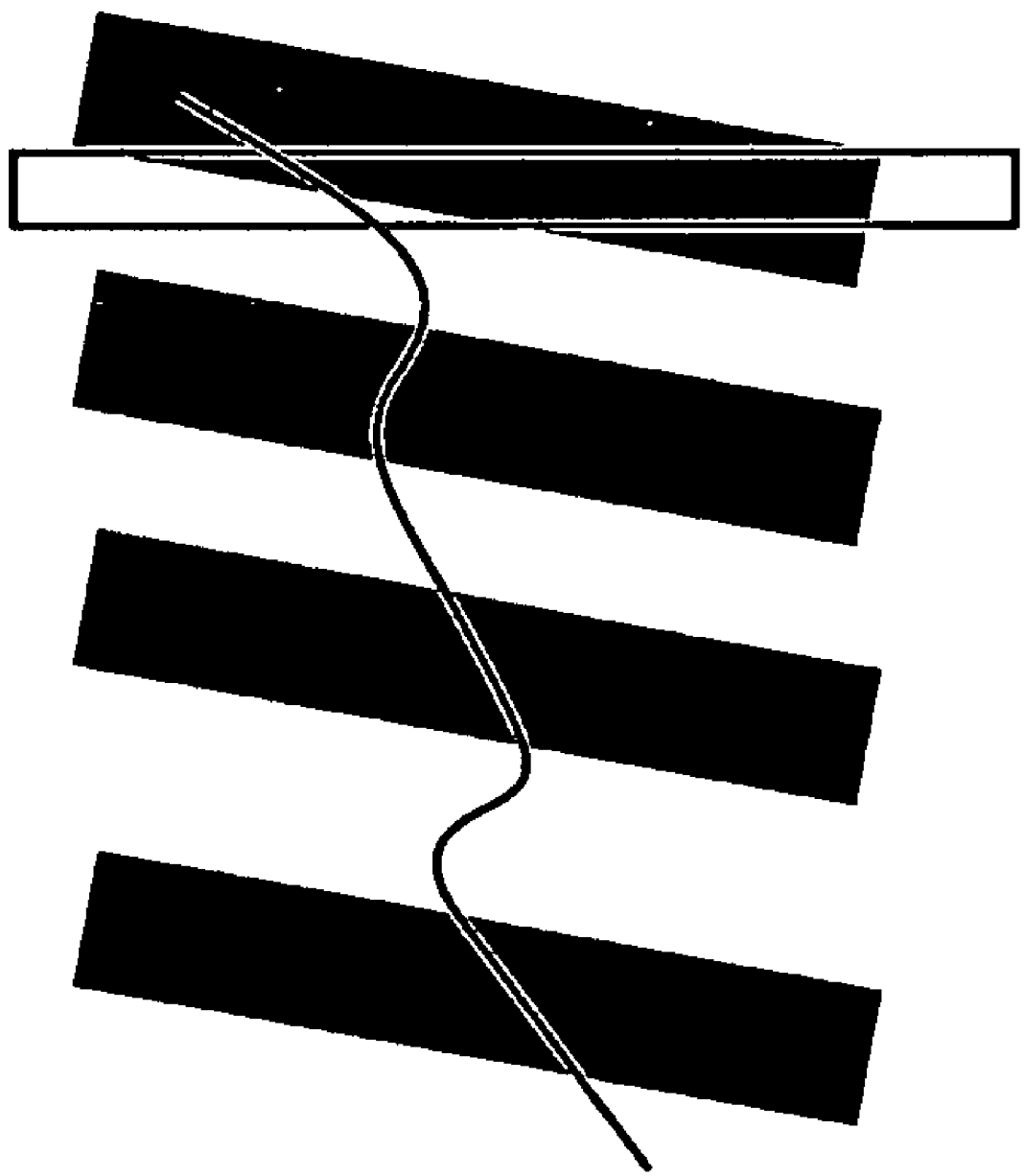
FIG. 16 is a view showing a state in which rectangular window area-scans a tilted reduced image Ish.

FIG. 15 is a view showing a state in which a rectangular window area-scans a reduced image Ish. The rectangular window has a width equal to that of the reduced image Ish and a height corresponding to several pixels. The number Hw of vertical pixels can use an arbitrary value that satisfies $1 \leq Hw$, and the number Ww of horizontal pixels can use an arbitrary value that satisfies $1 < Ww \leq W1$. The height corresponding to several pixels is ensured to measure the distance between objects even when an original document image has a tilt, as shown in FIG. 16. However, any rectangular window having a width of at least two pixels and a height of at least one pixel can execute the process to be described later.

The threshold value determination unit 104 determines a threshold value Th_min given by $$Th\_min = r/100 * (\text{total number of pixels in rectangular window})$$

where r is the ratio (%) to the total number of pixels in the rectangular window. The value r can be either set in advance or input by the user every time.

When the number of significant pixels (black pixels in this case) in the window is larger than the value Th_min (the number of pixels), the threshold value determination unit 104 determines that the window is located at the position of an object. Area scanning is performed while shifting the rectangular window by one pixel from the upper side to the lower side relative to the reduced image Ish, as shown in FIG. 15. The above-described determination of the presence/absence of an object is executed for each position during area scanning. A position where the presence/absence of significant pixels is inverted is determined as the boundary between a character string region and a line spacing region.

After the area scanning, the distance between objects is derived, and information is extracted based on the coordinates of each determined boundary.

As described above, according to the image processing apparatus of the fourth embodiment, it is possible to more accurately or more quickly extract watermark information by using area scanning. In particular, it is possible to accurately extract information even from document image data containing noise by additional writing, creases, or copy.

(Modification)

In measuring the distance between objects by scanning using a rectangular window, object determination may be done independently in the horizontal direction of the rectangular window. That is, line scanning may be executed simultaneously in correspondence with the width of the rectangular window. For example, when the rectangular window has a width corresponding to 10 pixels, 10 boundary coordinate values may be determined. Assume that 21, 19, 20, 21, 20, 20, 21, 20, 19, and 21 are coordinates determined as positions where the presence/absence of a significant pixel is inverted (e.g., from a black pixel to a white pixel). The rectangular window is shifted by one pixel in the vertical direction of the reduced image Ish, and the above-described process is repeated.

33, 32, 33, 31, 30, 30, 32, 33, 30, and 32 are coordinates determined as positions where the presence/absence of a significant pixel is inverted (i.e., from a white pixel to a black pixel).

In this case, the coordinate value differences are averaged to obtain the distance between objects. In the above example, $((33-21)+(32-19)+(33-20)+(31-21)+(30-20)+(30-20)+(32-21)+(33-20)+(30-19)+(32-21))/10=11.4$ The distance between objects is calculated as 11.4. The value may be rounded to an integer "11" and determined as the distance between objects.

This arrangement enables to satisfactorily measure the distance between objects even in the tilted reduced image Ish as in FIG. 16.

Fifth Embodiment

An image processing apparatus according to the fifth embodiment of the present invention will be described below, which causes an image reading apparatus (scanner) to read a paper document and extracts watermark information from the read document image data. The description will be made assuming that the watermark information embedding algorithm is the same as in the first embodiment.

<Apparatus Arrangement>

Figure 19:
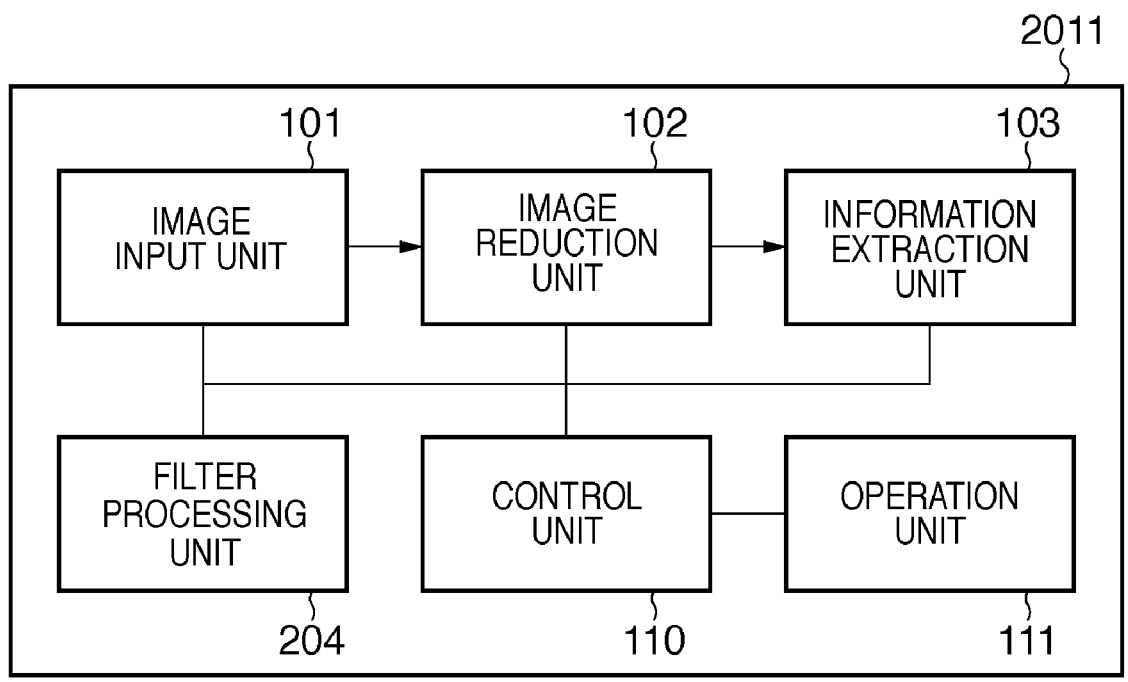
FIG. 19 is a block diagram showing the main functional arrangement of an image processing apparatus 11 according to the fifth embodiment.

FIG. 19 is a block diagram showing the main functional arrangement of an image processing apparatus 2011 according to the fifth embodiment. As shown in FIG. 19, the image processing apparatus 2011 includes an image input unit 101, image reduction unit 102, information extraction unit 103, filter processing unit 204, control unit 110, and operation unit 111. The units except the filter processing unit 204 are almost the same as those in the image processing apparatus of the first embodiment, and a description thereof will not be repeated.

The filter processing unit 204 is a functional unit which executes a filtering process for image data. The filtering operation will be described later in detail.

<Operation of Apparatus>

An operation of causing the image processing apparatus 2011 to extract watermark information from image data I will be described below in detail with reference to a flowchart.

Figure 21:
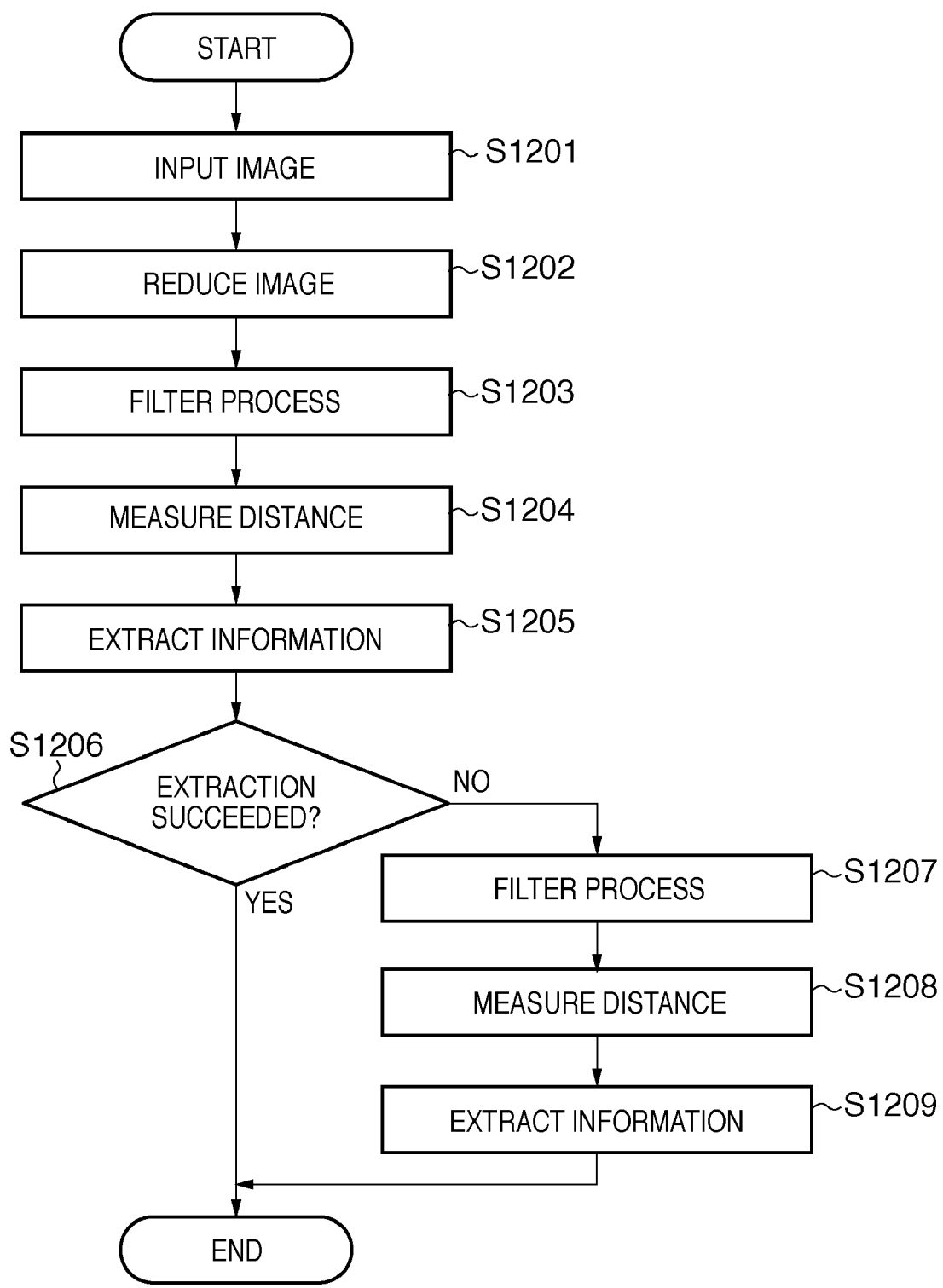
FIG. 21 is a flowchart illustrating the operation of the image processing apparatus according to the fifth embodiment.

FIG. 21 is a flowchart illustrating the operation of the image processing apparatus 2011 according to the fifth embodiment. The following sequence is triggered by, for example, an image reading instruction input by the user via the operation unit 111.

In step S1201, the image input unit 101 receives, from a scanner, the image data I corresponding to a document image having watermark information and supplies the image data I to the image reduction unit 102.

In step S1202, the image reduction unit 102 reduces the image data I received from the image input unit 101 in the horizontal and vertical directions to generate reduced image data Ish in the horizontal direction and reduced image data Isv in the vertical direction. The image reduction unit 102 supplies the reduced image data Ish and Isv to the filter processing unit 204.

Note that the number of horizontal pixels of the reduced image data Ish is W1 (1<W1<W0), and the number of vertical pixels is H0. The number of horizontal pixels of the reduced image data Isv is W0, and the number of vertical pixels is H1 (1<H1<H0). The reduction ratio in generating the reduced images Ish and Isv is preferably determined on the basis of resolution information detected from the input image data.

Note that only a binarization process in step S1203 (to be described later) may be executed without executing a process of changing a portion calculated as halftone into a significant pixel in step S1202.

In step S1203, the filter processing unit 204 executes the filtering process to be described below for the reduced image data Ish.

Figure 27:
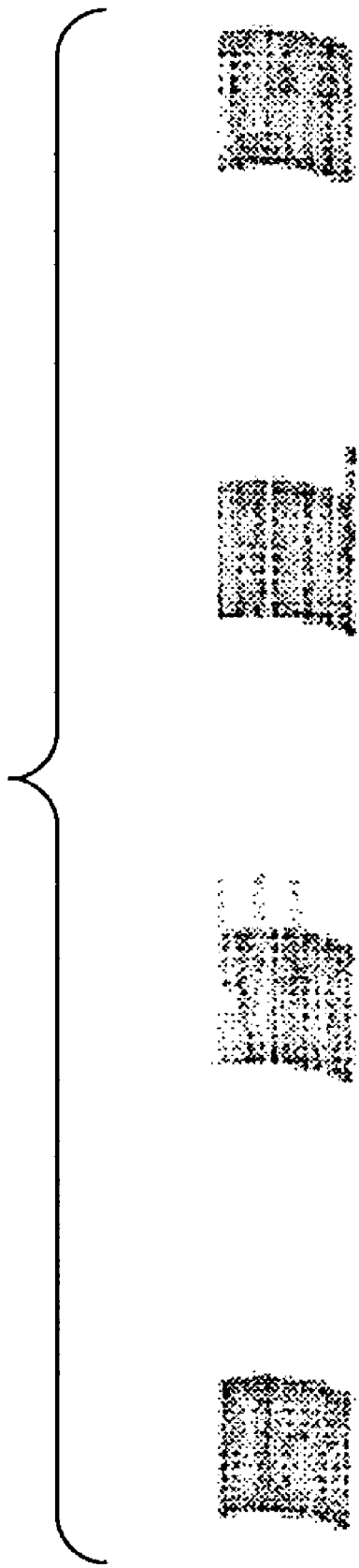
FIG. 27 is a view showing reduced image data Ish generated from a document image containing alphabetical letters.

FIG. 27 is a view showing the reduced image data Ish generated from a document image containing alphabetical letters. As a phenomenon unique to a document image containing alphabetical letters, a non-object-height region appears on the upper or lower side of a line object of a reduced image, as shown in FIG. 27. This results from the following three features of English texts.

(1) The first letter of each sentence is written in uppercase, and the remaining letters are in lowercase.

(2) Some letters such as "b" and "d" have a portion (called an ascender) projecting upward from the height of other letters.

(3) Some letters such as "g" and "j" have a portion (called an descender) projecting downward from the baseline.

If such a non-object-height portion exists, the line object height varies between a portion having a non-object-height portion and a portion without a non-object-height portion. This produces an error in obtaining a line spacing. To prevent this, the filter processing unit 204 executes filter processes 1 and 2.

1. Smoothing Filter (Low-Pass Filter) Process

A smoothing filter is applied to complement pixels between non-object-height portions. As the smoothing filter, a median filter is used in this embodiment. The median filter normally has a filter (window) size corresponding to 3×3 or 5×5 around a pixel of interest. The filter checks the pixel distribution in the filter size and sets the median to the new pixel value of the pixel of interest.

2. Binarization Process

The image that has undergone the smoothing is generally not a binary image but a multi-tone grayscale image. To convert a gray portion into black, a binarization process is executed to convert all pixels except white pixels into black pixels. Assume that the pixel value of a white pixel is 255, and that of a black pixel is 0 in an 8-bit grayscale image. In this case, the binarization process is performed in accordance with a rule:

when the pixel value is 0, ->0 when the pixel value is larger than 0, ->1

Figure 28:
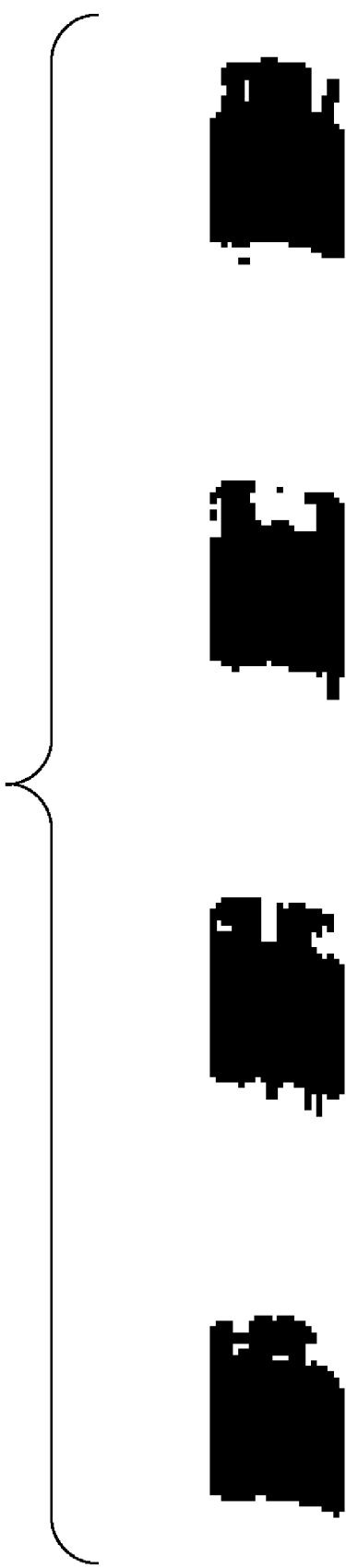
FIG. 28 is a view showing a result obtained by executing a smoothing filter process and a binarization process for the reduced image data Ish.

FIG. 28 is a view showing a result obtained by executing the smoothing filter process and the binarization process for the reduced image data Ish shown in FIG. 27. As is apparent from FIG. 28, the smoothing filter process and the binarization process allow to obtain an image having a clearer character string corresponding portion even when a non-object-height portion exists.

In step S1204, the information extraction unit 103 measures the length (line spacing) between character string regions using one of the reduced image data supplied from the filter processing unit 204. In this case, the measurement is done for the reduced image data Ish reduced in the horizontal direction. The measurement method will be described below in detail.

As described above, upon the reduction process in step S1202, the character string regions are reduced in the character array direction, and simultaneously, the halftone portions are converted into significant pixels. This increases the density of significant pixels (black in this case) in each character string region. As a result, the information extraction unit 103 can more accurately detect the boundary between a character string region and a line spacing region and accurately measure each line spacing.

If an object in the reduced image data has an ideal shape (e.g., rectangular shape), as shown in FIG. 6, generally, scanning of one time suffices. However, to more accurately detect an object in the reduced image data as shown in FIG. 28, it is effective to execute scanning for the reduced image a plurality of number of times.

Figure 20:
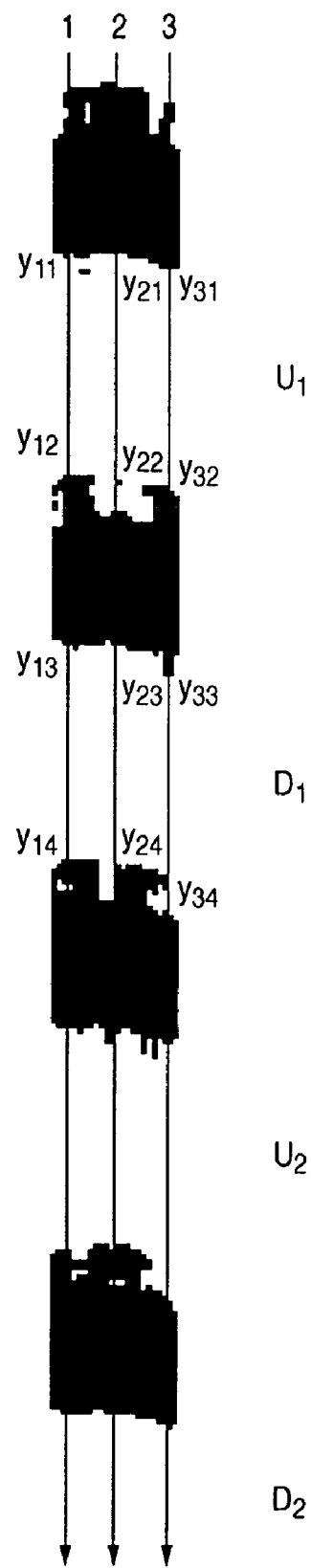
FIG. 20 is a view showing a state in which reduced image data Ish is scanned a plurality of number of times.

Assume that scanning is performed at three positions (arrows 1, 2, and 3), as shown in FIG. 20. Let $y_{ij}$ be the coordinate value of a point at which a black pixel changes to a white pixel, or a white pixel changes to a black pixel. As shown in FIG. 20, i is a suffix corresponding to a scanning position (arrow). For arrow 1, i=1. For arrow 2, i=2. For arrow 3, i=3. Additionally, j is a number assigned to the coordinate of each white/black conversion point sequentially from the uppermost start point where a black pixel changes to a white pixel at each scanning position. Assume that the scanning result in FIG. 20 is Arrow 1: $y_{11}=20$, $y_{12}=30$, $y_{13}=43$, $y_{14}=54$ Arrow 2: $y_{21}=18$, $y_{22}=31$, $y_{23}=44$, $y_{24}=52$ Arrow 3: $y_{31}=21$, $y_{32}=32$, $y_{33}=39$, $y_{34}=53$ Next, one of a plurality of coordinate values having identical j is selected in accordance with the following rule.

For coordinates whose j is an odd number, a maximum coordinate is selected from the plurality of coordinates having identical j and different i.

For coordinates whose j is an even number, a minimum coordinate is selected from the plurality of coordinates having identical j and different i.

That is, in a change from a black pixel to a white pixel, the lowermost point is determined as the boundary of the lower portion of the object. In a change from a white pixel to a black pixel, the uppermost point is determined as the boundary of the upper portion of the object.

The distance between objects is obtained from the selected coordinate values.

As a result, in the example shown in FIG. 20, inter-object distances $U_1$ and $D_1$ are obtained as $$U_1 = 30 - 21 = 9 [pix]$$

$$D_1 = 52 - 44 = 8 [pix]$$

$U_2$ and $D_2$ are obtained from coordinates whose j=5, 6, 7, 8 in a similar way.

In step S1205, the information extraction unit 103 derives watermark information based on the line spacings derived in step S1203. More specifically, watermark information is calculated in correspondence with the embedding algorithm preset in the information extraction unit 103. For example, assume that $U_1 = 9$ [pix], $D_1 = 8$ [pix], $U_2 = 5$ [pix], $D_2 = 10$ [pix]

Since $U_1 > D_1$, "0" is derived. Since $U_2 < D_2$, "1" is derived. That is, the watermark information is derived as "01 (binary)".

However, if measurement is done for the reduced image data Ish indicated by 4c in step S1204, it is impossible to measure the distance between objects. Hence, it is impossible to extract a watermark image in step S1205. This is because the image data I rotated by 90° is input in step S1201, and therefore, the reduced image data Ish is generally a solid black image.

In step S1206, the control unit 110 determines whether information extraction in step S1204 has succeeded. In determining whether information extraction has succeeded, for example, if $U_n$ and $D_n$ are measured, it is determined that information extraction has succeeded. If $U_n$ and $D_n$ are not measured, it is determined that information extraction has failed. Alternatively, if a value except those defined by the preset embedding algorithm is detected, it is determined that information extraction has failed. The determination may be done by determining, for the reading result, detection/undetection of an error designated in advance.

In step S1207, the filter processing unit 204 executes the filtering process described in step S1203 for the other reduced image data. In this case, the measurement is done for the reduced image data Isv (second reduced image data) reduced in the vertical direction.

In step S1208, the information extraction unit 103 measures the length (line spacing) between character string regions using the reduced image data Isv supplied from the filter processing unit 204. The detailed measurement method is the same as in step S1204. Note that the information extraction unit 103 detects the presence/absence of significant pixels by scanning the reduced image data Isv in a direction (horizontal direction in this case) perpendicular to the reduction direction (vertical direction in this case) (FIG. 9).

In this example, scanning is performed in the vertical direction in step S1204 and in the horizontal direction in step S1208. However, scanning may be performed in the horizontal direction in step S1204 and in the vertical direction in step S1208. The two directions (first and second directions) preferably intersect at a right angle. However, they need not always intersect at a right angle and may interest with a slight tilt. For example, the directions may intersect at 85° or 95°. That is, the first and second directions preferably intersect at a right angle for a simpler arrangement of the embodiment. However, they need only have a predetermined relationship that ensures approximate orthogonality.

In step S1209, the information extraction unit 103 derives watermark information based on the line spacings derived in step S1208. The detailed measurement method is the same as in step S1205.

The image processing apparatus 2011 extracts watermark information from the image data I in accordance with the above-described operation sequence.

As described above, according to the image processing apparatus of the fifth embodiment, it is possible to reliably extract information even from a document image formed from alphabetical letters or containing both Japanese and alphabetical letters.

Sixth Embodiment

In the sixth embodiment, an operation example of a filter processing unit 204 different from the fifth embodiment will be described. That is, an example in which only the operation corresponding to step S1203 described in the fifth embodiment is different will be described. The remaining processes are the same as in the first embodiment, and a description thereof will not be repeated. More specifically, in the fifth embodiment, a median filtering process is executed using a square window. In the sixth embodiment, however, the following process is executed using a window whose width equals the number of horizontal pixels of a reduced image and whose height corresponds to several pixels. The number Hw of vertical pixels can use an arbitrary value that satisfies 1≦Hw, and the number Ww of horizontal pixels can use an arbitrary value that satisfies 1<Ww≦W1.

Scanning is performed while shifting the window by one pixel relative to a reduced image Ish If at least one white pixel exists in the window, all pixels in the rectangle are sequentially converted into black pixels. That is only when all pixels in the window are white pixels, the region is regarded as a white pixel region.

Figure 22:
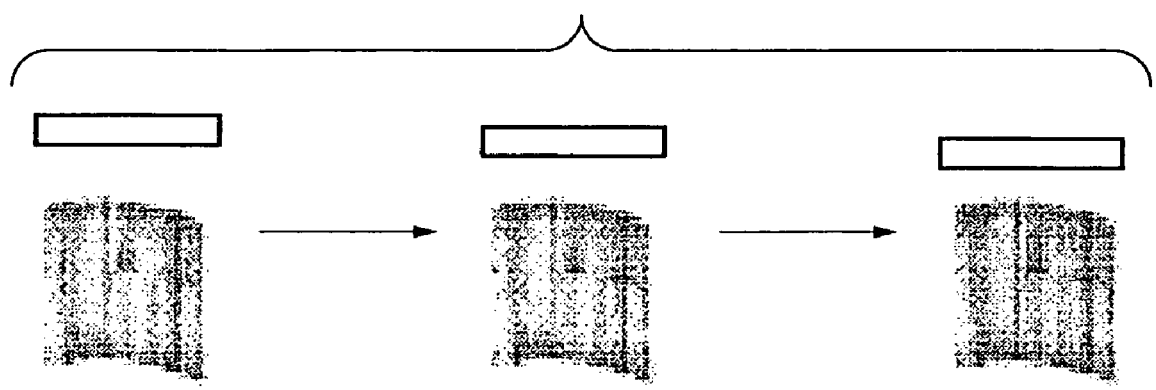
FIG. 22 is a view showing a state in which a window scans a reduced image Ish.

FIG. 22 is a view showing a state in which the window scans the reduced image Ish. FIG. 23 is a view showing a change of the reduced image upon the above-described pixel replacement process. Reduced image data before the process is shown on the left side of FIG. 23, and reduced image data after the process is shown on the right side.

The pixel replacement using a window allows acquisition of an ideal reduced image as shown in FIG. 6 even for a document image containing alphabetical letters. It is therefore possible to more accurately extract information.

Seventh Embodiment

In the seventh embodiment, an operation example of an information extraction unit 103 different from the fifth embodiment will be described. That is, an example in which only the operation corresponding to step S1204 described in the fifth embodiment is different will be described. More specifically, in the fifth embodiment, distance measurement is executed using a plurality of number of times of line scanning. In the seventh embodiment, however, the following process is executed using a window whose width equals the number of horizontal pixels of a reduced image and whose height corresponds to several pixels. The remaining processes are the same as in the fifth embodiment, and a description thereof will not be repeated.

Figure 24:
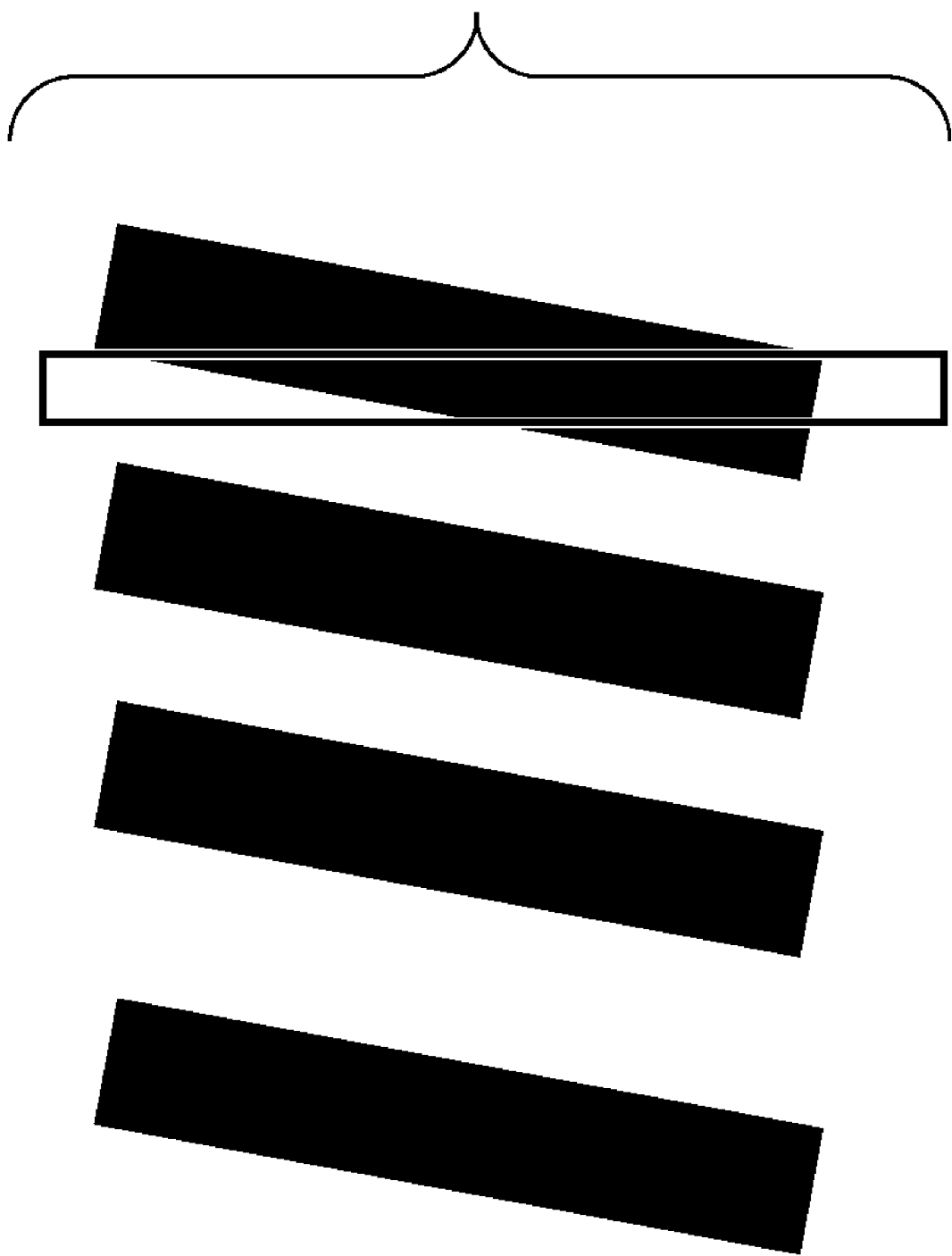
FIG. 24 is a view showing distance measurement when the document of an original image is tilted.

The height corresponding to several pixels is ensured to measure the distance between objects even when an original document image has a tilt, as shown in FIG. 24. However, any rectangular window having a width of at least 2 pixels and a height of at least 1 pixel can execute the process to be described later.

Figure 25:
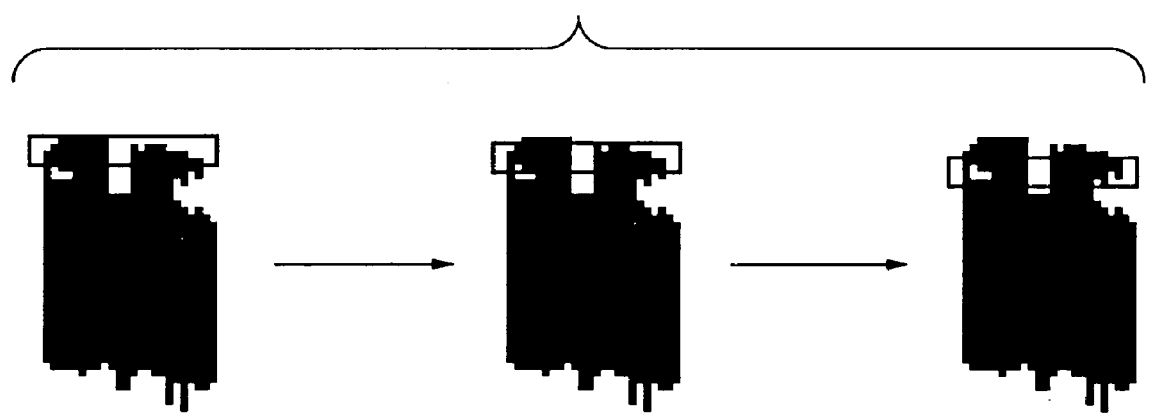
FIG. 25 is a view showing a state in which a rectangular window scans an object in a reduced image Isv.
Figure 26:
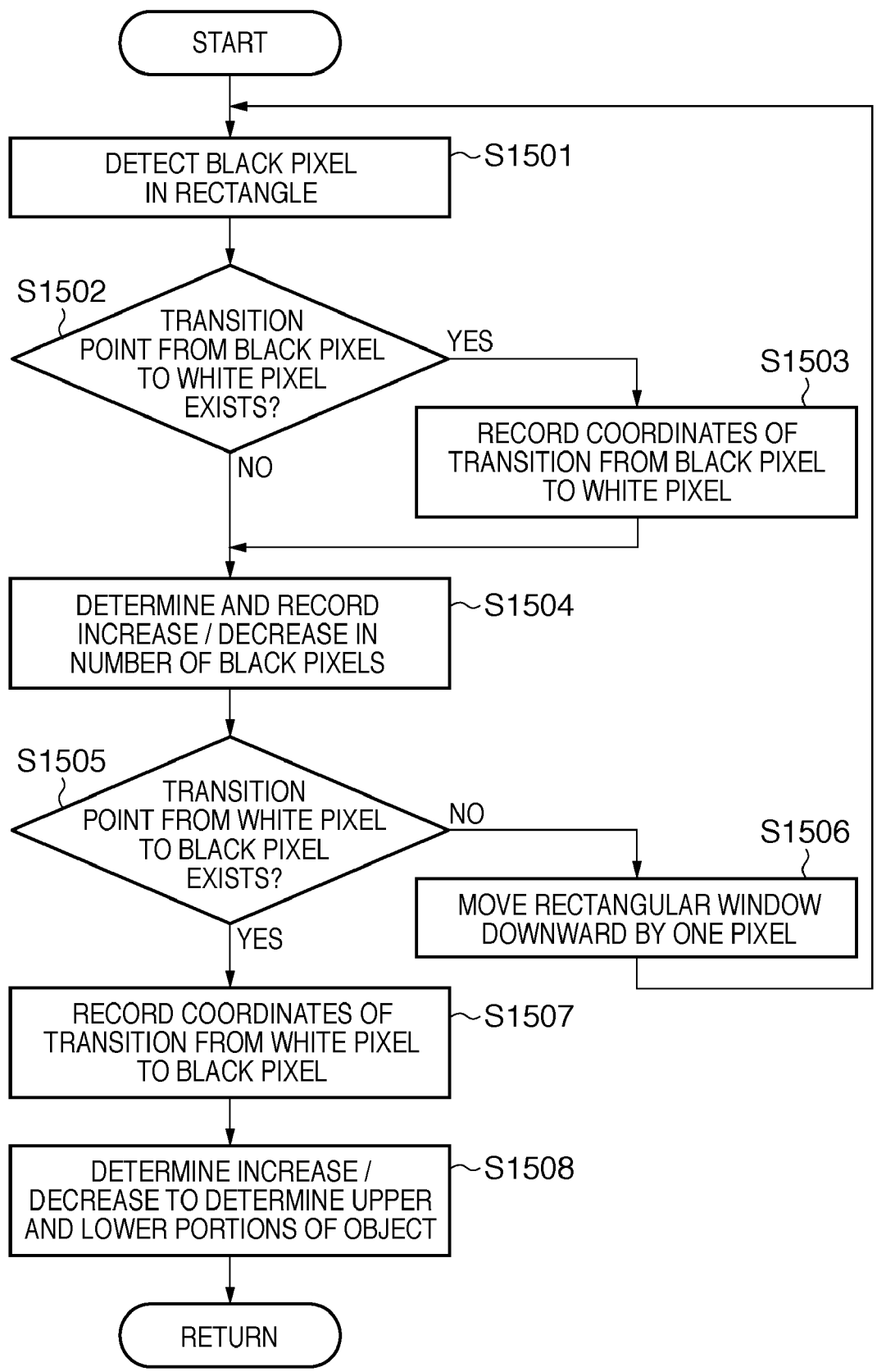
FIG. 26 is a flowchart illustrating a process of determining the coordinates of the upper and lower portions of an object using a rectangular window.

FIG. 26 is a flowchart illustrating a process of determining the coordinates of the upper and lower portions of an object using a rectangular window. FIG. 25 is a view showing a state in which a rectangular window scans an object in a reduced image Isv. The information extraction unit 103 executes the following process.

In step S1501, a significant pixel (black pixel) in the rectangular window is detected.

In step S1502, the information extraction unit 103 determines whether a boundary where transition from a black pixel to a white pixel occurs exists. That is, it is determined whether a portion (line) where a black pixel is present on the upper side, and a white pixel is present on the lower side exists in the rectangular window. If it is determined that the boundary exists, the process advances to step S1503. Otherwise, the process advances to step S1504.

In step S1503, the detected portion is determined as an object start position candidate, and the vertical coordinate value of the current window position is recorded. For example, when the number of horizontal pixels of the rectangular window is 10, 10 coordinates 21, 19, 20, 21, 20, 20, 21, 20, 19, and 21 are recorded as the coordinates of portions where transition from a black pixel to a white pixel occurs.

In step S1504, the information extraction unit 103 determines whether the number of black pixels increases or decreases downward and records the result.

In step S1505, the information extraction unit 103 determines whether a boundary where transition from a white pixel to a black pixel occurs exists. If it is determined that the boundary exists, the process advances to step S1507. Otherwise, the process advances to step S1506.

In step S1506, the rectangular window is moved downward by one pixel, and the process returns to step S1501.

In step S1507, the detected portion is determined as an object end position candidate, and the vertical coordinate value of the current window position is recorded. For example, when the number of horizontal pixels of the rectangular window is 10, 10 coordinates 33, 32, 33, 31, 30, 30, 32, 33, 30, and 32 are recorded as the coordinates of portions where transition from a white pixel to a black pixel occurs.

In step S1508, the information extraction unit 103 determines the increase or decrease in the number of black pixels recorded in step S1504. When the number of black pixels increases in the section from the object start position candidate to the end position candidate and then decreases, the object is determined as a significant object. At this time, of the candidate points obtained in steps S1503 and S1505, the coordinate value of the uppermost portion of the start positions and the coordinate value of the lowermost portion of the end positions are determined as the start and end positions of the object, respectively. In the above example, the start position of the object is 19, and the end position is 33.

The above-described object position determination using a window makes it possible to more accurately extract information even from a document image including alphabetical letters.

Eighth Embodiment

In the eighth embodiment, a case will be described in which embedded watermark information is extracted based on the interval between the baselines of character strings in a document image, unlike the above-described embodiments.

Figure 29:
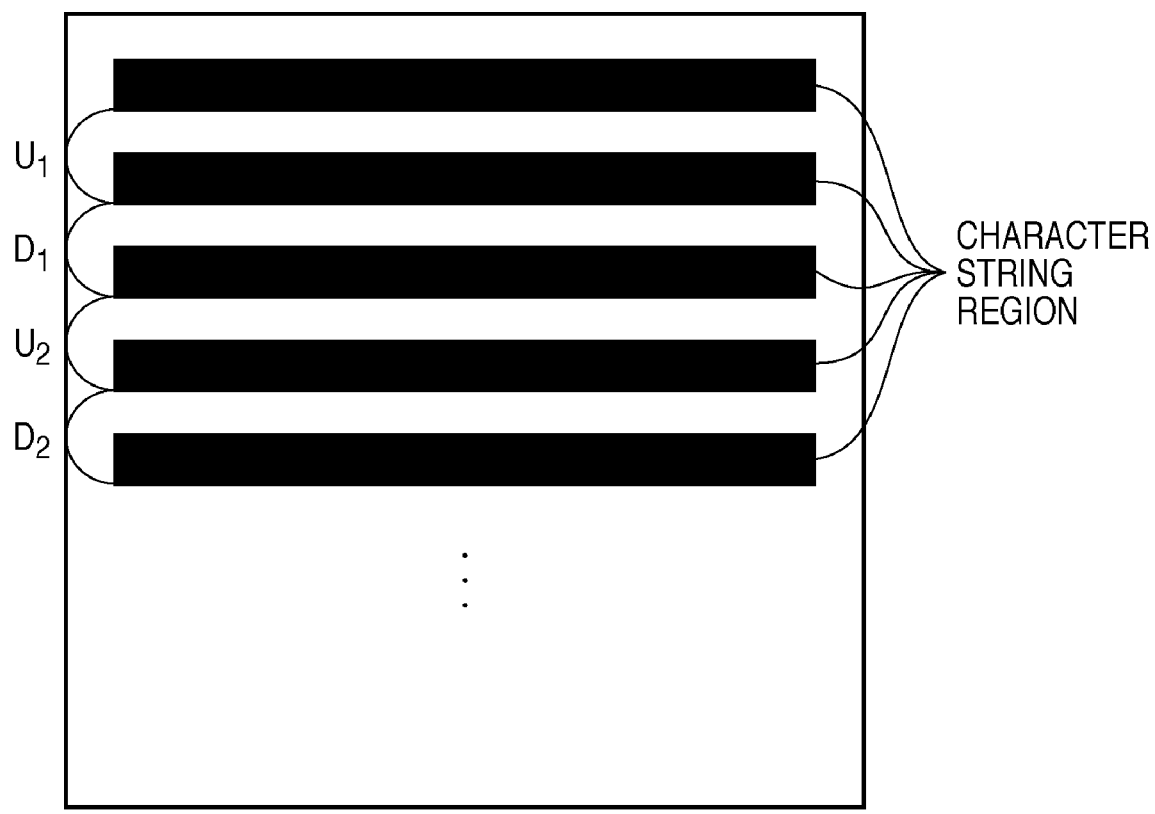
FIG. 29 is a view showing a document in which watermark information is embedded based on the baseline interval.

FIG. 29 is a view showing a document in which watermark information is embedded based on the baseline interval. $U_1$, $D_1$, $U_2$, and $D_2$ indicate intervals between baselines. The other embedding rules are the same as in the fifth embodiment. A filtering process corresponding to step S1203 of the fifth embodiment is executed in the same way.

An operation example of an information extraction unit 103 will be described below. More specifically, a process using a window whose width equals the number of horizontal pixels of a reduced image and whose height corresponds to several pixels, as in the seventh embodiment, will be described.

Figure 30:
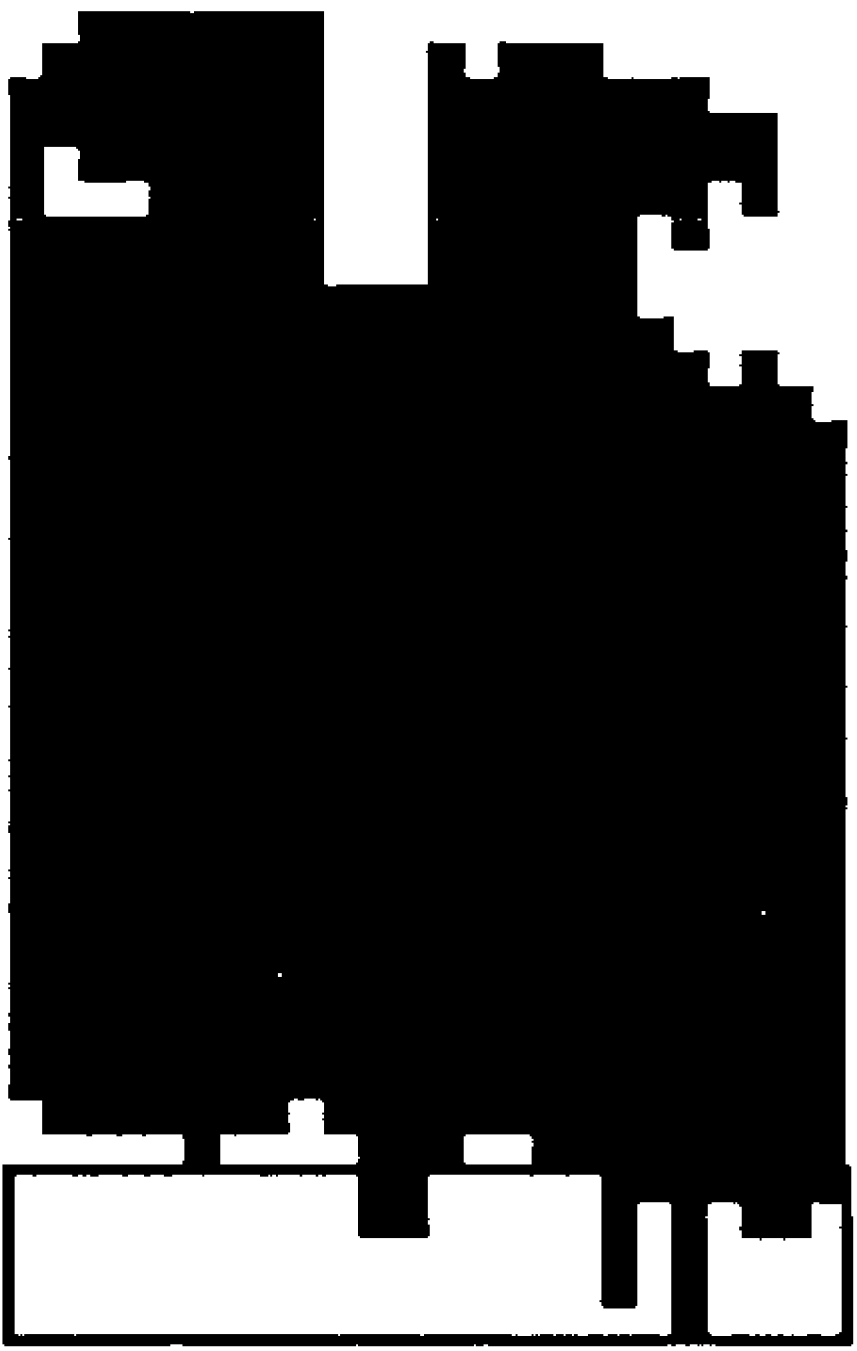
FIG. 30 is a view showing a state in which a rectangular window scans an object in a binarized reduced image.

FIG. 30 is a view showing a state in which a rectangular window scans an object in a binarized reduced image.

Figure 31:
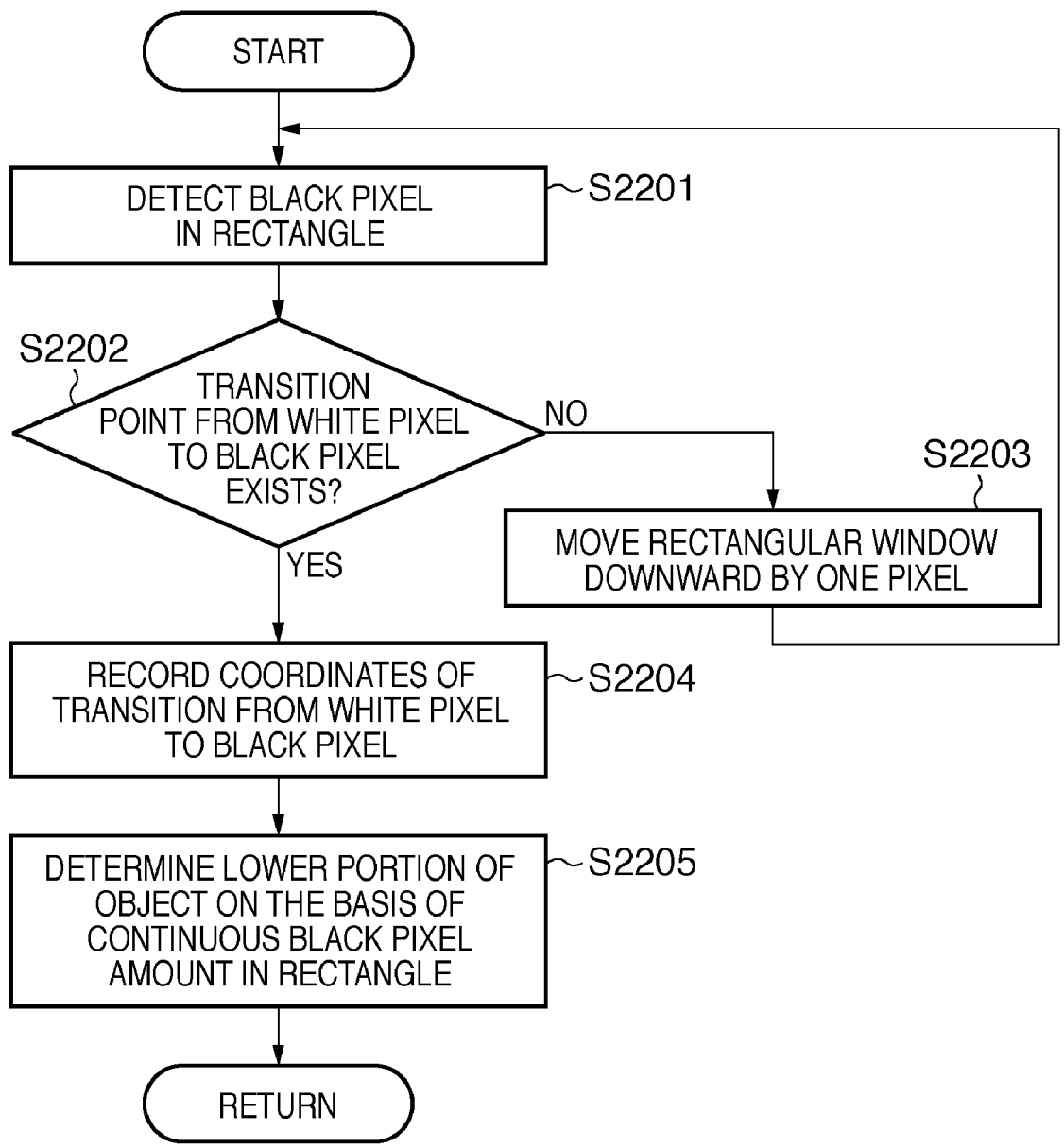
FIG. 31 is a flowchart illustrating a process of obtaining the baseline coordinate value of an object using a rectangular window.

FIG. 31 is a flowchart illustrating a process of obtaining the baseline coordinate value of an object using the rectangular window.

In step S2201, a significant pixel (black pixel) in the rectangular window is detected.

In step S2202, the information extraction unit 103 determines whether a boundary where transition from a white pixel to a black pixel occurs exists. That is, it is determined whether a portion (line) where a white pixel is present on the upper side, and a black pixel is present on the lower side exists in the rectangular window. If it is determined that the boundary exists, the process advances to step S2204. Otherwise, the process advances to step S2203.

In step S2203, the rectangular window is moved downward by one pixel, and the process returns to step S2201.

In step S2204, the detected portion is determined as an object end position candidate, and the vertical coordinate value of the current window position is recorded. For example, when the number of horizontal pixels of the rectangular window is 10, 10 coordinates 33, 32, 33, 31, 30, 30, 32, 33, 30, and 32 are recorded as the coordinates of portions where transition from a black pixel to a white pixel occurs.

In step S2205, the coordinate of a baseline position is determined based on the distribution of vertical coordinate values recorded in step S2204. For example, the mode or average value of the vertical coordinate values is used. If a mode is used in the above example, the baseline coordinate value of the object is 30.

In the baseline determination in step S2205, it is also possible to determine, as the baseline coordinate value, one of the vertical coordinate values of the boundary recorded in step S2204, where the number of continuous black pixels in the horizontal direction is maximized. In the above example, the baseline coordinate value of the object of 30.

When the coordinate value of the boundary abruptly increases continuously for several pixels and then decreases, the object is a non-object-height portion at a high probability. Such a coordinate value may be excluded from the baseline coordinate value candidates. In the above example, the seventh coordinate value "32" and the eighth coordinate value "33" should be excluded.

Ninth Embodiment

An image processing apparatus according to the ninth embodiment of the present invention will be described below, which causes an image reading apparatus (scanner) to read a paper document and extracts watermark information from the read document image data. The description will be made assuming that the watermark information embedding algorithm is the same as in the first embodiment.

<Apparatus Arrangement>

Figure 32:
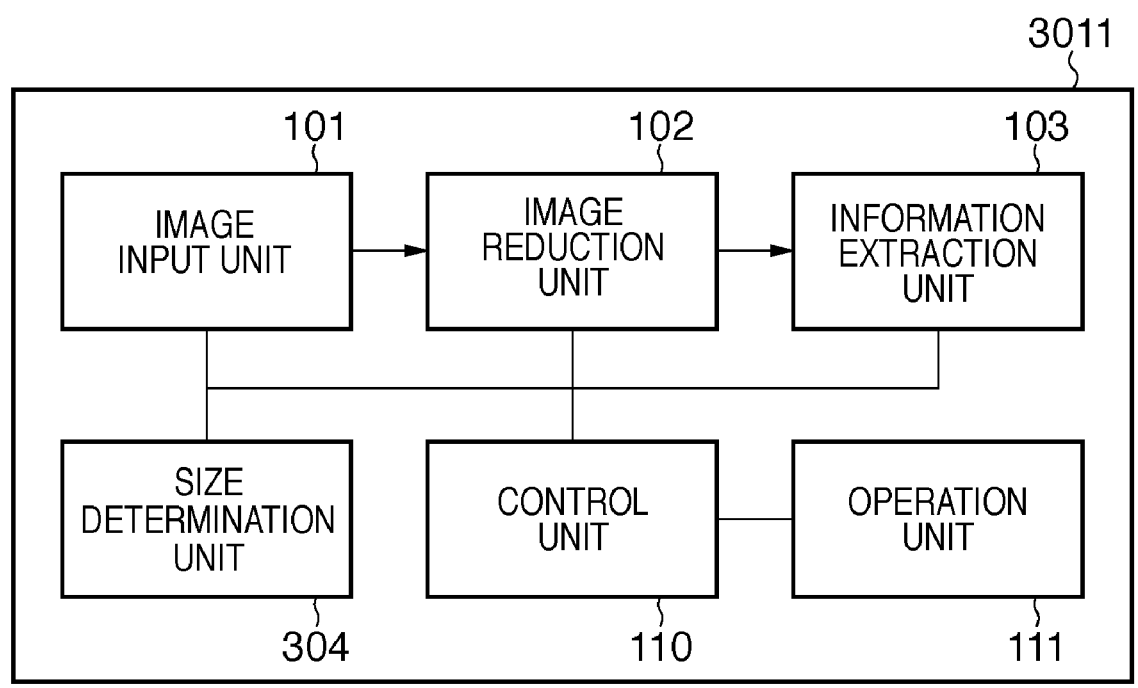
FIG. 32 is a block diagram showing the main functional arrangement of an image processing apparatus according to the ninth embodiment.

FIG. 32 is a block diagram showing the main functional arrangement of an image processing apparatus 3011 according to the ninth embodiment. As shown in FIG. 32, the image processing apparatus 3011 includes an image input unit 101, image reduction unit 102, information extraction unit 103, size determination unit 304, control unit 110, and operation unit 111. The units except the size determination unit 304 are almost the same as those in the image processing apparatus of the first embodiment, and a description thereof will not be repeated.

The size determination unit 304 is a functional unit which determines whether the size of an object existing in image data falls within a range designated in advance. More specifically, the size determination unit 304 determines whether the number of continuous significant pixels obtained by scanning image data falls within a continuous count range designated in advance.

<Operation of Apparatus>

An operation of causing the image processing apparatus 3011 to extract watermark information from image data I will be described below in detail with reference to a flowchart.

Figure 33:
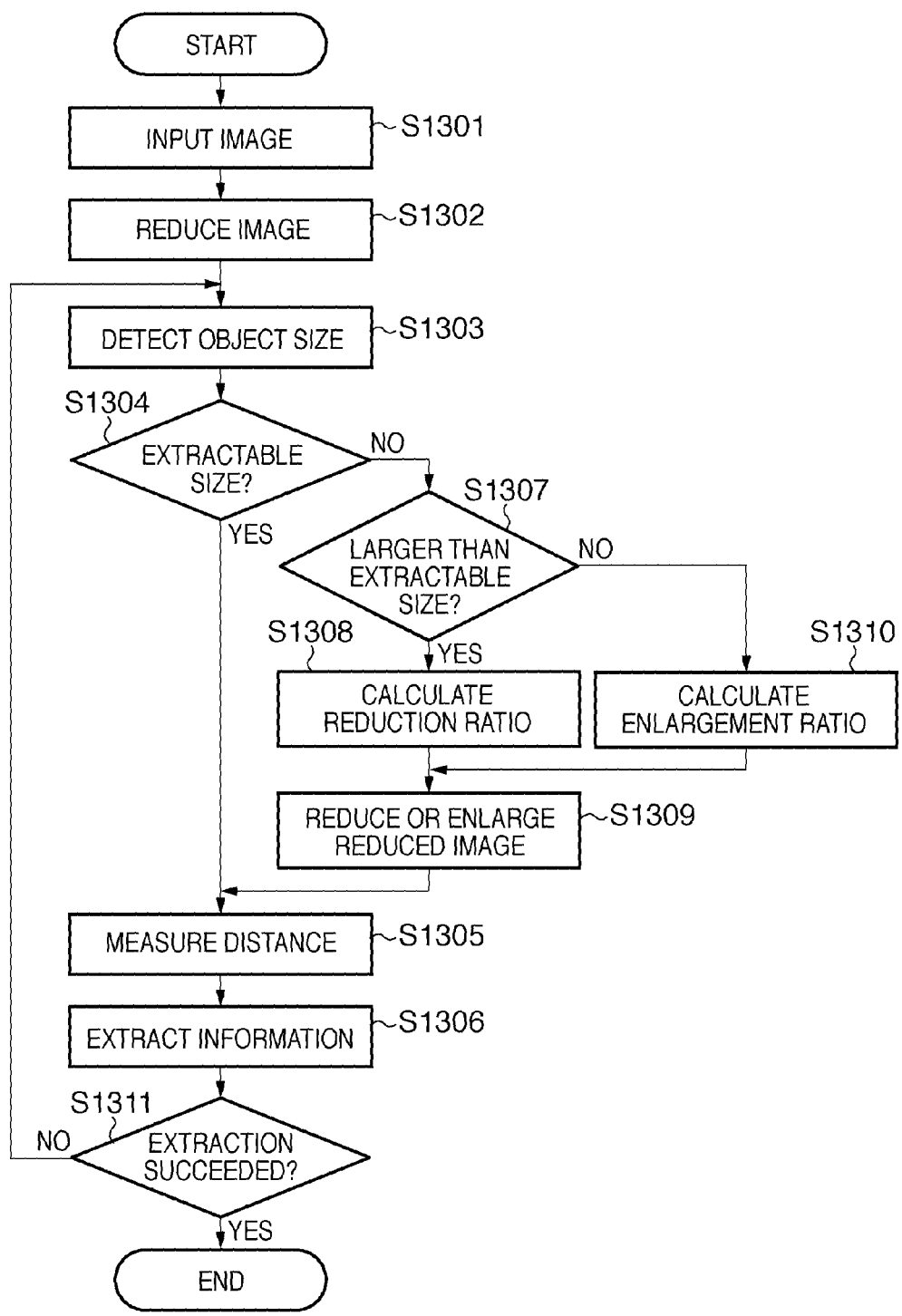
FIG. 33 is a flowchart illustrating the operation of the image processing apparatus according to the ninth embodiment.

FIG. 33 is a flowchart illustrating the operation of the image processing apparatus 3011 according to the ninth embodiment. The following sequence is triggered by, for example, an image reading instruction input by the user via the operation unit 111.

In step S1301, the image input unit 101 receives, from a scanner, the image data I corresponding to a document image having watermark information and supplies the image data I to the image reduction unit 102. In this case, the number of horizontal pixels of the image data I is W0, and the number of vertical pixels is H0.

In step S1302, the image reduction unit 102 reduces the image data I received from the image input unit 101 in the horizontal and vertical directions to generate reduced image data Ish in the horizontal direction and reduced image data Isv in the vertical direction. The image reduction unit 102 supplies the reduced image data Ish and Isv to the information extraction unit 103. Assume that in the reduced image data Ish that is first reduced image data, at least the number of horizontal pixels is reduced to W1 (1<W1<W0). Assume that in the reduced image data Isv that is second reduced image data, at least the number of vertical pixels is reduced to H1 (1<H1<H0).

In step S1303, the size determination unit 304 detects a character height or the distance (line spacing) between character strings based on the reduced image data Ish or Isv. More specifically, this process is implemented by scanning the reduced image data Ish or Isv once in a direction perpendicular to the reduction direction in step S1302. That is, the reduced image data Ish is scanned in the vertical direction, and the reduced image data Isv is scanned in the horizontal direction. The subsequent steps will be described assuming that the reduced image data Ish is scanned in the vertical direction.

More specifically, the distance (line spacing) between character strings is detected by detecting the size of a cluster of significant pixels in the reduced image. To be more specific, the representative distance of a detected continuous significant pixel portion (corresponding to a character string portion) or a non-detected continuous significant pixel portion (corresponding to a line spacing) is derived. The representative distance of a non-detected significant pixel portion corresponds to a distance $U_n$ or $D_n$ shown in FIG. 2 and indicates the number of continuous pixels of the non-detected significant pixel portion. At this time, the distance may be determined based on only the length of the first character string (first line) or the first line spacing portion (between the first and second lines), or derived from the average value of the lengths of a plurality of lines. That is, an average character height may be used. The description will be made here assuming that an average character height is determined as the representative distance of the line spacing.

In step S1304, the size determination unit 304 determines whether the representative distance determined in step S1303 falls within a preset range (allowable range) of length (number of pixels) or outside the allowable range (longer than the upper limit or shorter than the lower limit). If the representative distance falls within the allowable range, the process advances to step S1305. Otherwise, the process advances to step S1307. The set range is assumed to be 10<L<30 (pixels).

In step S1307, the size determination unit 304 determines whether the distance is longer than the upper limit (30) or shorter than the lower limit (10) of the range. If the distance is longer than the upper limit, the process advances to step S1308. On the other hand, if the distance is shorter than the lower limit, the process advances to step S1310.

In step S1308, the size determination unit 304 obtains, based on the representative distance determined in step S1303 and the upper limit of the range, the vertical reduction ratio which falls within the preset range (i.e., allowable range). For example, if the value L is 40 (pixels), the reduced image is reduced (scaled) in the vertical direction at the reduction ratio of 25% (=10/40) to 75% (=30/40). In reduction in the vertical direction, blurring or sharpening may be executed to sharpen the image. Then, the process advances to step S1309.

In step S1310, the size determination unit 304 obtains, based on the representative distance determined in step S1303 and the lower limit of the range, the vertical enlargement ratio which falls within the preset range. For example, if the value L is 5, the reduced image is enlarged (scaled) in the vertical direction at the enlargement ratio of 200% (=10/5) to 600% (=30/5). In enlargement in the vertical direction, blurring or sharpening may be executed to sharpen the image. If reduction in the vertical direction has been performed in generating the image Ish in step S1302, the process may return to step S1302 to reconstruct the reduced image again at an appropriate reduction ratio. Then, the process advances to step S1309.

In step S1309, the size determination unit 304 reduces or enlarges the reduced image generated in step S1302, based on the reduction ratio determined in step S1308 or the enlargement ratio determined in step S1310. That is, the size determination unit 304 functions as a reduced image correction unit.

In step S1305, the information extraction unit 103 measures the length (character string line spacing) between character string regions using the reduced image data (watermark extraction target image data) supplied from the image reduction unit 102 or the scaled data. In this case, the measurement is done for the reduced image data Ish reduced in the horizontal direction. As a detailed measurement method, that described in the first embodiment is usable.

In step S1306, the information extraction unit 103 derives watermark information based on the line spacings derived in step S1305. More specifically, watermark information is calculated in correspondence with the embedding algorithm preset in the information extraction unit 103. For example, in FIG. 6, watermark information is derived as "10 (binary)" because $U_1<D_1$, and $U_2>D_2$.

However, if measurement is done for the reduced image data Ish indicated by 4c in step S1305, it is impossible to measure the distance between objects. Hence, it is impossible to extract a watermark image in step S1305. This is because the image data I rotated by 90° is input in step S1301, and therefore, the reduced image data Ish is generally a solid black image.

In step S1311, the control unit 110 determines whether information extraction in step S1306 has succeeded. In determining whether information extraction has succeeded, for example, if $U_n$ and $D_n$ are measured, it is determined that information extraction has succeeded. If $U_n$ and $D_n$ are not measured, it is determined that information extraction has failed. Alternatively, if a value except those defined by the preset embedding algorithm is detected, it is determined that information extraction has failed. The determination may be done by determining, for the reading result, detection/undetection of an error designated in advance.

If it is determined that information extraction has succeeded, the sequence is ended. On the other hand, if information extraction has failed, the sequence from step S1303 is executed again for the reduced image data Isv in the vertical direction. Note that the information extraction unit 103 detects the presence/absence of significant pixels by scanning the reduced image data Isv in a direction (horizontal direction in this case) perpendicular to the reduction direction (vertical direction in this case) (FIG. 9). The image reduction unit 102 and information extraction unit 103 used at that time serve as a second image reduction unit and a second information extraction unit, respectively. The size determination unit 304 serves as a second detection unit and a second reduced image correction unit. Additionally, second watermark extraction target image data is generated based on the second reduced image data.

The image processing apparatus 3011 extracts watermark information from the image data I in accordance with the above-described operation sequence.

As described above, according to the image processing apparatus of the ninth embodiment, it is possible to extract information without any cumbersome operation even when input image data has a tilt.

(Modification)

Generally, the reduction ratio of the image reduction unit 102 is set to be low (e.g., 5%). For this reason, if the width (lateral length) of a character string in the input image data I is short, the image data is excessively reduced, and the information extraction accuracy of the information extraction unit 103 can be poor. To prevent this, it is also useful to detect the size of each object in the reduced image data along the direction of reduction by the image reduction unit 102.

An arrangement for generating more suitable reduced image data based on the size of an object in the reduced image data along the direction of reduction by the image reduction unit 102 will be described below.

<Operation of Apparatus>

Figure 34:
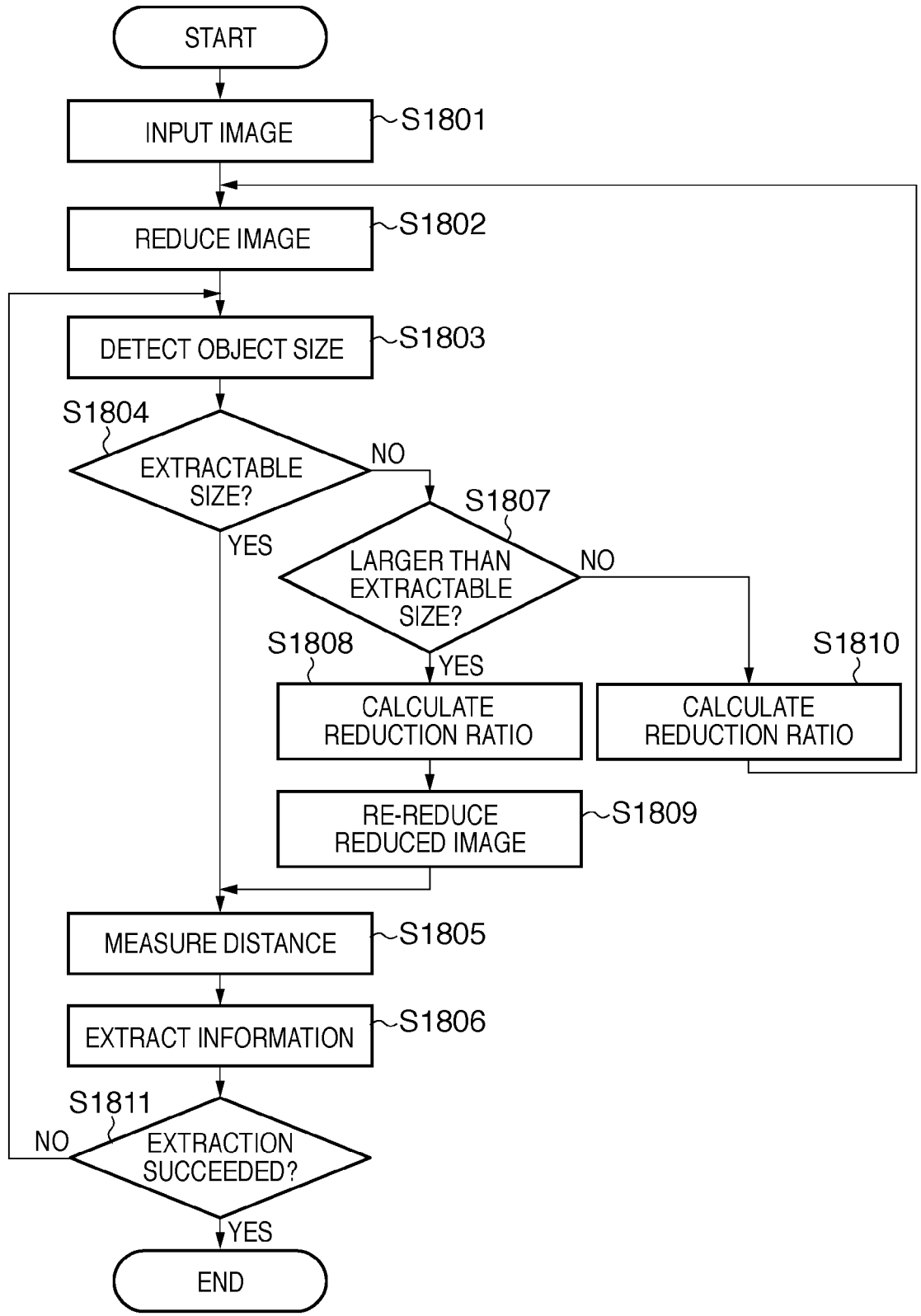
FIG. 34 is a flowchart illustrating the operation of an image processing apparatus according to a modification.

FIG. 34 is a flowchart illustrating the operation of the image processing apparatus 3011 according to a modification. The following sequence is triggered by, for example, an image reading instruction input by the user via the operation unit 111. Steps S1801, S1802, S1805, S1806, and S1811 are the same as corresponding steps in the above-described ninth embodiment, and a description thereof will not be repeated.

In step S1803, the size determination unit 304 detects a character string width (lateral length) based on the reduced image data Ish or Isv. More specifically, this process is implemented by scanning the reduced image data Ish or Isv once in the reduction direction in step S1802. That is, the reduced image data Ish is scanned in the horizontal direction, and the reduced image data Isv is scanned in the vertical direction. The subsequent steps will be described assuming that the reduced image data Ish is scanned in the horizontal direction.

More specifically, the character string width (lateral length) is detected by detecting the size of a cluster of significant pixels in the reduced image. To be more specific, the representative distance of a detected continuous significant pixel portion (corresponding to a character string portion) is derived. At this time, the distance may be determined based on only the width of the first character string (first line) or derived from the average value of the widths of a plurality of lines.

In step S1804, the size determination unit 304 determines whether the representative distance determined in step S1803 falls within a preset range of length (number of pixels) or outside the range (longer than the upper limit or shorter than the lower limit). If the representative distance falls within the range, the process advances to step S1805. Otherwise, the process advances to step S1807. The set range is assumed to be 10<L<30 (pixels).

In step S1807, the size determination unit 304 determines whether the distance is longer than the upper limit (30) or shorter than the lower limit (10) of the range. If the distance is longer than the upper limit, the process advances to step S1808. On the other hand, if the distance is shorter than the lower limit, the process advances to step S1810.

In step S1808, the size determination unit 304 obtains, based on the representative distance determined in step S1803 and the upper limit of the range, the horizontal reduction ratio of the reduced image data Ish, which falls within the preset range. For example, if the value L is 40 (pixels), the reduced image data Ish is re-reduced in the horizontal direction at the reduction ratio of 25% (=10/40) to 75% (=30/40). Then, the process advances to step S1809.

In step S1810, the size determination unit 304 obtains, based on the representative distance determined in step S1803 and the lower limit of the range, the horizontal reduction ratio of the image data I, which falls within the preset range. That is, the value of the reduction ratio of the image reduction unit 102 is derived such that the width of the reduced object falls within the preset range.

Assume that the initial value of the reduction ratio of the image reduction unit 102 is 5%. If the value L is 5, the reduced image data Ish needs to be reduced at 200% (=10/5) to 600% (=30/5). Hence, the value of the reduction ratio of the image reduction unit 102 is set to twice to six times. That is, the reduction ratio of the image reduction unit 102 is derived as a value in the range of 10% to 30%, and the derived value is set in the image reduction unit 102. Then, the process advances to step S1802.

That is, instead of enlarging the reduced image data Ish, the image data I input in step S1801 is reduced again, unlike the ninth embodiment. This process prevents the image quality from degrading upon an image enlargement process.

It is possible to more accurately extract information by extracting watermark information for the thus generated reduced image data Ish.

10th Embodiment

An image processing apparatus according to the 10th embodiment of the present invention will be described below, which causes an image reading apparatus (scanner) to read a paper document and extracts watermark information from the read document image data. The description will be made assuming that the watermark information embedding algorithm is the same as in the first embodiment.

<Apparatus Arrangement>

Figure 35:
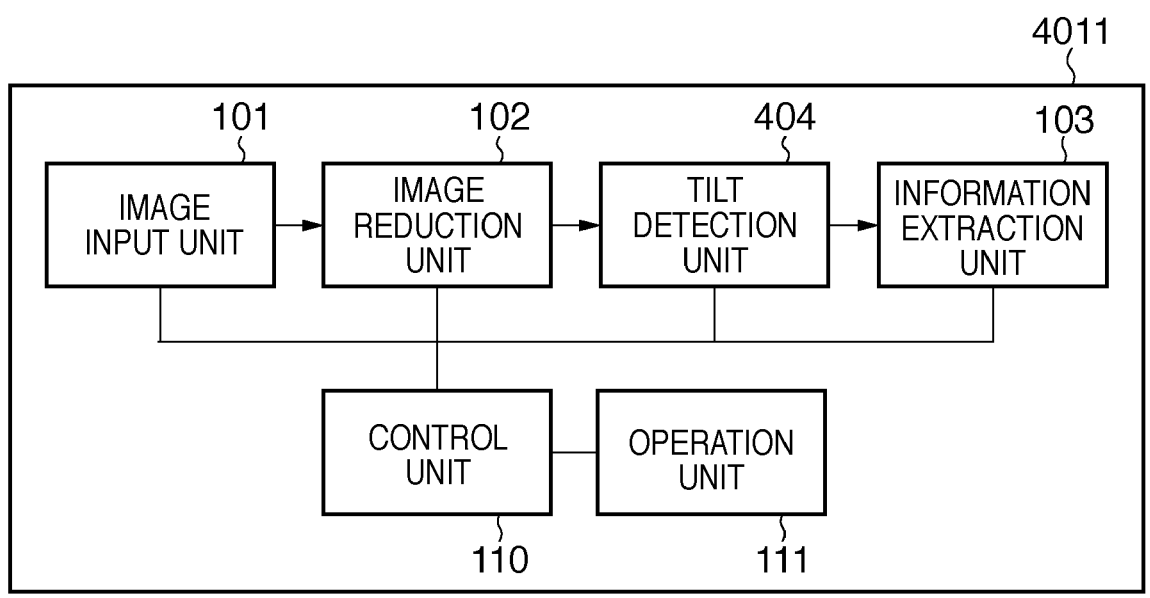
FIG. 35 is a block diagram showing the main functional arrangement of an image processing apparatus according to the 10th embodiment.

FIG. 35 is a block diagram showing the main functional arrangement of an image processing apparatus 4011 according to the 10th embodiment. As shown in FIG. 35, the image processing apparatus 4011 includes an image input unit 101, image reduction unit 102, information extraction unit 103, tilt detection unit 404, control unit 110, and operation unit 111. The units except the tilt detection unit 404 are almost the same as those in the image processing apparatus of the first embodiment, and a description thereof will not be repeated.

The tilt detection unit 404 is a functional unit which detects the tilt of a region where characters are recorded in image data input by the image input unit 101. More specifically, the tilt detection unit 404 detects an edge portion (a side or a vertex of the existence region) of the existence region of significant pixels on image data from reduced image data generated by the image reduction unit 102.

Figure 36:
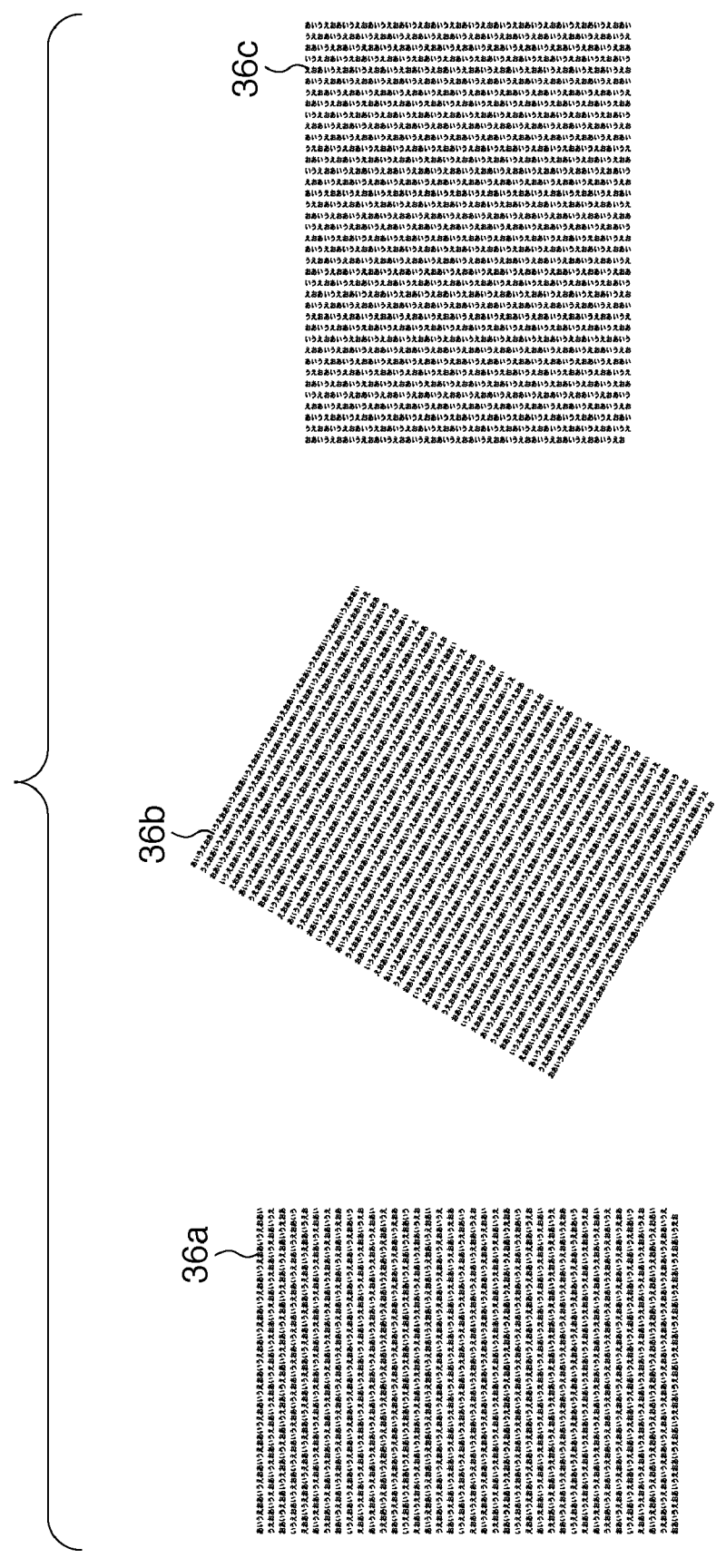

FIG. 36 is a view showing binary image data having embedded watermark information. Reference numeral 36a indicates image data which records a text document of horizontal wiring in a correct direction. On the other hand, reference numerals 36b and 36c indicate tilted document images. When a scanner reads a paper document, as described above, image data like 36b or 36c may be input due to a shift with respect to the reference direction or user's mistake in placing the paper document.

<Operation of Apparatus>

An operation of causing the image processing apparatus 4011 to extract watermark information from image data I will be described below in detail with reference to a flowchart.

Figure 42:
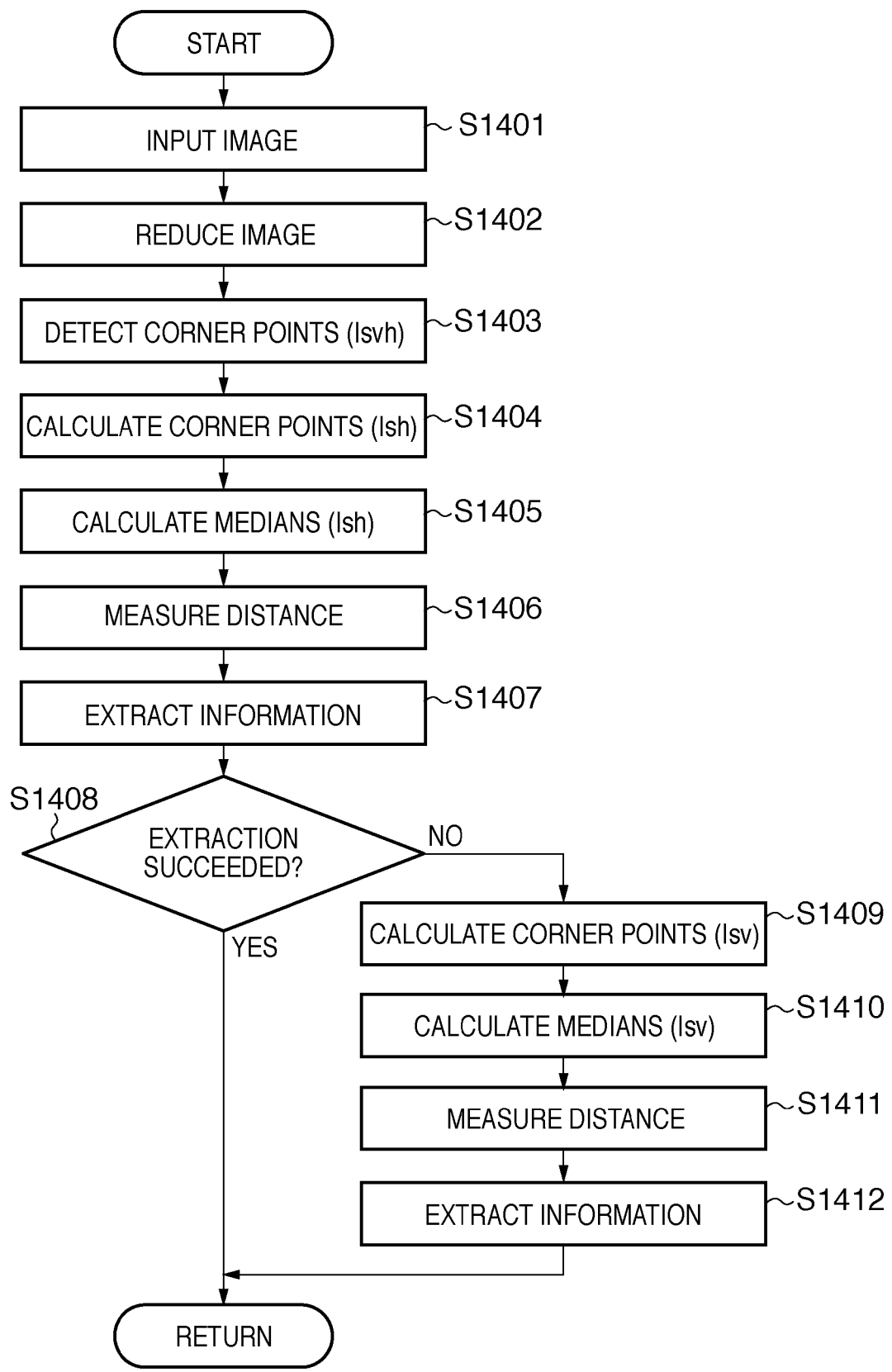
FIG. 42 is a flowchart illustrating the operation of the image processing apparatus according to the 10th embodiment.

FIG. 42 is a flowchart illustrating the operation of the image processing apparatus 4011 according to the 10th embodiment. The following sequence is triggered by, for example, an image reading instruction input by the user via the operation unit 111.

In step S1401, the image input unit 101 receives, from a scanner, the image data I corresponding to a document image having watermark information and supplies the image data I to the image reduction unit 102.

In step S1402, the image reduction unit 102 reduces the image data I received from the image input unit 101 in the horizontal and vertical directions to generate reduced image data Ish in the horizontal direction and reduced image data Isv in the vertical direction. The image reduction unit 102 also generates reduced image data Isvh by reducing the image data I at the same predetermined reduction ratio in the horizontal and vertical directions. The image reduction unit 102 supplies the reduced image data Ish (first reduced image data), reduced image data Isv (second reduced image data), and reduced image data Isvh (third reduced image data) to the information extraction unit 103.

Figure 37:
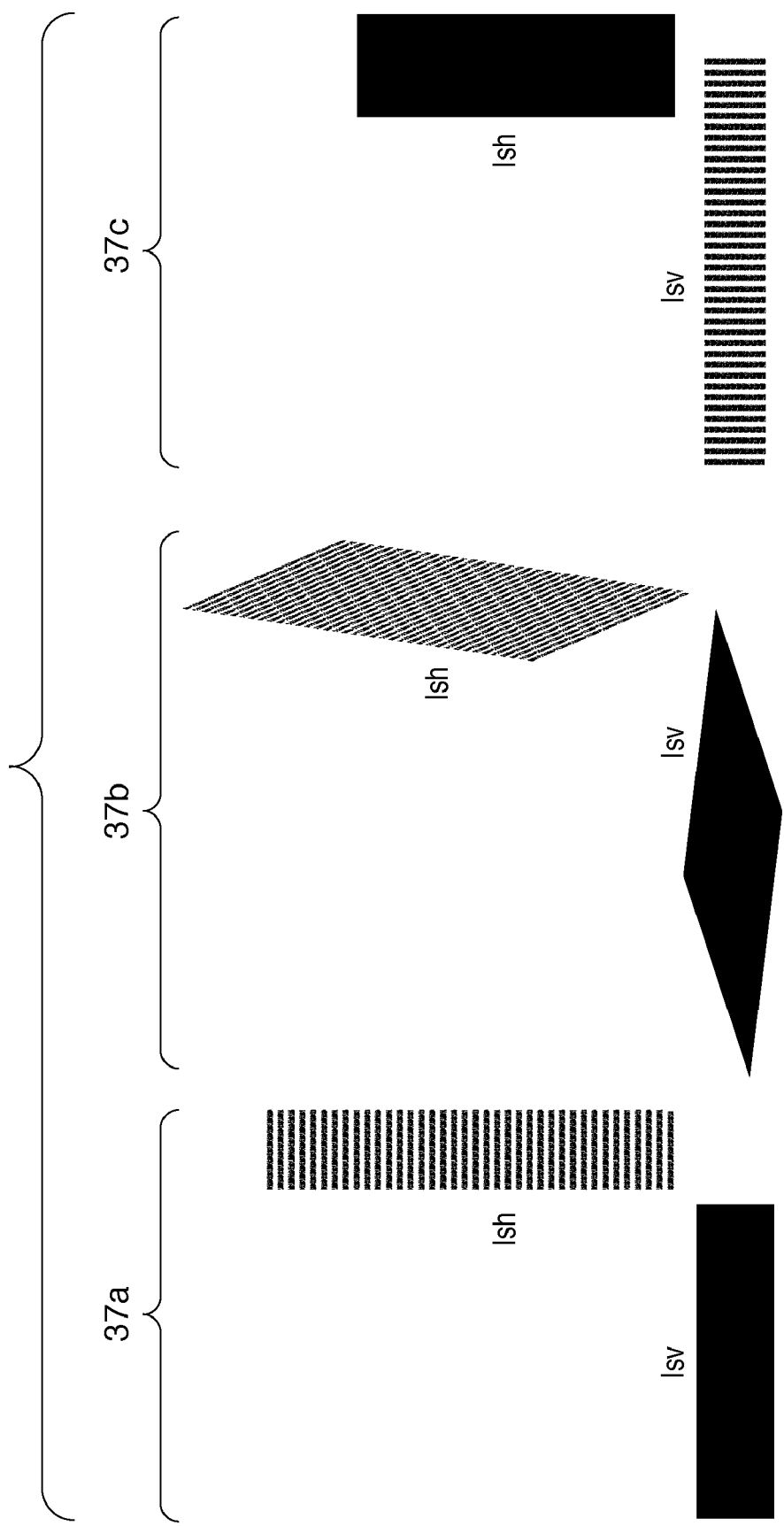
FIG. 37 is a view showing an example of reduced image data Ish obtained by reducing image data I in the horizontal direction and reduced image data Isv obtained by reducing the image data I in the vertical direction.

FIG. 37 is a view showing examples of the reduced image data Ish obtained by reducing the image data I in the horizontal direction and the reduced image data Isv obtained by reducing the image data I in the vertical direction. Note that reduced image data 37a, 37b, and 37c are generated based on the document images 36a, 36b, and 36c, respectively.

Reduced images are generated in both the horizontal and vertical directions to cope with input of the image data I tilted by 90°, as indicated by 36c. Such a situation often occurs upon reading using a scanner. Hence, if the input direction of the image data I is guaranteed in advance, the image data may be reduced in only one direction corresponding to the character string direction.

In step S1403, the tilt detection unit 404 detects the four corner points of the document region (character string existence region) of the document image from the reduced image data Isvh generated by the image reduction unit 102. A detailed method will be described below.

Figure 40:
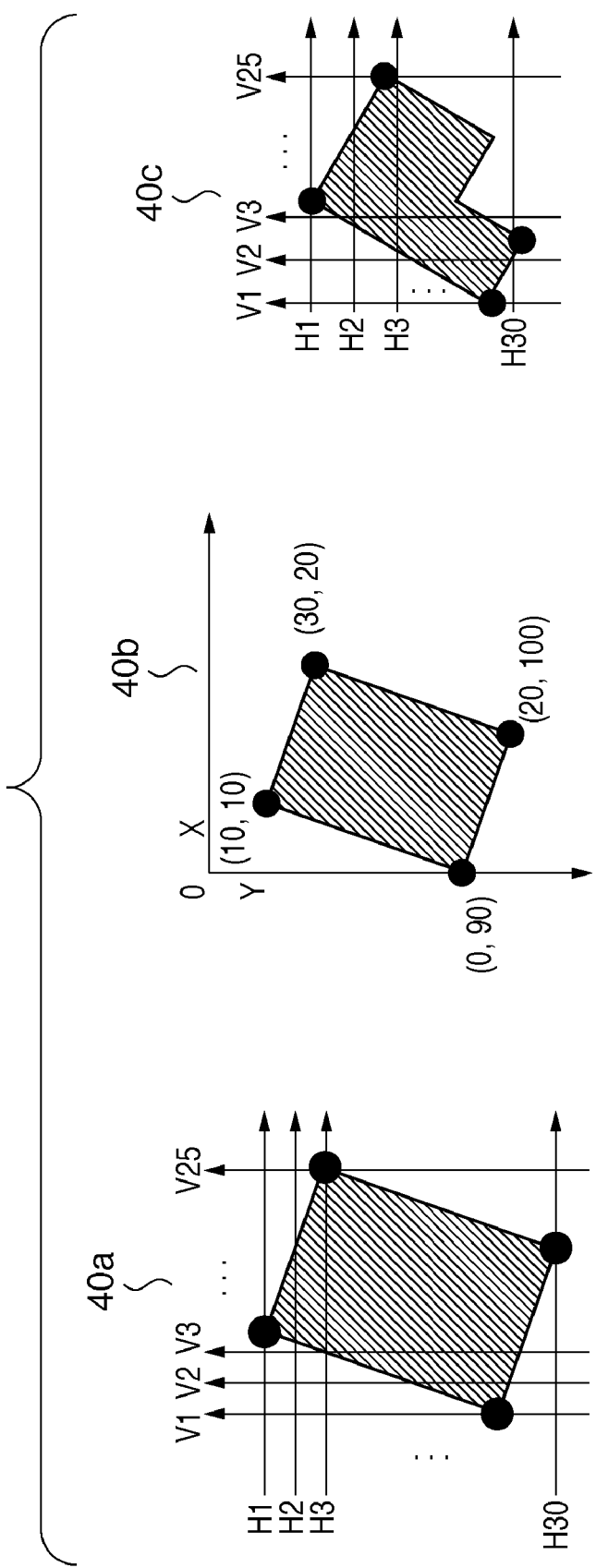
FIG. 40 is a conceptual view of a method of detecting the corner points (vertices) of a document region.

FIG. 40 is a conceptual view of a method of detecting the corner points (vertices) of a document region. The tilt detection unit 404 sequentially scans the reduced image data Isvh in the horizontal direction (H1, H2, H3, . . . in FIG. 40) and vertical direction (V1, V2, V3, . . . in FIG. 40), as indicated by 40a. At this time, the corner points are determined based on a line in which the first significant pixel is detected, and a line in which the last significant pixel is detected. In 40a, filled circle (●) portions are determined as corner points from horizontal lines H1 and H30 and vertical lines V1 and V25.

In some cases, the reduced image data Isvh as indicated by 40c may be obtained depending on the layout of the document region. Even in this case, the corner points (filled circle portions in FIG. 40) can be obtained in the same way. In this example, the corner points are detected from the reduced image data Isvh. However, the edges of the document region may be extracted using the image data I, and then, the corner points may be detected.

As another method, the corner points may be detected using the difference between the paper document and the background (e.g., a press plate) in creating the image data I, that is, in reading using the scanner.

In step S1404, the tilt detection unit 404 calculates the corner points of the reduced image data Ish based on the corner points of the reduced image data Isvh determined in step S1403 and a reduction ratio R used in step S1402. The calculation result is supplied to the information extraction unit 103 as cross point data C together with the reduced image data Ish.

Assume that the image data I is reduced in the horizontal and vertical directions at the reduction ratio R=1/100 in step S1402. Assume that the corner points of the reduced image data Isvh have coordinates (10,10), (30,20), (0,90), and (20, 100), as indicated by 40b. In this case, the reduced image data Ish is reduced at the reduction ratio R=1/100 only in the horizontal direction. For this reason, the corner points of the reduced image data Ish are obtained by multiplying each coordinate Y in the vertical direction by 100. That is, the corner points of the reduced image data Ish are calculated as (10,1000), (30,2000), (0,9000), and (20,10000).

The corner points of the reduced image data Ish can be calculated at a high speed using a small memory capacity by using the reduced image data Isvh whose data amount is smaller than that of the reduced image data Ish.

In step S1405, the information extraction unit 103 calculates the medians between the corner points using the cross point data C supplied from the tilt detection unit 404. When the document region is detected as a rectangular region (40a), the calculated medians are present on the sides.

In step S1406, the information extraction unit 103 measures the length (line spacing) between the character strings using one of the reduced image data supplied from the image reduction unit 102.

Figure 43:
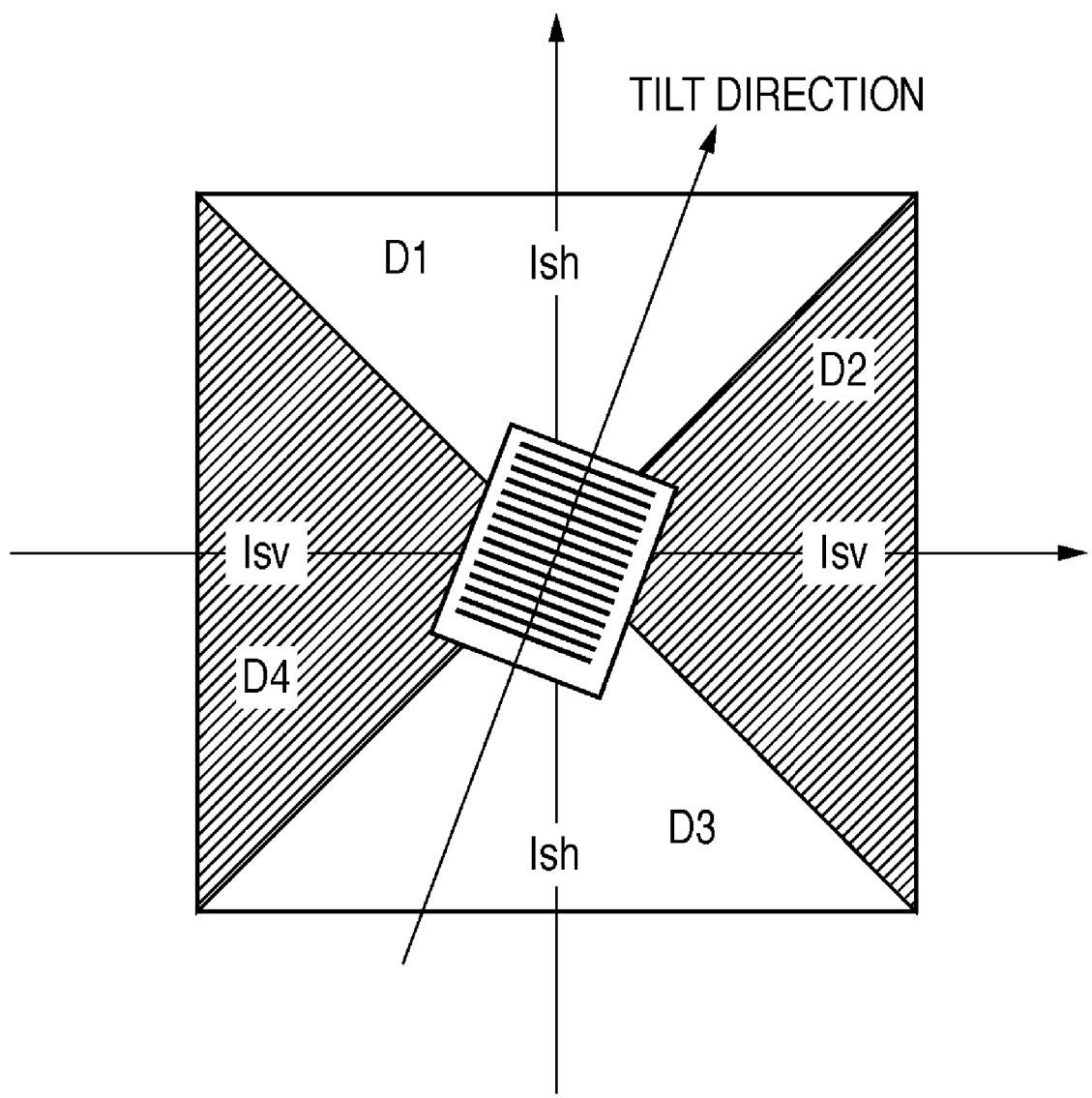
FIG. 43 is a view showing a tilt of a document image.

FIG. 43 is a view showing a tilt of a document image. When the image data I is tilted in a direction indicated by while portions, as shown in FIG. 43, the reduced image data Ish reduced in the horizontal direction is preferably used. When the image data I is tilted in a direction indicated by gray portions, the reduced image data Isv reduced in the vertical direction is preferably used. However, to determine the array direction of character strings in the character string existence region, generally, a cumbersome process is necessary. Hence, first, measurement is done for the reduced image data Ish reduced in the horizontal direction. A detailed measurement method will be described below.

The information extraction unit 103 scans significant pixels based on the reduced image data Ish and the calculated medians, thereby measuring the distance (line spacing) between objects.

Figure 41:
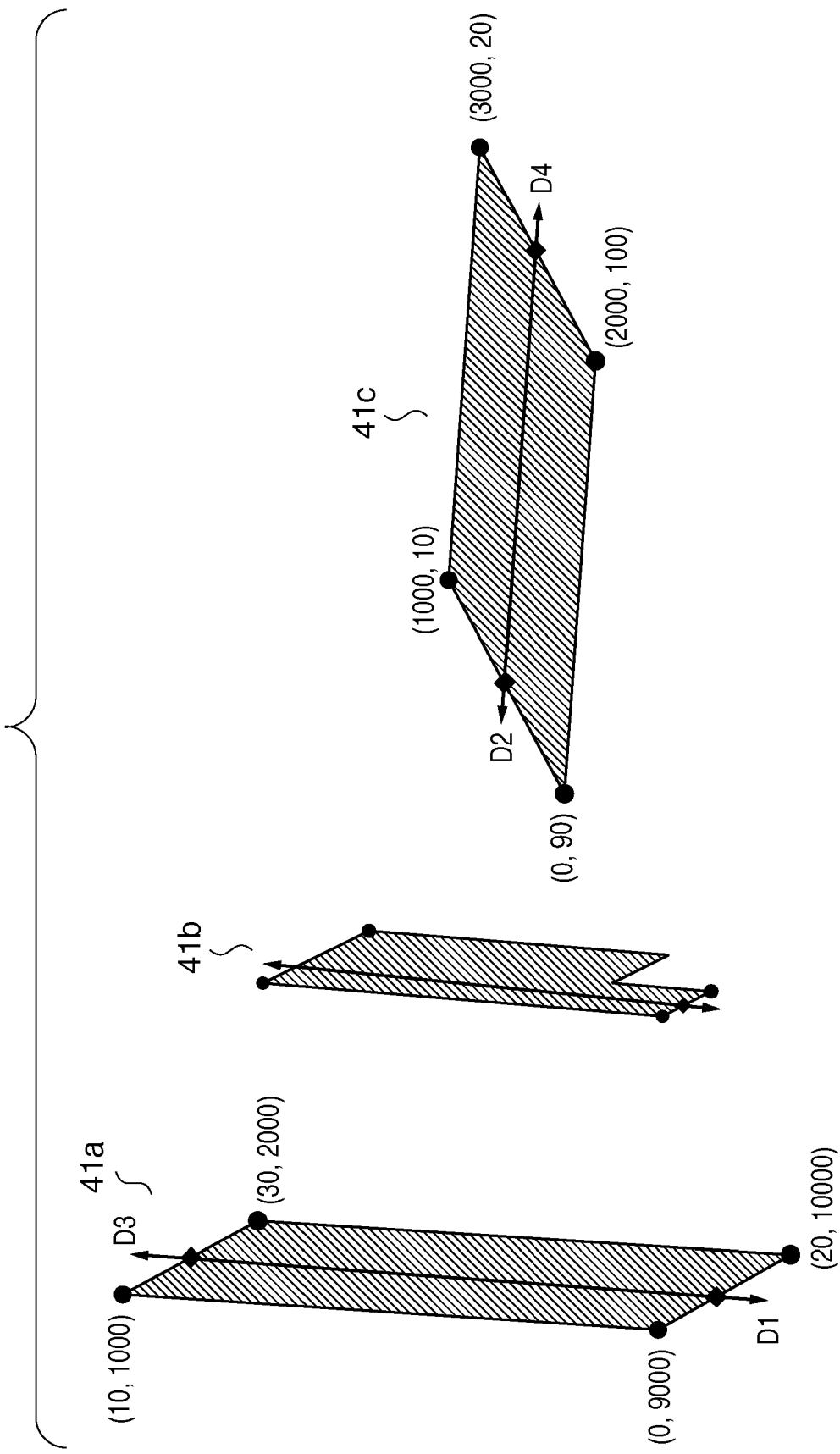
FIG. 41 is a view showing the scanning direction in significant pixel detection.

FIG. 41 is a view showing the scanning direction in step S1406. Scanning is performed in the direction of a line which connects medians (rhombuses (♦) in FIG. 41) existing on two opposing sides, as indicated by 41a. Reference numeral 41a indicates two scanning directions (D1 and D3). These scanning directions correspond to the tilt directions (directions D1 and D3) of the image data I shown in FIG. 43.

It is difficult to determine which is the correct direction, the direction D1 or D3. Hence, scanning is performed first in the two directions. In the case, two scanning directions are present. However, one scanning direction may be set depending on the watermark information embedding algorithm, as will be described later.

Figure 38:
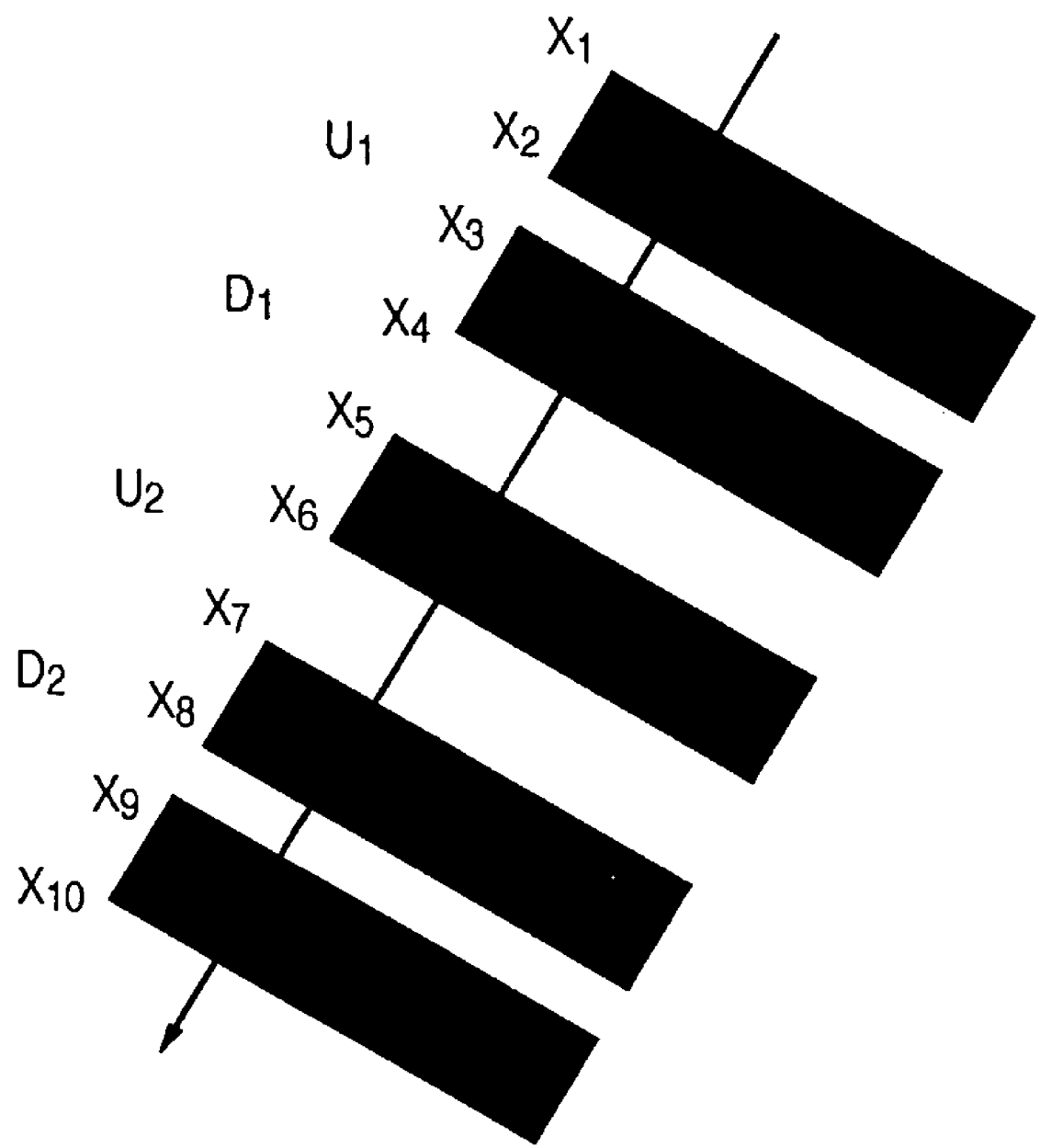
FIG. 38 is an enlarged view of the reduced image data Ish.

FIG. 38 is an enlarged view of the reduced image data Ish. First, the information extraction unit 103 detects the presence/absence of significant pixels by scanning the reduced image data Ish in a direction (vertical direction in this case) perpendicular to the reduction direction (horizontal direction in this case). A position where the presence/absence of a significant pixel is inverted is determined as the boundary between a character string region and a line spacing region.

For example, when inverting positions are detected along the arrow in FIG. 38, pixel positions $x_1$ to $x_{10}$ are detected. The lengths of line spacings $U_1$, $D_1$, $U_2$, and $D_2$ are given by $U_1=x_3-x_2$, $D_1=x_5-x_4$, $U_2=x_7-x_6$, and $D_2=x_9-x_8$, respectively (the unit is "pixel" (pix)).

As described above, upon the reduction process in step S1402, the character string regions are reduced in the character array direction, and simultaneously, the halftone portions are converted into significant pixels. This increases the density of significant pixels (black in this case) in each character string region. As a result, the information extraction unit 103 can more accurately detect the boundary between a character string region and a line spacing region and accurately measure each line spacing.

In this example, scanning is executed in the direction of a line which connects the start point and the end point, that is, the medians on two opposing sides of a rectangle having the four corner points. However, the line segment need not strictly connect the medians. For example, in a document region indicated by 41b, scanning may be performed in a tilt direction (arrow in FIG. 41) at one portion between corner points.

Figure 39:
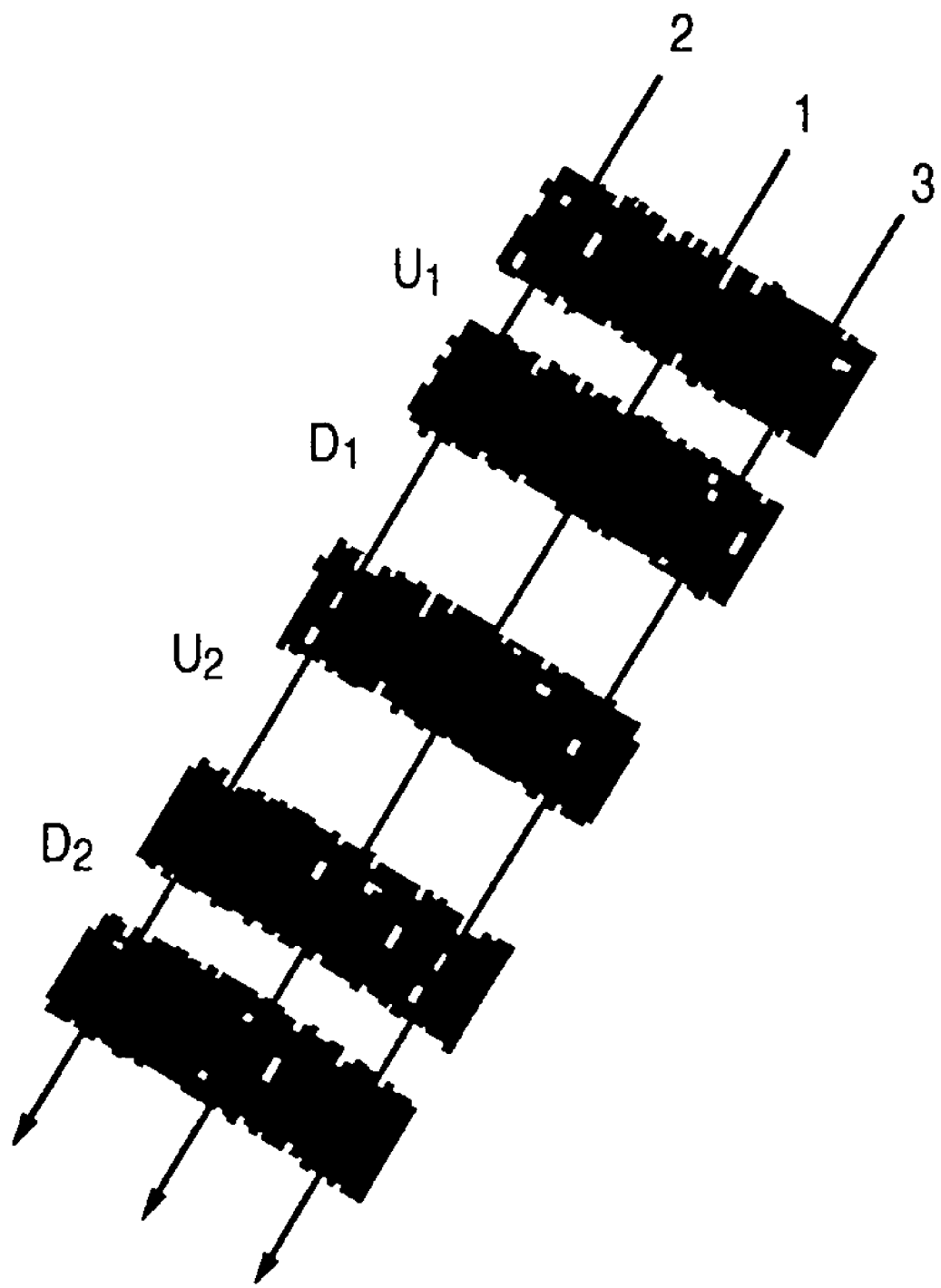
FIG. 39 is a view showing a state in which the reduced image data Ish is scanned a plurality of number of times.

For the reduced image data obtained by the above-described bilinear method, generally, scanning needs to be performed only once. For more accurate detection, the reduced image is scanned a plurality of number of times, and an average value of the distances at a plurality of positions may be determined as a line spacing. The scanning at a plurality of positions is also effective for reduced image data generated by thinning. FIG. 39 is a view showing a state in which the reduced image data Ish is scanned at a plurality of positions. Referring to FIG. 39, a character string portion represented by a black object is closer to real reduced image data. That is, a character string region is represented not as an ideal rectangular object as shown in FIG. 38 but as an object including insignificant pixels (white pixels). This slightly changes the measurement value of the distance (line spacing information) between objects depending on the scanning position.

Assume that the following values are obtained by scanning at three positions (arrows 1, 2, and 3), as shown in FIG. 8.
Arrow 1: $U_1$=10 [pix], $D_1$=4 [pix], $U_2$=4 [pix], $D_2$=12 [pix]
Arrow 2: $U_1$=8 [pix], $D_1$=5 [pix], $U_2$=6 [pix], $D_2$=10 [pix]
Arrow 3: $U_1$=6 [pix], $D_1$=3 [pix], $U_2$=5 [pix], $D_2$=8 [pix]
In this case, the average values of the lengths,
$U_1$=8 [pix], $D_1$=4 [pix], $U_2$=5 [pix], $D_2$=10 [pix]
are determined as the distances (line spacings) between the objects.

In step S1407, the information extraction unit 103 derives watermark information based on the line spacings derived in step S1406. More specifically, watermark information is calculated in correspondence with the embedding algorithm preset in the information extraction unit 103. For example, in FIG. 38, watermark information is derived as "10 (binary)" because $U_1 < D_1$, and $U_2 > D_2$.

As indicated by 41a, the above-described measurement of the distance (line spacing) between objects and watermark information derivation are done in the two scanning directions (directions D1 and D3). At this point of time, it is impossible to determine which information is correct. This determination is done based on the derived watermark information. Using a start bit and a stop bit in addition to the embedded information, whether the bits are inverted is determined, although the determination depends on the watermark information embedding algorithm.

For example, when both the start bit and the stop bit are "0", the start bit of one of the two pieces of calculated watermark information changes to "1". Hence, watermark information whose start bit is "0" is determined to be correct.

This method allows deriving a watermark information by scanning in only one direction.

However, if measurement is done for the reduced image data Ish indicated by 37c in step S1406, as already described with reference to FIG. 43, it is impossible to measure the distance between objects. Hence, it is impossible to extract a watermark image in step S1407.

In step S1408, the control unit 110 determines whether information extraction in step S1407 has succeeded. In determining whether information extraction has succeeded, for example, if $U_n$ and $D_n$ are measured, it is determined that information extraction has succeeded. If $U_n$ and $D_n$ are not measured, it is determined that information extraction has failed. Alternatively, if a value except those defined by the preset embedding algorithm is detected, it is determined that information extraction has failed. The determination may be done by determining, for the reading result, detection/undetection of an error designated in advance.

In step S1409, the tilt detection unit 404 calculates the corner points of the reduced image data Isv based on the corner points of the reduced image data Isvh determined in step S1403 and the reduction ratio R used in step S1402. The calculation result is supplied to the information extraction unit 103 as the cross point data C together with the reduced image data Ish.

In step S1410, the information extraction unit 103 calculates the medians between the corner points using the cross point data C supplied from the tilt detection unit 404.

In step S1411, the information extraction unit 103 measures the length (line spacing) between character string regions using the reduced image data Isv supplied from the image reduction unit 102. The detailed measurement method is the same as in step S1406. Note that the information extraction unit 103 detects the presence/absence of significant pixels by scanning the reduced image data Isv in a direction almost perpendicular to the scanning direction in step S1406.

In step S1412, the information extraction unit 103 derives watermark information based on the line spacings derived in step S1411. The detailed measurement method is the same as in step S1407.

The image processing apparatus 4011 extracts watermark information from the image data I in accordance with the above-described operation sequence.

As described above, according to the image processing apparatus of the 10th embodiment, it is possible to extracted information without any cumbersome operation even when the character string direction in input image data is tilted with respect to the direction of the image data.

11th Embodiment

In the 11th embodiment, a form for detecting the corner points (vertices) of a character string region using character string will be described. Operations other than the corner point detection operation are the same as in the 10th embodiment, and a description thereof will not be repeated.

Figure 44:
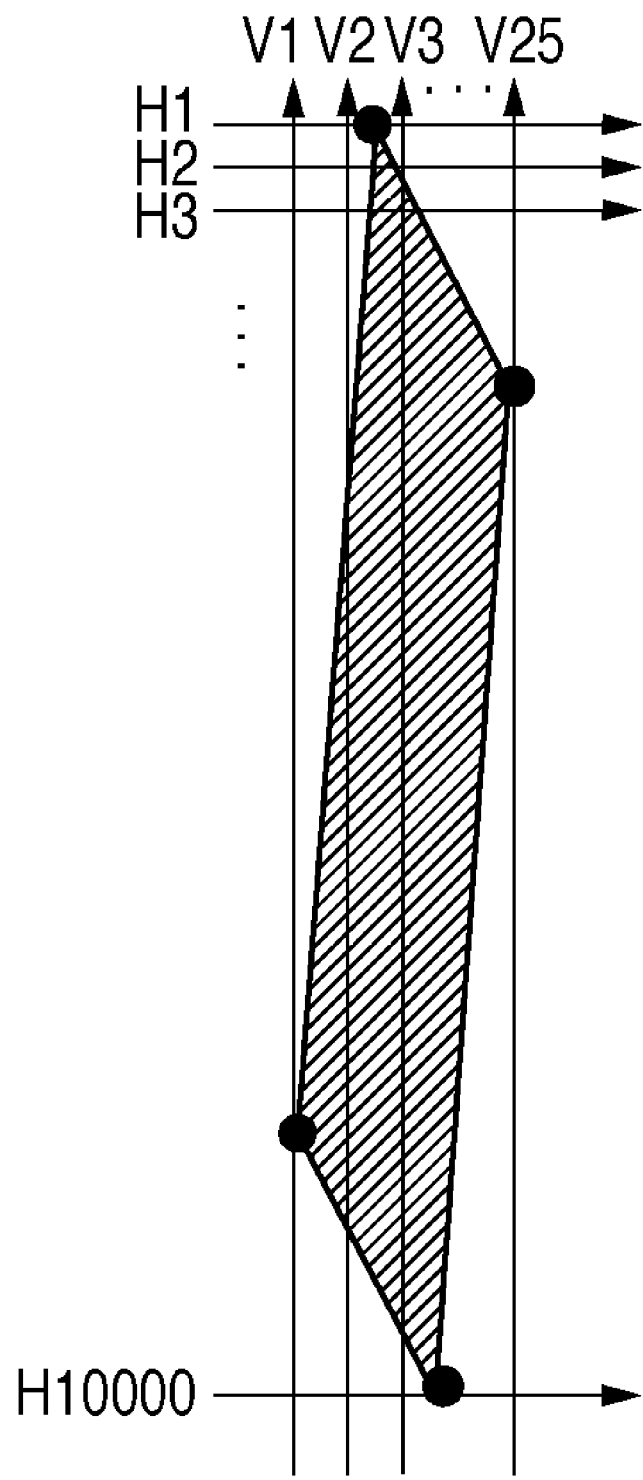
FIG. 44 is a view showing corner point detection using reduced image data Ish.

For example, as shown in FIG. 44, a tilt detection unit 404 sequentially scans reduced image data Isv in the horizontal direction (H1, H2, H3, . . . in FIG. 44) and vertical direction (V1, V2, V3, . . . in FIG. 44). A point where the first black pixel is detected and a point where the last black pixel is detected are determined as corner points. In this case, corner points represented by filled circle (●) portions are detected based on H1 and H10000 in the horizontal direction and V1 and V25 in the vertical direction. This arrangement allows direct detection the tilt of the reduced image data Ish. It is therefore possible to omit generation of reduced image data Isvh reduced in the horizontal and vertical directions at the same ratio and the corner point calculation process in step S1403 in the 10th embodiment.

In the 10th embodiment, the reduced image data Ish and Isv are generated simultaneously in step S1402. However, only the reduced image data Ish in the horizontal direction may be generated first. Corner points are detected from the reduced image data Ish and used to extract information. Only when information extraction has failed, the reduced image data Isv in the vertical direction is generated. Corner points are detected from the reduced image data Isv to extract information.

12th Embodiment

In the 12th embodiment, a form for executing the above-described watermark information extraction for a document image read by, for example, a scanner by a program that runs on a computer (PC) will be described.

<Device Arrangement>

Figure 45:
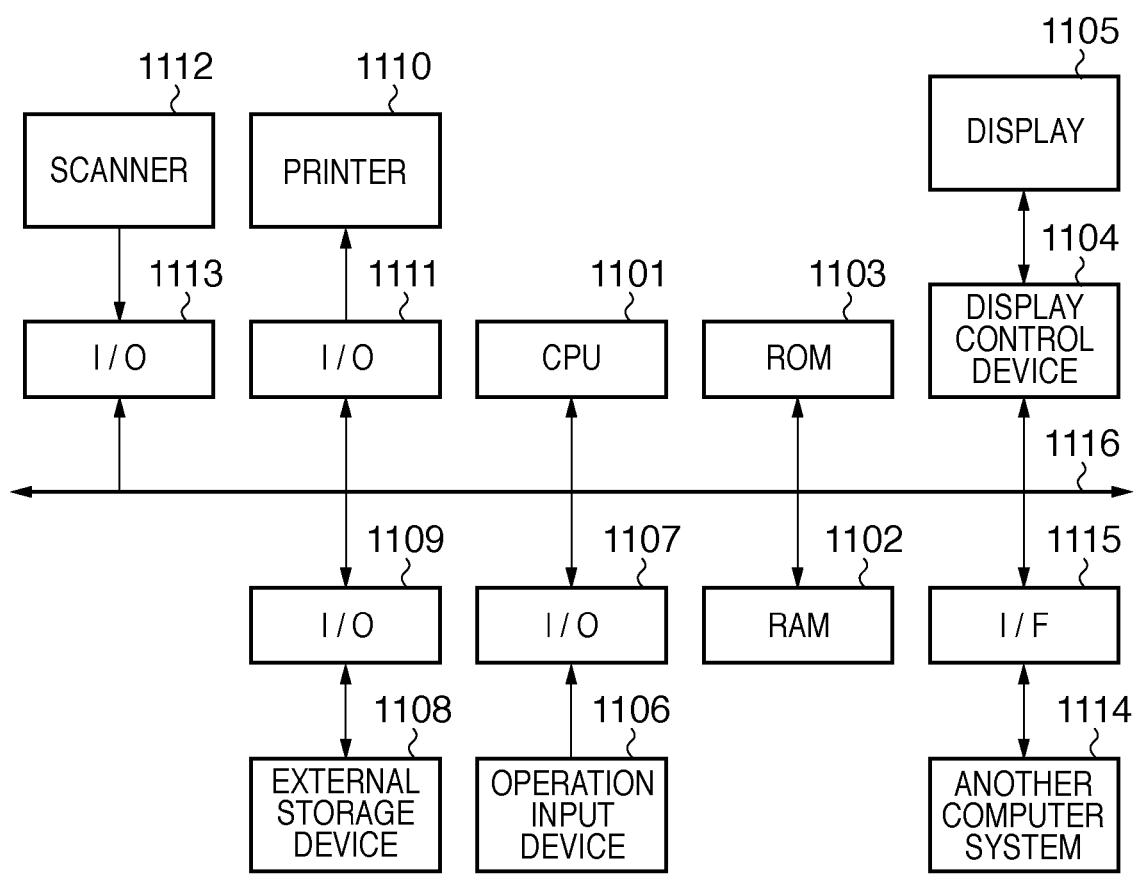
FIG. 45 is a block diagram showing the internal arrangement of a PC.

FIG. 45 is a block diagram showing the internal arrangement of a PC.

Referring to FIG. 45, a CPU 1101 implements the units of the functional blocks shown in, for example, FIG. 1 based on programs and data stored in a RAM 1102 or a ROM 1103.

The RAM 1102 stores programs and data loaded from an external storage device 1108. The RAM 1102 also temporarily stores programs and data downloaded from another computer system 1114 via an I/F (interface) 1115. The RAM 1102 also has an area necessary for the CPU 1101 to execute various kinds of processes.

The ROM 1103 stores the functional programs and setting data of the computer. A display control device 1104 execute a control process to display an image or a text on a display 1105. The display 1105 displays an image or a text. As the display, a CRT or a liquid crystal screen is applicable.

An operation input device 1106 includes a device such as a keyboard or a mouse capable of inputting various kinds of instructions to the CPU 1101. An I/O 1107 notifies the CPU 1101 of various kinds of instructions input via the operation input device 1106.

The external storage device 1108 functions as a mass information storage device such as a hard disk and stores an OS (Operation System), various kinds of application programs, and input/output document images. Information write in the external storage device 1108 and information read from the external storage device 1108 are done via an I/O 1109.

A printer 1110 outputs a document or an image. The output data is sent from the RAM 1102 or the external storage device 1108 via an I/O 1111. Examples of the printer for outputting a document or an image are an inkjet printer, laser beam printer, thermal transfer printer, and dot impact printer.

A scanner 1112 reads a document or an image. The input data is sent to the RAM 1102 or the external storage device 1108 via an I/O 1113.

A bus 1116 connects the CPU 1101, ROM 1103, RAM 1102, I/O 1111, I/O 1109, display control device 1104, I/F 1115, I/O 1107, and I/O 1113.

<Operation of Apparatus>

The external storage device 1108 stores, as an application program, an image processing program for implementing the functional units and operation sequence described in the first embodiment. The operation sequence described in, e.g., the first embodiment starts on the basis of an image processing program activation instruction which is input by a user via the operation input device 1106. A detailed operation is the same as that described in each of the above embodiments, and a description thereof will not be repeated.

Other Embodiments

The embodiments of the invention have been described above in detail. The present invention is applicable to a system including a plurality of devices or an apparatus including a single device.

The present invention is also achieved by supplying a program to implement the functions of the above-described embodiments to the system or apparatus directly or from a remote site and causing the system or apparatus to read out and execute the supplied program codes. Hence, the program codes themselves which are installed in a computer to implement the functional processing of the present invention are also incorporated in the technical scope of the invention.

In this case, the program can take any form such as an object code, a program to be executed by an interpreter, or script data to be supplied to the OS as long as the functions of the program are available.

Examples of a recording medium to supply the program are a Floppy® disk, hard disk, optical disk (CD or DVD), magnetooptical disk, magnetic tape, nonvolatile memory card, and ROM.

The program of the present invention may be encrypted, stored in a storage medium such as a CD-ROM, and distributed to users. Any user who satisfies predetermined conditions can download key information to decrypt the program from a homepage via the Internet. The user can execute the encrypted program by using the key information and install the program in the computer.

The functions of the above-described embodiments are implemented when the computer executes the readout program. The functions of the above-described embodiments are also implemented when, for example, the OS running on the computer partially or wholly executes actual processing based on the instructions of the program.

The program read out from the recording medium is written in the memory of a function expansion board inserted into the computer or a function expansion unit connected to the computer and executed. Then, the CPU of the function expansion board or function expansion unit partially or wholly executes actual processing, thereby implementing the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-146096 filed on May 31, 2007, 2007-146097 filed on May 31, 2007, 2007-146099 filed on May 31, 2007, 2007-146100 filed on May 31, 2007 and 2007-146101 filed on May 31, 2007, which are hereby incorporated by reference herein in their entirety.

What is claimed is:

1. An image processing apparatus for inputting a document image and extracting watermark information embedded in the document image on the basis of a line spacing between character strings in the document image, comprising:
   an image reading apparatus for inputting a document image as image data;
   an image reduction unit for generating, from the input image data, reduced image data, wherein the reduced image data is generated by reducing the input image data in a first direction only, or is generated by reducing the input image data in the first direction and in a second direction that has a predetermined relationship with respect to the first direction, wherein the reduction ratio in the first direction is higher than the reduction ratio in the second direction;
   a detection unit for scanning the reduced image data generated by the image reduction unit in the second direction and detecting a length of a blank region in the second direction as line spacing information; and
   an extraction unit for extracting watermark information embedded in the document image on the basis of the line spacing information detected by the detection unit.

2. The apparatus according to claim 1, wherein
the image reduction unit further generates, from the image data, second reduced image data, wherein the second reduced image data is generated by reducing the input image data in a third direction perpendicular to the first direction only, or is generated by reducing the input image data in the third direction and in a fourth direction that has a predetermined relationship with respect to the third direction, wherein the reduction ratio in the third direction is higher than the reduction ratio in the fourth direction, and
if the detection unit has detected no valid line spacing information, the detection unit scans the second reduced image data in a fourth direction that has a predetermined relationship with respect to the third direction and detects a length of a blank region in the fourth direction as second line spacing information, and the extraction unit extracts the watermark information embedded in the document image on the basis of the second line spacing information.

3. The apparatus according to claim 1, further comprising:
   a unit for detecting a resolution of the image data input by the image reading apparatus; and
   a unit for determining a reduction ratio in a reduction direction of the image reduction unit on the basis of the detected resolution.

4. The apparatus according to claim 1, wherein the detection unit detects the line spacing information on the basis of lengths of a plurality of blank regions which are obtained by scanning a plurality of portions of the reduced image data in the second direction.

5. The apparatus according to claim 1, wherein the image reduction unit defines, as a significant pixel, a pixel detected as halftone upon reduction.

6. The apparatus according to claim 1, further comprising:
   a range determination unit for generating a histogram of heights of regions formed from significant pixels by scanning the reduced image data generated by the image reduction unit in the second direction and for determining, on the basis of the histogram, a range of a height of a region to be regarded as a valid region in the reduced image data; and
   a setting unit for regarding, as a noise component, at least a region formed from a significant pixel having a height outside the range in the reduced image data and setting the region as an insignificant pixel,
   wherein the detection unit scans, in the second direction, the reduced image after the setting unit sets the noise component as the insignificant pixel, and detects, as the line spacing information, a length of a region of insignificant pixels which is continuous in the second direction.

7. The apparatus according to claim 1, further comprising a filter unit for smoothing the reduced image data generated by the image reduction unit, using a lowpass filter,
   wherein the detection unit scans, in the second direction, the reduced image data after smoothing by the filter unit, and detects, as the line spacing information, a length of a region of insignificant pixels which is continuous in the second direction.

8. The apparatus according to claim 1, further comprising:
   a height detection unit for detecting an average character height in the image data by scanning the reduced image data generated by the image reduction unit in the second direction; and
   a reduced image correction unit for, if the average character height detected by the height detection unit falls outside a preset allowable range, scaling the reduced image data in the second direction on the basis of the average character height and the allowable range,
   wherein the detection unit scans the reduced image data scaled by the reduced image correction unit in the second direction and detects the length of the blank region in the second direction as the line spacing information.

9. An image processing apparatus for inputting a document image and extracting embedded watermark information on the basis of a line spacing between character strings in the document image, comprising:
   an image reading apparatus for inputting a document image as image data;
   an image reduction unit for generating, from the input image data, first reduced image data, wherein the first reduced image data is generated by reducing the input image data in a first direction only, or is generated by reducing the input image data in the first direction and in a second direction perpendicular to the first direction, wherein the reduction ratio in the first direction is higher than the reduction ratio in the second direction;

a detection unit for detecting corner points of a character string existence region in the first reduced image data;

a setting unit for setting a start point and an end point of scanning on two opposing sides of a rectangle using the corner points; and an information extraction unit for scanning the reduced image data along a line segment which connects the start point and the end point set by the setting unit, detecting a line spacing between character strings, and extracting watermark information.

10. The apparatus according to claim 9, wherein
the image reduction unit further generates, from the image data, second reduced image data, wherein the second reduced image data is generated by reducing the input image data in the second direction only, or is generated by reducing the input image data in the first direction and in the second direction, wherein the reduction ratio in the second direction is higher than the reduction ratio in the first direction, and if the information extraction unit has detected no valid line spacing between the character strings, the detection unit detects corner points of a character string existence region in the second reduced image data, the setting unit sets a start point and an end point of scanning on two opposing sides of a rectangle using the corner points, and the information extraction unit scans the second reduced image data along a line segment which connects the start point and the end point set by the setting unit, detects a line spacing between character strings, and extracts watermark information.

11. The apparatus according to claim 10, wherein the setting unit sets the start point and the end point of scanning at medians of the two opposing sides of the rectangle using the corner points.

12. The apparatus according to claim 9, wherein
the image reduction unit further generates third reduced image data reduced at predetermined reduction ratios in the first direction and the second direction, and
the detection unit detects corner points of a character string existence region in the third reduced image data and detects the corner points of the character string existence region in the first reduced image data using the reduction ratio of the image reduction unit and coordinates of the corner points.

13. A method of controlling an image processing apparatus for inputting a document image and extracting watermark information embedded in the document image on the basis of a line spacing between character strings in the document image, comprising:

the input step of inputting a document image as image data;
the image reduction step of generating, from the input image data, reduced image data, wherein the reduced image data is generated by reducing the input image data in a first direction only, or is generated by reducing the input image data in the first direction and in a second direction that has a predetermined relationship with respect to the first direction, wherein the reduction ratio in the first direction is higher than the reduction ratio in the second direction;

the detection step of scanning the reduced image data generated in the image reduction step in the second direction and detecting a length of a blank region in the second direction as line spacing information; and the extraction step of extracting watermark information embedded in the document image on the basis of the line spacing information detected in the detection step.

14. The method according to claim 13, wherein
in the image reduction step, second reduced image is further generated, wherein the second reduced image data is generated by reducing the input image data in a third direction perpendicular to the first direction only, or is generated by reducing the input image data in a third direction and in a fourth direction that has a predetermined relationship with respect to the third direction, wherein the reduction ratio in the third direction is higher than the reduction ratio in the fourth direction, and if no valid line spacing information has been detected in the detection step, in the detection step, the second reduced image data is scanned in a fourth direction that has a predetermined relationship with respect to the third direction, and a length of a blank region in the fourth direction is detected as second line spacing information, and in the extraction step, the watermark information embedded in the document image is extracted on the basis of the second line spacing information.

15. A method of controlling an image processing apparatus for inputting a document image and extracting embedded watermark information on the basis of a line spacing between character strings in the document image, comprising:

the input step of inputting a document image as image data;
the image reduction step of generating, from the input image data, first reduced image data, wherein the first reduced image data is generated by reducing the input image data in a first direction only, or is generated by reducing the input image data in the first direction and in a second direction perpendicular to the first direction, wherein the reduction ratio in the first direction is higher than the reduction ratio in the second direction;

the detection step of detecting corner points of a character string existence region in the first reduced image data;

the setting step of setting a start point and an end point of scanning on two opposing sides of a rectangle using the corner points; and the information extraction step of scanning the reduced image data along a line segment which connects the start point and the end point set in the setting step, detecting a line spacing between character strings, and extracting watermark information.

16. A non-transitory computer-readable storage medium storing a computer program which causes a computer to execute image processing of inputting a document image and extracting watermark information embedded in the document image on the basis of a line spacing between character strings in the document image, the computer program causing the computer to execute:

the input step of inputting a document image as image data;
the image reduction step of generating, from the input image data, image data, wherein the reduced image data is generated by reducing reduced the input image data in a first direction only, or is generated by reducing the input image data in the first direction and in a second direction that has a predetermined relationship with respect to the first direction, wherein the reduction ratio in the first direction is higher than the reduction ratio in the second direction;

the detection step of scanning the reduced image data generated in the image reduction step in the second direction and detecting a length of a blank region in the second direction as line spacing information; and the extraction step of extracting watermark information embedded in the document image on the basis of the line spacing information detected in the detection step.

17. The medium according to claim 16, wherein
in the image reduction step, second reduced image data is further generated, wherein the second reduced image data is generated by reducing the input image data in a third direction only, or is generated by reducing the input image data in a third direction and in a fourth direction that has a predetermined relationship with respect to the third direction, wherein the reduction ratio in the third direction is higher than the reduction ratio in the fourth direction, and if no valid line spacing information has been detected in the detection step, in the detection step, the second reduced image data is scanned in a fourth direction that has a predetermined relationship with respect to the third direction, and a length of a blank region in the fourth direction is detected as second line spacing information, and in the extraction step, the watermark information embedded in the document image is extracted on the basis of the second line spacing information.

18. A non-transitory computer-readable storage medium storing a computer program which causes a computer to execute image processing of inputting a document image and extracting embedded watermark information on the basis of a line spacing between character strings in the document image, the computer program causing the computer to execute:

the input step of inputting a document image as image data;

the image reduction step of generating, from the input image data, first reduced image data, wherein the first reduced image data is generated by reducing the input image data in a first direction only, or is generated by reducing the input image data in the first direction and in a second direction perpendicular to the first direction, wherein the reduction ratio in the first direction is higher than the reduction ratio in the second direction;

the detection step of detecting corner points of a character string existence region in the first reduced image data;

the setting step of setting a start point and an end point of scanning on two opposing sides of a rectangle using the corner points; and the information extraction step of scanning the reduced image data along a line segment which connects the start point and the end point set in the setting step, detecting a line spacing between character strings, and extracting watermark information.

* * * * *